(12) United States Patent
Tsutsumi et al.

(10) Patent No.: US 8,286,200 B2
(45) Date of Patent: Oct. 9, 2012

(54) DISK DRIVE APPARATUS AND ELECTRONIC APPLIANCE

(75) Inventors: Hideaki Tsutsumi, Tokyo (JP); Manabu Obata, Kanagawa (JP); Yuji Suzuki, Kanagawa (JP); Yusuke Izumiya, Kanagawa (JP)

(73) Assignee: Sony NEC Optiarc Inc., Tokyo (JP)

( * ) Notice: Subject to any disclaimer, the term of this patent is extended or adjusted under 35 U.S.C. 154(b) by 1259 days.

(21) Appl. No.: 12/040,182

(22) Filed: Feb. 29, 2008

(65) Prior Publication Data

US 2008/0229337 A1 Sep. 18, 2008

(30) Foreign Application Priority Data

Mar. 13, 2007 (JP) ................................. 2007-063951

(51) Int. Cl.
*G11B 17/04* (2006.01)

(52) U.S. Cl. ........................................ 720/623; 720/626

(58) Field of Classification Search ........... 720/617–626
See application file for complete search history.

(56) References Cited

U.S. PATENT DOCUMENTS

| 7,104,490 | B2 * | 9/2006 | Hiraguchi ..................... 360/132 |
| 7,581,236 | B2 * | 8/2009 | Matsushita et al. ........... 720/714 |
| 7,669,211 | B2 * | 2/2010 | Chen ............................. 720/714 |
| 2005/0086673 | A1 * | 4/2005 | Ueno et al. ..................... 720/622 |
| 2005/0235300 | A1 * | 10/2005 | Kido .............................. 720/621 |
| 2008/0052731 | A1 * | 2/2008 | Chiou et al. ................... 720/622 |
| 2009/0133043 | A1 * | 5/2009 | Hoshinaka et al. ........... 720/601 |

FOREIGN PATENT DOCUMENTS

| JP | 62-229567 | 10/1987 |
| JP | 8-167211 | 6/1996 |
| JP | 11-66677 | 3/1999 |
| JP | 3111157 | 11/2000 |
| JP | 2004-310921 | 11/2004 |
| JP | 2005-85450 | 3/2005 |
| JP | 2005-276320 | 10/2005 |
| JP | 2005-327431 | 11/2005 |
| JP | 2006-127680 | 5/2006 |
| WO | WO 2005081243 A1 * | 9/2005 |

* cited by examiner

*Primary Examiner* — Nathan Danielsen
(74) *Attorney, Agent, or Firm* — Oblon, Spivak, McClelland, Maier & Neustadt, L.L.P.

(57) ABSTRACT

A disk drive apparatus includes: a disk table on which a disk recording medium inserted into a disk insertion port for loading is mounted; an eject lever rotatably supported by a chassis, and having a disk holding part that holds the inserted medium; and a support lever rotatably supported by the chassis and having a disk holding part, wherein these levers are rotated between a waiting position at which the disk holding part waits for the inserted medium and a drawing position at which the medium held by the disk holding part is drawn, wherein when the eject lever and the support lever are at the waiting positions, the disk holding parts are each positioned at a position which is located more on the disk insertion port side than a centering projecting part of the disk table and is not overlapped with the insertion direction of the medium.

6 Claims, 40 Drawing Sheets

DISK DRIVE APPARATUS AND ELECTRONIC APPLIANCE

CROSS REFERENCES TO RELATED APPLICATIONS

The present invention contains subject matter related to Japanese Patent Application JP 2007-063951 filed in the Japanese Patent Office on Mar. 13, 2007, the entire contents of which being incorporated herein by reference.

BACKGROUND OF THE INVENTION

1. Field of the Invention

The present invention relates to technical fields of a disk drive apparatus and an electronic appliance. More specifically, the invention relates to a technical field in which two levers each having a disk holding part are provided to prevent a disk recording medium from being damaged while a reduction in the thickness of a disk drive apparatus is reliably provided.

2. Description of the Related Art

There is a disk drive apparatus that records, or reproduces, or records and reproduces information signals on a disk recording medium (for example, see Patent Reference 1 (JP-A-2004-310921)).

In a disk drive apparatus like this, when a disk recording medium is inserted into a disk insertion port, a disk loading mechanism loads the disk recording medium and mounts it on a disk table to record or reproduce information signals on the disk recording medium. For example, a disk recording medium on which recording or reproducing information signals is finished is pushed by an eject lever that is rotated so as to slide over a pickup base which supports an optical pickup, and then the disk recording medium is ejected from the disk insertion port.

In loading the disk recording medium, the rim surface of the disk recording medium pushes the disk holding part of the eject lever, whereby the eject lever is rotated in the reverse direction when ejecting the disk recording medium.

SUMMARY OF THE INVENTION

The disk insertion port of the disk drive apparatus has a width in the thickness direction of a disk recording medium larger than the thickness of the disk recording medium in order to reliably provide an excellent insertion of the disk recording medium. Therefore, there is a risk that when a user inserts a disk recording medium into the disk insertion port, the disk recording medium is obliquely inserted in the thickness direction although the disk recording medium is supposed to be horizontally inserted.

However, in the disk drive apparatus before, since the rim part of the disk recording medium inserted into the disk insertion port is held by the disk holding part of the eject lever to start the loading operation, the disk recording medium is sometimes tilted laterally relative to the disk holding part. In this case, the rim part of the disk recording medium contacts with the pickup base to raise the risk of damaging the disk recording medium.

The disk recording medium can be prevented from being damaged due to such a tilt by increasing the distance between the eject lever and the pickup base in the thickness direction of the disk recording medium. However, the increased distance between the eject lever and the pickup base grows the thickness of the disk drive apparatus, which causes a difficulty of reducing the thickness.

Thus, it is desirable to solve the problems and to prevent a disk recording medium from being damaged while a reduction in the thickness of a disk drive apparatus is reliably provided.

A disk drive apparatus and an electronic appliance according to embodiments of the invention are a disk drive apparatus and an electronic appliance each including: a disk table on which a disk recording medium inserted into a disk insertion port and loaded is mounted; an eject lever rotatably supported by a chassis, and having a disk holding part that holds the disk recording medium inserted into the disk insertion port, wherein the eject lever is rotated between a waiting position at which the disk holding part waits for the disk recording medium inserted into the disk insertion port and a drawing position at which the disk recording medium held by the disk holding part is drawn; and a support lever rotatably supported by the chassis and having a disk holding part that holds the disk recording medium inserted into the disk insertion port, wherein the support lever is rotated between a waiting position at which the disk holding part waits for the disk recording medium inserted into the disk insertion port and a drawing position at which the disk recording medium held by the disk holding part is drawn, wherein in the state in which the eject lever and the support lever are at the waiting positions, the disk holding parts of the eject lever and the support lever are each positioned at a position which is located more on the disk insertion port side than a centering projecting part of the disk table is located and is not overlapped with the insertion direction of the disk recording medium.

Accordingly, in the disk drive apparatus and the electronic appliance according to the embodiment of the invention, the disk recording medium inserted into the disk insertion port is held by two disk holding parts.

A disk drive apparatus according to an embodiment of the invention is a disk drive apparatus including: a disk table on which a disk recording medium inserted into a disk insertion port and loaded is mounted; an eject lever rotatably supported by a chassis, and having a disk holding part that holds the disk recording medium inserted into the disk insertion port, wherein the eject lever is rotated between a waiting position at which the disk holding part waits for the disk recording medium inserted into the disk insertion port and a drawing position at which the disk recording medium held by the disk holding part is drawn; and a support lever rotatably supported by the chassis and having a disk holding part that holds the disk recording medium inserted into the disk insertion port, wherein the support lever is rotated between a waiting position at which the disk holding part waits for the disk recording medium inserted into the disk insertion port and a drawing position at which the disk recording medium held by the disk holding part is drawn, wherein in the state in which the eject lever and the support lever are at the waiting positions, the disk holding parts of the eject lever and the support lever are each positioned at a position which is located more on the disk insertion port side than a centering projecting part of the disk table is located and is not overlapped with the insertion direction of the disk recording medium.

Therefore, the disk recording medium is held by two disk holding parts positioned more on the disk insertion port side than the centering projecting part is. Thus, even though the disk recording medium is obliquely inserted into the disk insertion port, the disk recording medium is not contacted with the disk table or the pickup base, which can prevent the disk recording medium from being damaged. In addition, it is unnecessary to position the eject lever greatly separated from the disk table or the pickup base in order to prevent the disk recording medium from being damaged, which can intend a reduction in the thickness of the disk drive apparatus.

In the disk drive apparatus according to the embodiment of the invention, the disk drive apparatus includes: a pickup base configured to movably support an optical pickup that applies a laser light onto the disk recording medium in the radial direction of the disk recording medium; a slider configured to ascend and descend the pickup base by being moved in a predetermined direction by means of a drive motor; a drive lever coupled to a slider and operated in association with the motion of the slider, the drive lever having an action hole that is formed in a predetermined shape; a control pin inserted into the action hole of the drive lever by the eject lever; and an urging spring configured to urge the eject lever to the waiting position side in the rotating direction, wherein when the eject lever is rotated to the waiting position side by the urging force of the urging spring in the state in which the slider and the drive lever are moved by the drive motor in loading the disk recording medium, the control pin of the eject lever is engaged with a predetermined portion on an opening edge of the action hole of the drive lever to control the motion of the slider. Thus, the drive lever is not moved, and the pickup base and the disk table are not moved, which can prevent the eject lever from being deformed.

In the disk drive apparatus according to the embodiment of the invention, a reinforcing rib is provided on the opening edge of the action hole of the drive lever. Thus, the strength of the drive lever is great, which can prevent the drive lever from being deformed due to the engagement of the control pin with the opening edge.

In the disk drive apparatus according to the embodiment of the invention, the disk drive apparatus includes: an extension coil spring configured to urge the support lever to the waiting position side in the rotating direction, wherein the disk recording medium is ejected by pressures of the eject lever and the support lever against the disk recording medium, the eject lever and the support lever being rotated, the pressure of the eject lever against the disk recording medium is released just before finishing the ejection, and in ejecting the medium, the support lever is rotated from the drawing position to the waiting position by the urging force of the extension coil spring. Thus, since the urging force of the extension coil spring is small just before finishing the ejection, the excessive popping up of the disk recording medium from the disk insertion port can be prevented.

An electronic appliance according to an embodiment of the invention is an electronic appliance having a disk drive apparatus that records or reproduces or records and reproduces information signals on a disk recording medium, the disk drive apparatus including: a disk table on which a disk recording medium inserted into a disk insertion port and loaded is mounted; an eject lever rotatably supported by a chassis, and having a disk holding part that holds the disk recording medium inserted into the disk insertion port, wherein the eject lever is rotated between a waiting position at which the disk holding part waits for the disk recording medium inserted into the disk insertion port and a drawing position at which the disk recording medium held by the disk holding part is drawn; and a support lever rotatably supported by the chassis and having a disk holding part that holds the disk recording medium inserted into the disk insertion port, wherein the support lever is rotated between a waiting position at which the disk holding part waits for the disk recording medium inserted into the disk insertion port and a drawing position at which the disk recording medium held by the disk holding part is drawn, in the state in which the eject lever and the support lever are at the waiting positions, the disk holding parts of the eject lever and the support lever are each positioned at a position which is located more on the disk insertion port side than the disk table and is not overlapped in the insertion direction of the disk recording medium.

Accordingly, the disk recording medium is held by two disk holding parts positioned more on the disk insertion port side than the centering projecting part is. Thus, even though the disk recording medium is obliquely inserted into the disk insertion port, the disk recording medium is not contacted with the disk table or the pickup base, which can prevent the disk recording medium from being damaged. In addition, it is unnecessary to position eject lever greatly separated from the disk table or the pickup base in order to prevent a disk recording medium from being damaged, which can intend a reduction in the thickness of the electronic appliance.

DETAILED DESCRIPTION OF THE INVENTION

Hereinafter, a disk drive apparatus and an electronic appliance according to embodiments of the invention will be described with reference to the drawings. In the embodiment of the invention, the electronic appliance according to the embodiment of the invention is adapted to a personal computer, and the disk drive apparatus according to the embodiment of the invention is adapted to a disk drive apparatus provided in the personal computer.

In addition, the range of adapting the electronic appliance and the disk drive apparatus according to the embodiment of the invention is not restricted to the personal computer and the disk drive apparatus provided in the same. The electronic appliance according to the embodiment of the invention can be widely adapted to various electronic appliances handling a disk recording medium, for example, game machines, information terminal devices such as a PDA (Personal Digital Assistant), imaging apparatuses such as a still camera, an electronic camera and a video camera, and recording apparatuses and audio apparatuses handling various disk recording media. The disk drive apparatus according to the embodiment of the invention can be widely adapted to disk drive apparatuses that record or reproduce or record and reproduce information signals on a disk recording medium handled in these various electronic appliances.

Figure 1:
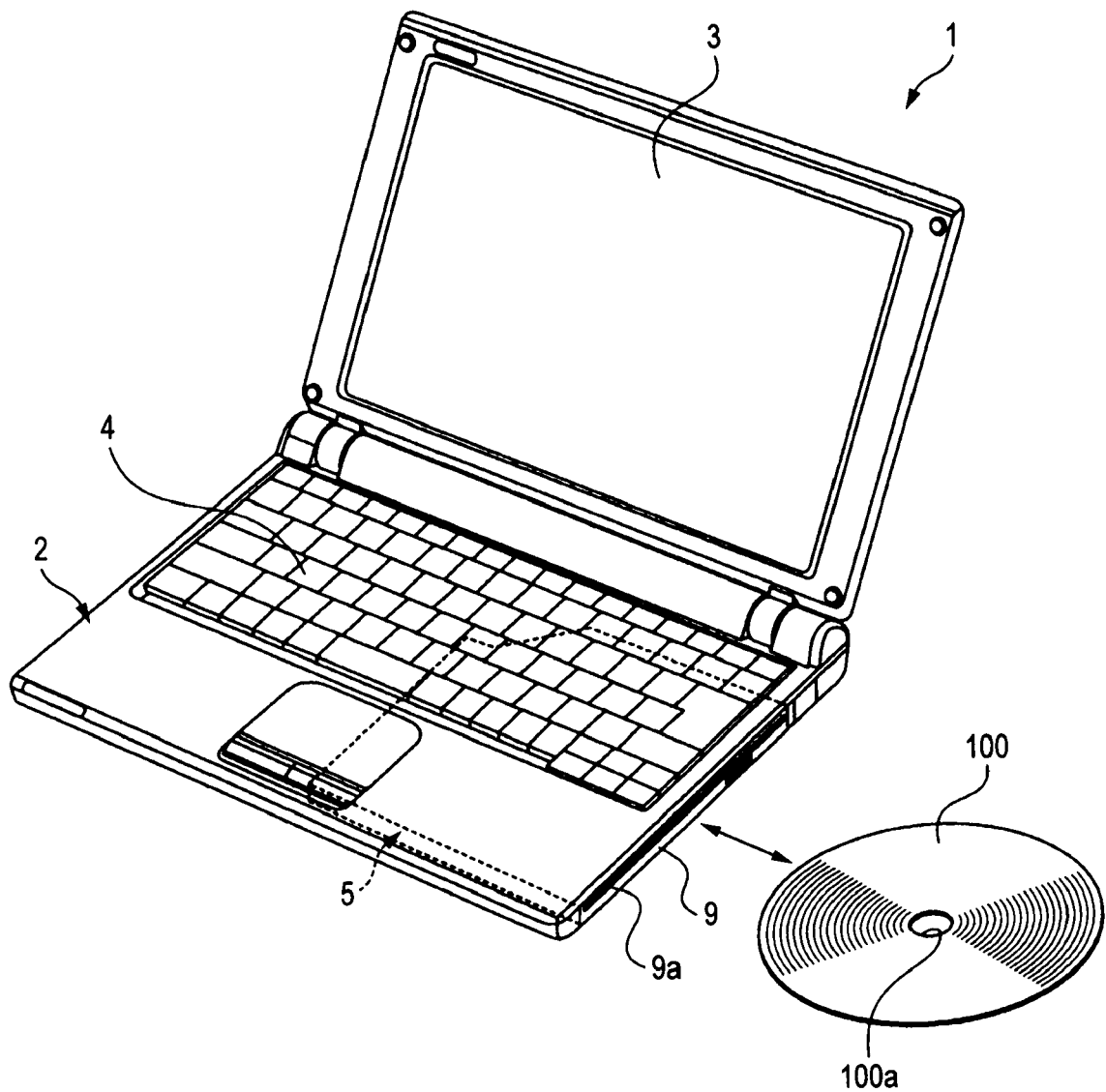
FIG. 1 shows an embodiment of the invention together with FIGS. 2 to 40, showing a perspective view depicting an electronic appliance.

For example, an electronic appliance (personal computer) 1 has an apparatus main body 2 and a display device 3 that is rotatably supported by the apparatus main body 2, and the apparatus main body 2 is provided with a keyboard 4 on which necessary operation keys are arranged (see FIG. 1). In addition, for example, the electronic appliance 1 may be a so-called desktop appliance having an apparatus main body and a keyboard device separately provided.

The apparatus main body 2 has a disk drive apparatus 5 therein. In addition, in the discussion of the disk drive apparatus 5, for convenience of description, a disk insertion port, described later, is placed on the front side, and the insertion direction of a disk recording medium toward the disk insertion port is placed on the rear side, in which the upper, lower, front, rear, right and left orientations are defined in the state in which a user insets a disk recording medium 100 into the disk insertion port.

Figure 2:
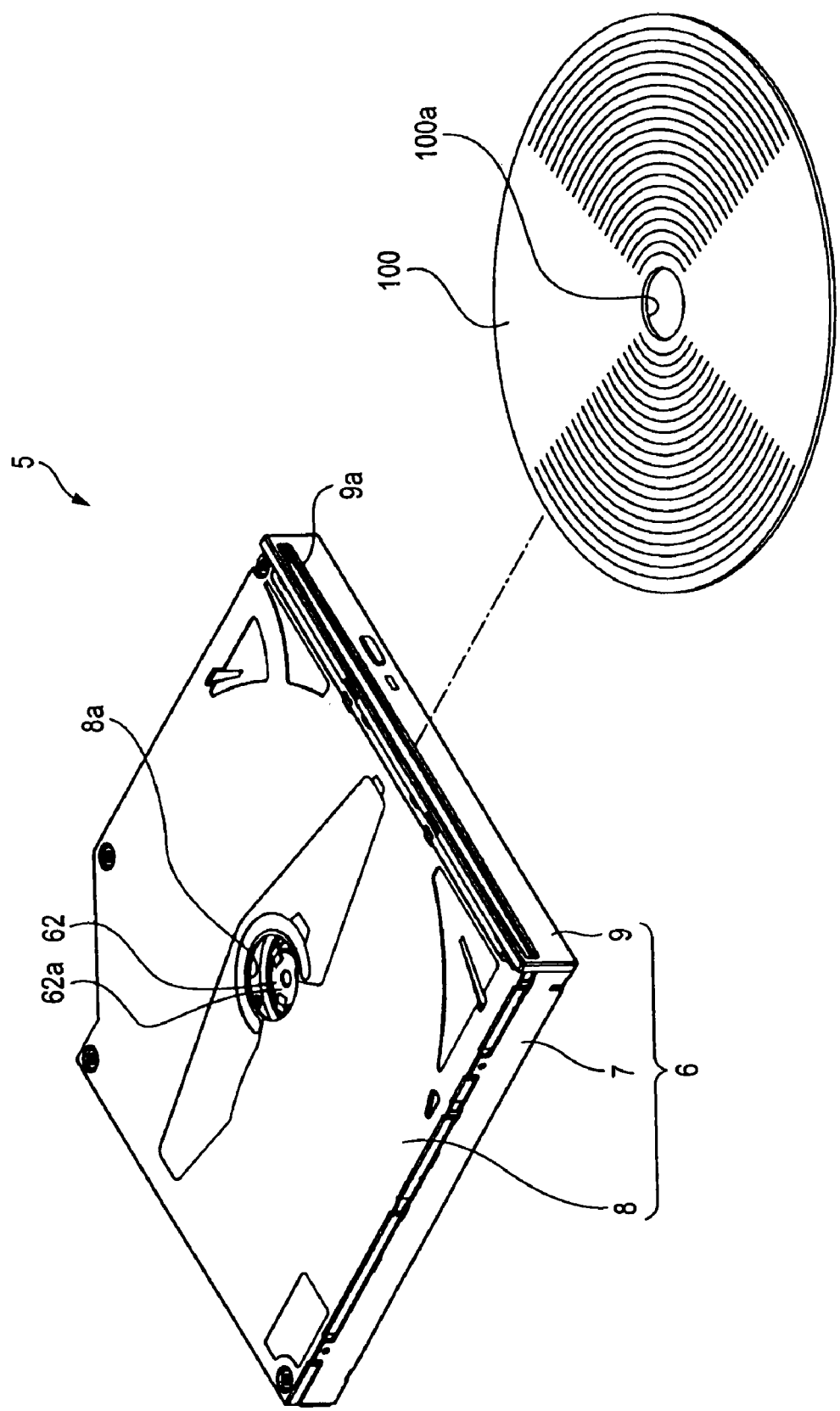
FIG. 2 shows a perspective view depicting a disk drive apparatus and a disk recording medium.

The disk drive apparatus 5 has a flat, rectangular shape, in which necessary components are arranged in an outer case 6 (see FIG. 2). The outer case 6 has a lower shell 7 that is a shallow box opened upward and forward, except a part thereof, an upper shell 8 that blocks the lower shell 7 from the upper side, and a front panel 9 that is mounted on the front end of the lower shell 7.

At the center part of the upper shell 8, an insertion hole 8a is formed.

On the front panel 9, a disk insertion port 9a is formed, and the disk insertion port 9a is formed long from side to side as corresponding to the shape of the disk recording medium 100. The disk insertion port 9a is opened and closed by a shutter, not shown.

Figure 3:
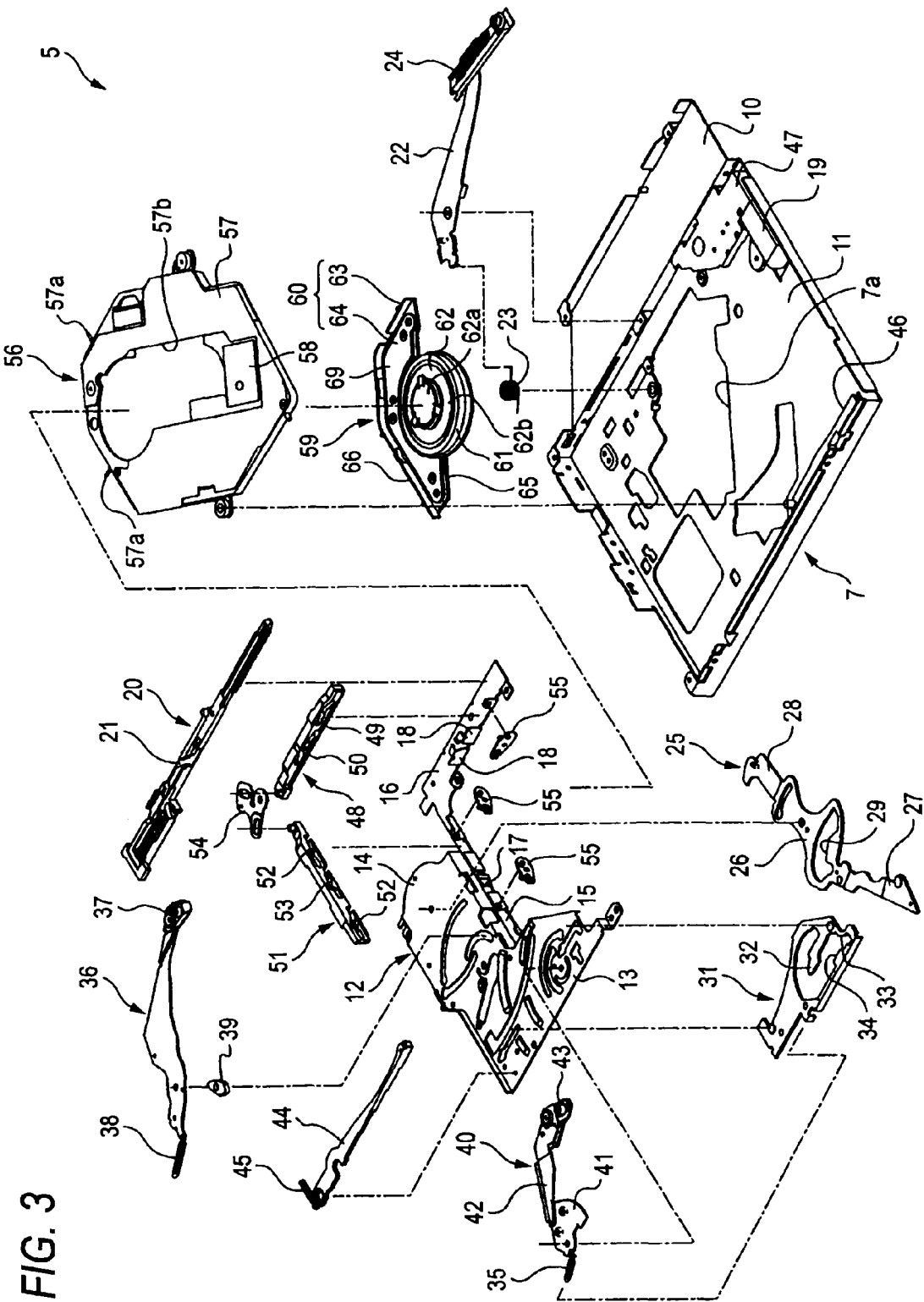
FIG. 3 shows an exploded perspective view depicting the disk drive apparatus.
Figure 4:
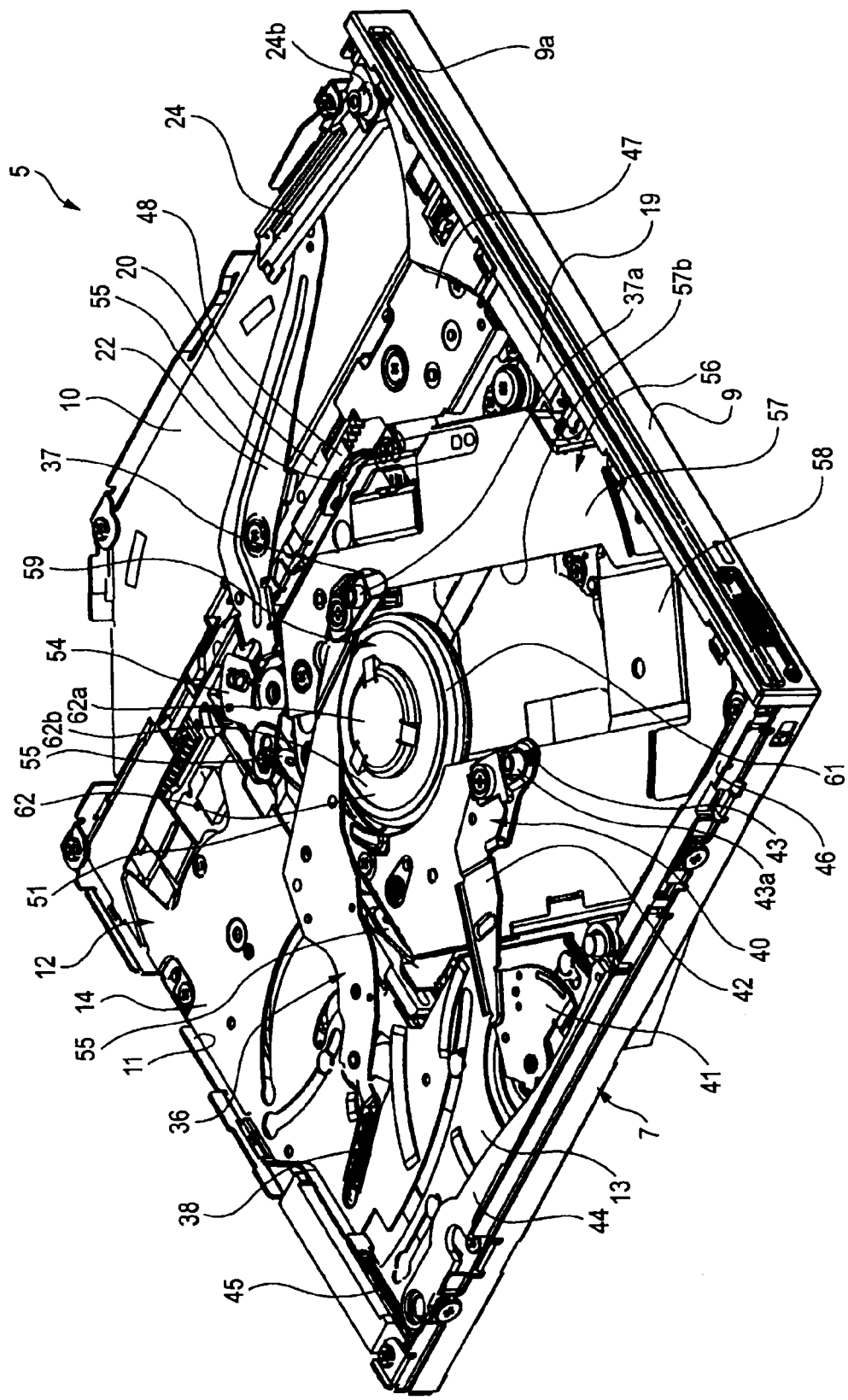
FIG. 4 shows a perspective view depicting the disk drive apparatus.
Figure 5:
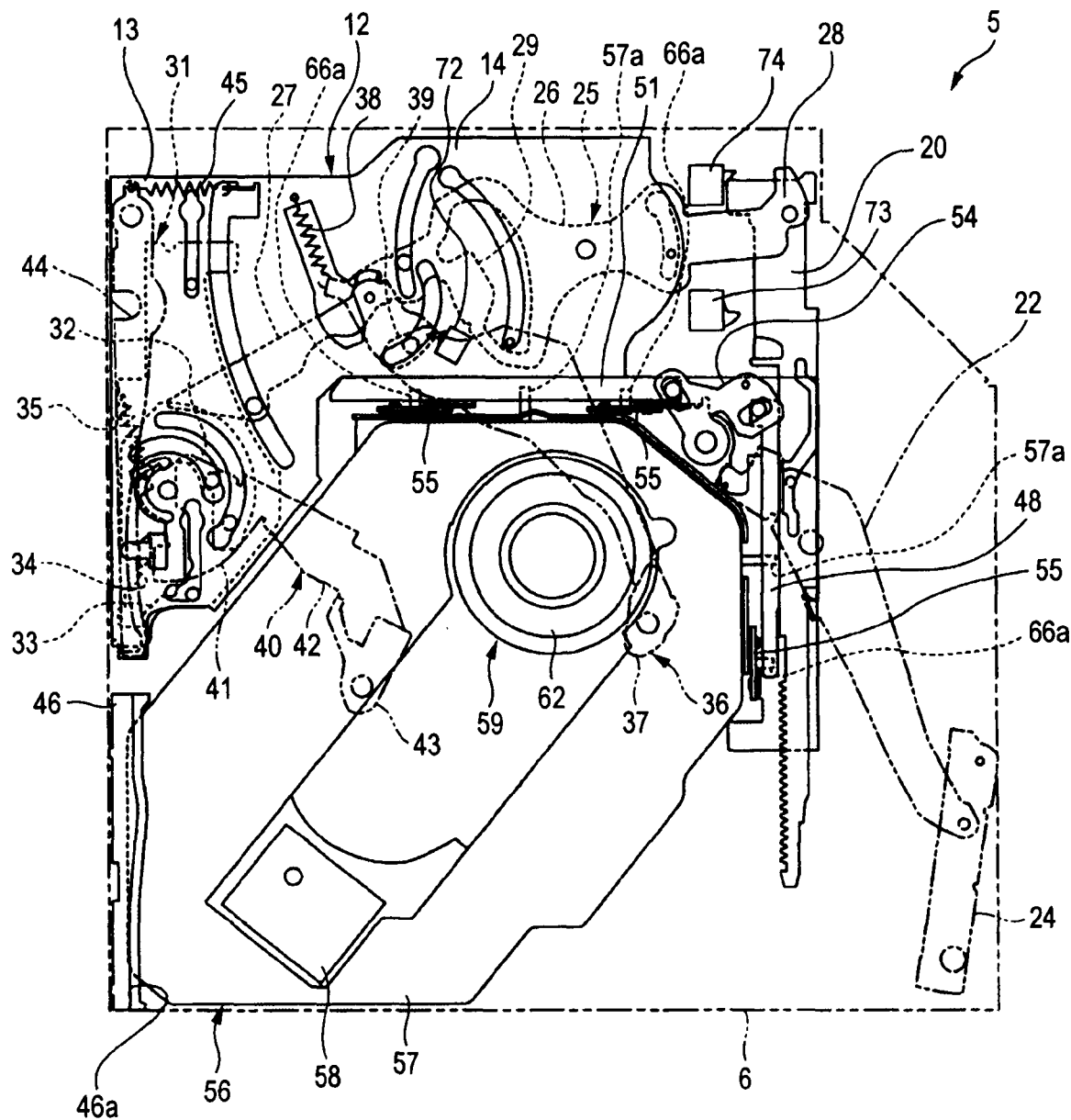
FIG. 5 shows a plan view schematically depicting the disk drive apparatus.

The right end part of the lower shell 7 is provided as a support face part 10 that is positioned one step higher than the other portions, and the portions other than the support face part 10 are formed as an arrangement recessed part 11 that is opened upward (see FIGS. 3 to 5).

On the bottom face part of the lower shell 7, an opening 7a is formed that is vertically opened. The right opening edge of the opening 7a is formed slightly apart from the left side of the left edge of the support face part 10.

Figure 6:
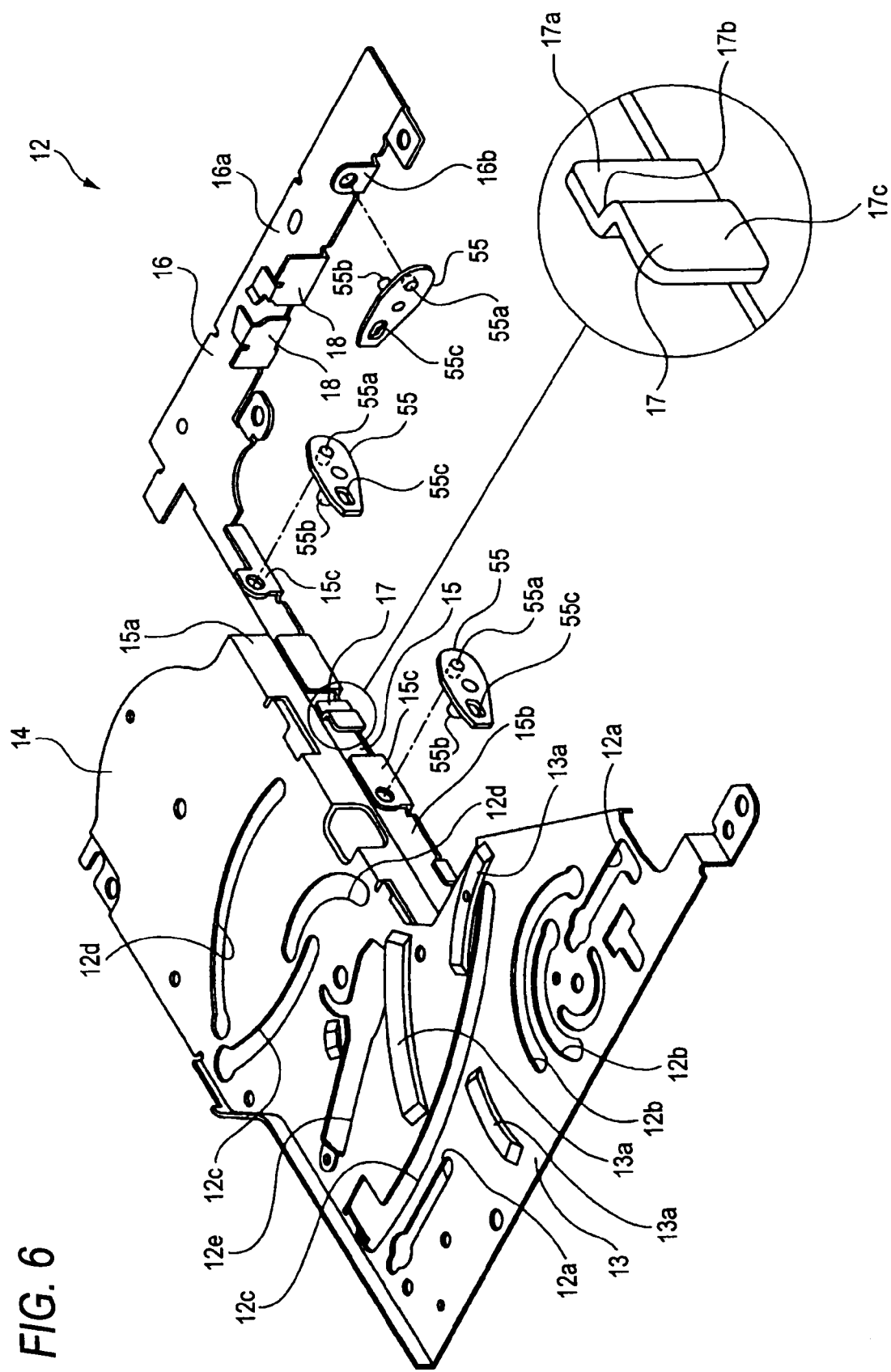
FIG. 6 shows an enlarged perspective view depicting a chassis.

On the arrangement recessed part 11 of the lower shell 7, a chassis 12 is arranged (see FIG. 3). As shown in FIG. 6, the chassis 12 has a left part 13 that is positioned on the left side and formed long from front to back, a right part 14 that is protruded rightward from the rear half of the left part 13, a first slider support part 15 that is provided on the front side of the right part 14 and extended from side to side, and a second slider support part 16 that is protruded forward from the right end part of the first slider support part 15.

At the position close to the left end of the chassis 12, slider support holes 12a and 12a are formed separately from front to back that are extended from front to back. Near the front slider support hole 12a on the chassis 12, first lever support hales 12b and 12b in an arc shape are formed, and the first lever support hales 12b and 12b are formed in concentric arcs. On the chassis 12, second lever support hales 12c and 12c are formed that are separated to each other from side to side, and the second lever support hales 12c and 12c are formed in a gentle arc shape projected leftward. On the chassis 12, third lever support hales 12d and 12d are formed that are separated to each other from side to side, and the third lever support hales 12d and 12d are formed in a gentle arc shape projected rightward. On the chassis 12, a spring arrangement hole 12e is formed between the second lever support hales 12c and 12c.

On the left part 13 of the chassis 12, slide rails 13a, 13a and 13a are provided that are chased upward. The slide rails 13a, 13a and 13a are formed in an arc shape.

The first slider support part 15 has a rear face part 15a that is protruded downward from the front edge of the right part 14, a bottom face part 15b that is protruded forward from the lower edge of the rear face part 15a, and lever support piece parts 15c and 15c that are protruded upward from the front edge of the bottom face part 15b, in which the lever support piece parts 15c and 15c are provided separately from each other from side to side.

On the first slider support part 15, a spring holding part 17 is provided between the lever support piece parts 15c and 15c. The spring holding part 17 has a base part 17a that is protruded upward from the front edge of the bottom face part 15b, a middle part 17b that is protruded forward from the left edge of the base part 17a, and a holding part 17c that is protruded leftward from the front edge of the middle part 17b.

The second slider support part 16 has a bottom face part 16a that faces in the vertical direction, and a lever support piece part 16b that is protruded upward from the left edge of the bottom face part 16a. At the left edge of the bottom face part 16a, slider retaining pieces 18 and 18 are provided separately from each other from front to back that are protruded upward on the rear side of the lever support piece part 16b.

On the arrangement recessed part 11 of the lower shell 7, a drive motor 19 is provided at the position close to the right end of the front end part. To the motor shaft of the drive motor 19, a worm (gear), not shown, is fixed.

At the position close to the drive motor 19, a reduction gear group, not shown, is supported that is formed of a plurality of gears geared with each other. The reduction gear group is geared with the worm (gear).

At the right end part of the arrangement recessed part 11 of the lower shell 7, a slider 20 is movably supported in the longitudinal direction (see FIGS. 3 to 5).

Figure 7:
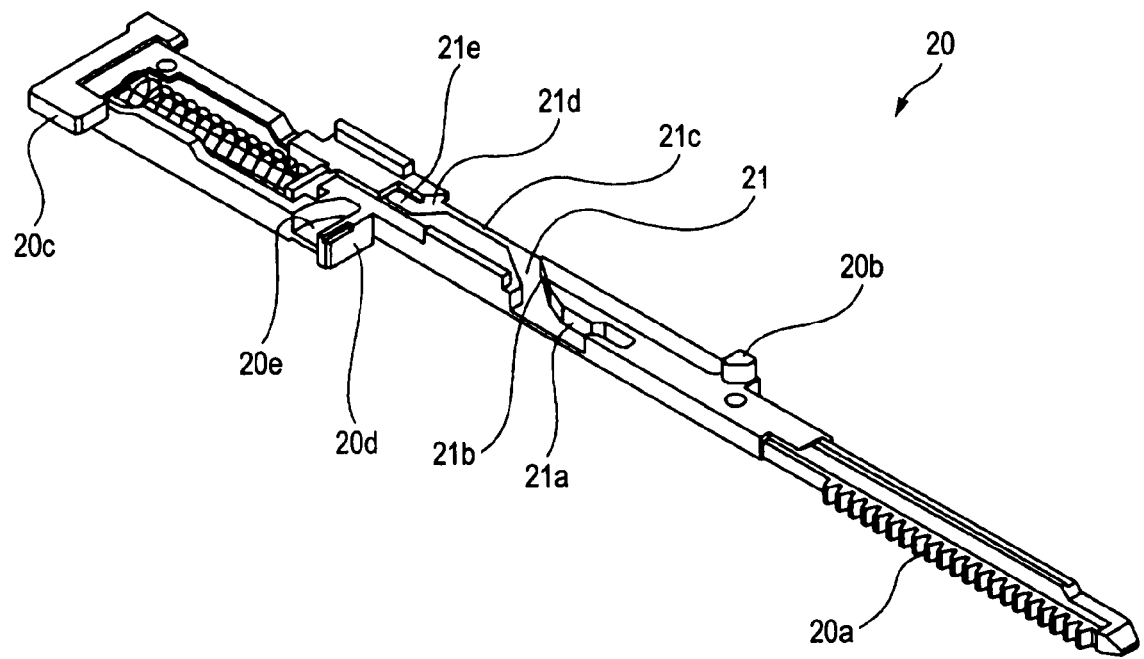
FIG. 7 shows an enlarged perspective view depicting a slider.

The slider 20 is formed long from front to back, and has a rack part 20a at the left side surface of the front end part as shown in FIG. 7.

On the slider 20, a pressure projecting part 20b that is protruded upward is provided at the position on the rear side of the rack part 20a.

On the slider 20, a shaft slide groove 21 that is opened upward is formed at the position on the rear side of the pressure projecting part 20b. The shaft slide groove 21 has a front straight part 21a that is extended from front to back, a front slope part 21b that continues to the rear end of the front straight part 21a and is tilted rightward as going to the rear side, a middle straight part 21c that continues to the rear end of the front slope part 21b and is extended from front to back, a rear slope part 21d that continues to the rear end of the middle straight part 21c and is tiled leftward as going to the rear side, and a rear straight part 21e that continues to the rear end of the rear slope part 21d and is extended from front to back.

At the rear end part of the slider 20, a switch pushing part 20c is provided that is protruded leftward.

On the slider 20, a pressure face part 20d that faces forward is formed at the left position of the shaft slide groove 21. At just the rear side of the pressure face part 20d of the slider 20, an action groove 20e is formed that is opened leftward and upward.

The pressure projecting part 20b of the slider 20 and the front slope part 21b of the shaft slide groove 21 function as a pushing part that pushes the subject pressure part of a rotating lever, described later.

In the slider 20, the rack part 20a is geared with the reduction gear group. The drive force of the drive motor 19 is transmitted to the slider 20 through the worm (gear) and the reduction gear group, and then the slider 20 is moved in the longitudinal direction in accordance with the rotating direction of the drive motor 19.

Figure 8:
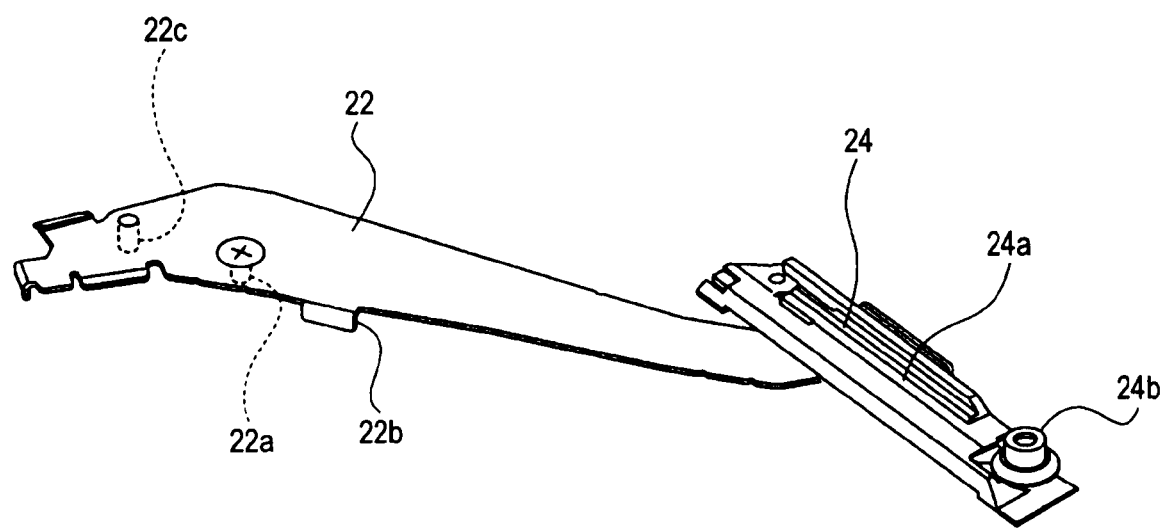
FIG. 8 shows an enlarged perspective view depicting a rotating lever and a loading lever.

At the support face part 10 of the lower shell 7, a rotating lever 22 is rotatably supported (see FIGS. 3 to 5). As shown in FIG. 8, on the rotating lever 22, a subject pressure piece part 22b that is protruded downward is provided on the front side of a pivot part 22a, and a subject pressure shaft 22c that is protruded downward is provided on the rear side of the pivot part 22a.

The subject pressure piece part 22b and the subject pressure shaft 22c of the rotating lever 22 function as a subject pressure part, which are pushed by the pressure projecting part 20b and the front slope part 21b of the slider 20, respectively, in loading the disk recording medium 100.

Between the rear end part of the rotating lever 22 and the lower shell 7, a torsion coil spring 23 is supported. The rotating lever 22 is urged in the clockwise direction seen in a plane by the torsion coil spring 23.

On the support face part 10 of the lower shell 7, a loading lever 24 is rotatably supported. The loading lever 24 has a rotating face part 24a, and a roller 24b that is rotatably supported by the front end part of the rotating face part 24a. On the rotating face part 24a of the loading lever 24, a slide groove that is opened downward, not shown, is formed.

On the slide groove of the loading lever 24, the front end part of the rotating lever 22 is slidably supported. Therefore, when the rotating lever 22 is rotated, the loading lever 24 is turned around in accordance with the rotation of the rotating lever 22.

The loading lever 24 is urged in the clockwise direction seen in a plane by the action of the torsion coil spring 23 through the rotating lever 22.

Figure 9:
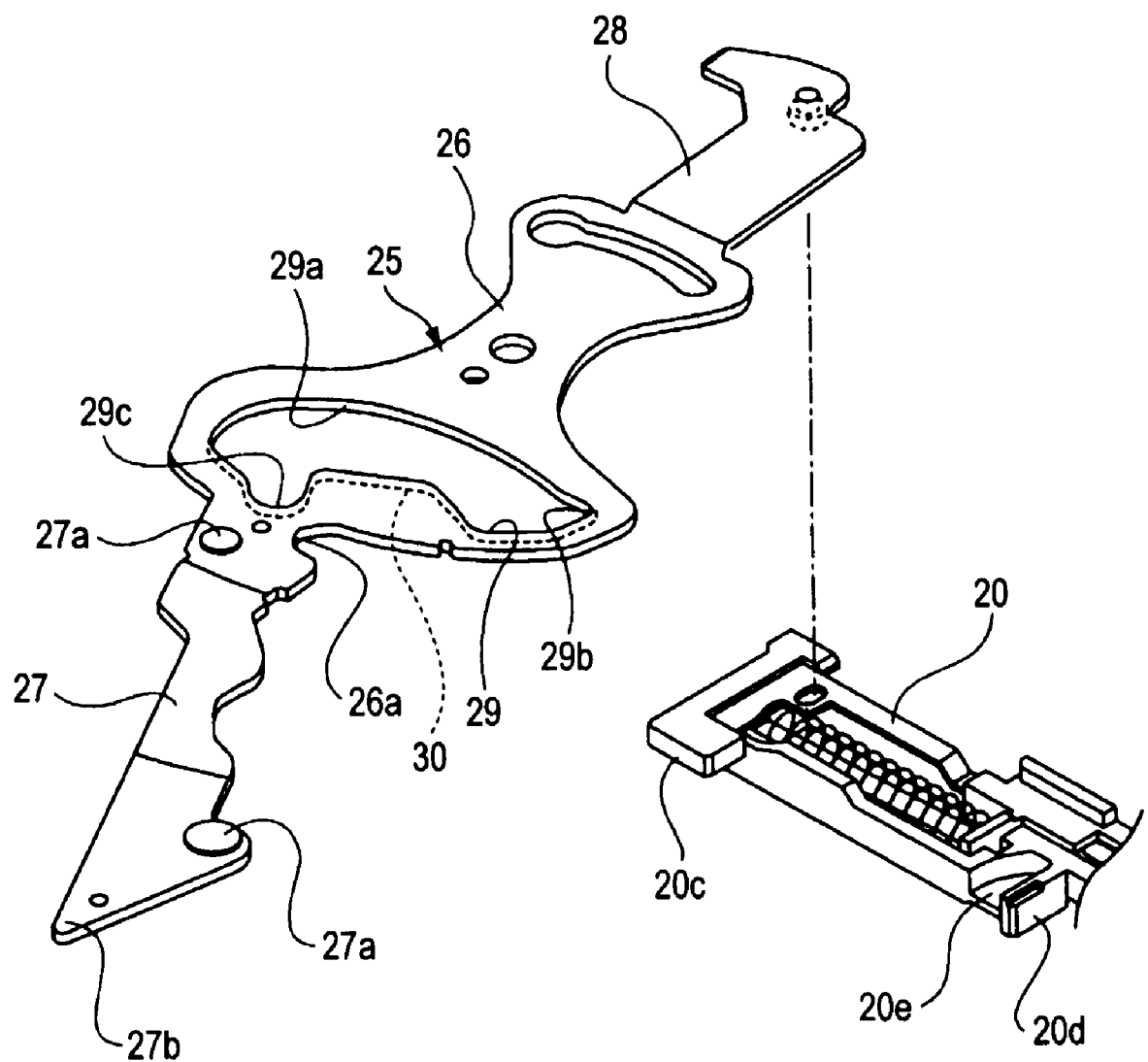
FIG. 9 shows an enlarged exploded perspective view depicting a drive lever and a part of the slider.

On the under surface side of the chassis 12, a drive lever 25 is rotatably supported that is formed long from side to side (see FIGS. 3 to 5). As shown in FIG. 9, the drive lever 25 has a subject support face part 26 that is supported by the chassis 12, an extension part 27 that is protruded leftward from the subject support face part 26, and a protrusion part 28 that is protruded rightward from the subject support face part 26, in which they are formed in one piece with a plate metal material.

On the left end part of the subject support face part 26, an action hole 29 shaped a predetermined shape is formed. The action hole 29 is configured of a main opening 29a in a vertically long shape, a front projecting part 29b that is opened small so as to project rightward from the front end part of the main opening 29a, and a rear opening 29c that is opened large so as to project leftward from the rear end part of the main opening 29a.

On the opening edge of the action hole 29, a reinforcing rib 30 is provided that is bent downward.

The front edge of the left end part of the subject support face part 26 is provided as a pushing part 26a that is formed in a nearly arc shape projecting toward the rear side.

On the extension part 27, subject support pins 27a and 27a that are protruded upward are provided separately from each other from side to side. The tip end part of the extension part 27 is provided as an action part 27b that pushes a support lever, described later, in ejecting the disk recording medium.

The right end part of the protrusion part 28 is rotatably coupled to the rear end part of the slider 20.

On the drive lever 25, nearly the center part of the subject support face part 26 is the pivoting point for the chassis 12, and the subject support pins 27a and 27a are inserted into the second lever support hales 12c and 12c, respectively, and are rotatably supported by the chassis 12. Since the right end part of the protrusion part 28 is rotatably coupled to the rear end part of the slider 20, the slider 20 is moved forward and then the drive lever 25 is rotated in the clockwise direction seen in a plane, whereas the slider 20 is moved to the rear side, and then the drive lever 25 is rotated in the counterclockwise direction seen in a plane.

On the under surface side of the left part 13 of the chassis 12, a centering slider 31 is movably supported in the longitudinal direction (see FIGS. 3 to 5). The centering slider 31 is formed long in the longitudinal direction in which a large opening 31a is formed in the front half thereof (see FIG. 10).

The centering slider 31 has an action projecting part 32 that is protruded from the front end part to the rear side, and the action projecting part 32 is positioned so as to project into the opening 31a. The rear end part of the action projecting part 32 is provided as a lock part 32a. The edge part of the portion close to the rear end of the action projecting part 32 is provided as a lock edge part 32b that is formed to extend from side to side.

On the opening edge of the opening 31a of centering slider 31, at the position close to the front end, a slope action part 33 that faces obliquely on the left-rear side and a straight action part 34 that is protruded rightward and extended from front to back are provided. The slope action part 33 is positioned at the front side slightly more than the straight action part 34 is positioned.

The rear end part of the centering slider 31 is provided as a subject pressure piece part 31b that is protruded rightward.

The centering slider 31 has subject guide pins 31c and 31c that are protruded upward separately from each other from front to back.

Between the centering slider 31 and a support lever, described later, an extension coil spring 35 is supported (see FIGS. 3 and 5), and the centering slider 31 is urged forward by the extension coil spring 35.

The subject guide pins 31c and 31c are inserted into the slider support holes 12a and 12a, respectively, and the centering slider 31 is movably supported by the chassis 12 in the longitudinal direction. In the state in which the centering slider 31 is supported by the chassis 12, the subject pressure piece part 31b is positioned below the second lever support hale 12c on the left side.

On the top surface side of the right part 14 of the chassis 12, an eject lever 36 is rotatably supported (see FIGS. 3 to 5).

Figure 11:
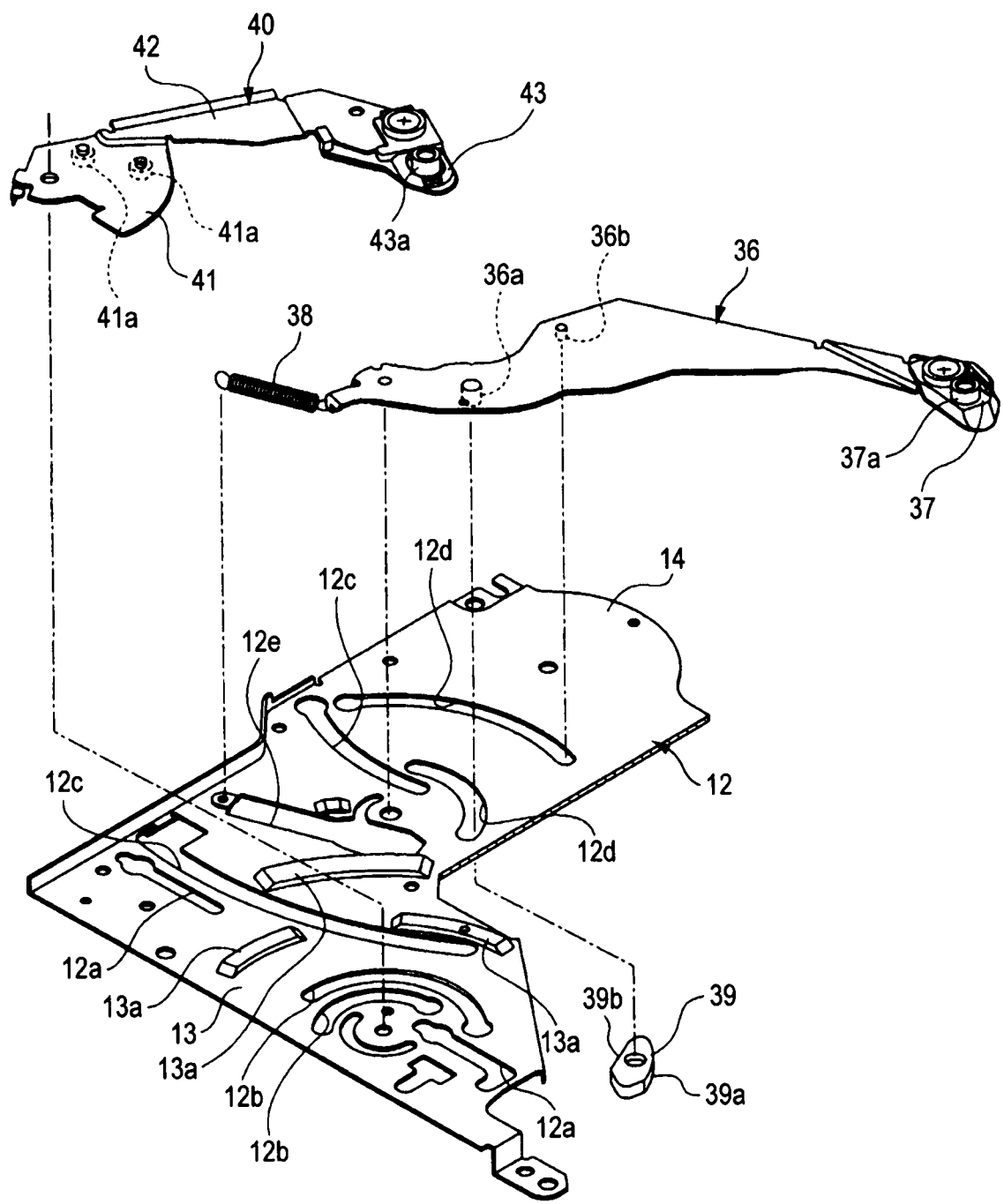
FIG. 11 shows an enlarged perspective view depicting an eject lever, a support lever and a subject pressure member along with a part of the chassis.

The eject lever 36 is formed long nearly in one direction, having a disk holding part 37 at one end in the longitudinal direction (see FIG. 11). The disk holding part 37 has a disk holding pin 37a that is protruded upward.

The eject lever 36 has a mounting pin 36a and a control pin 36b that are protruded downward separately from each other in the longitudinal direction.

The eject lever 36 has a pivoting point at the position close to the other end part in the longitudinal direction, in which the mounting pin 36a and the control pin 36b are inserted into the third lever support hales 12d and 12d, respectively, and rotatably supported by the chassis 12.

In the state in which the eject lever 36 is supported by the chassis 12, an urging spring 38 is supported between the other end part of the eject lever 36 in the longitudinal direction and the rear end part of the chassis 12 (see FIGS. 3 and 5), and the eject lever 36 is urged in the clockwise direction seen in a plane.

Figure 12:
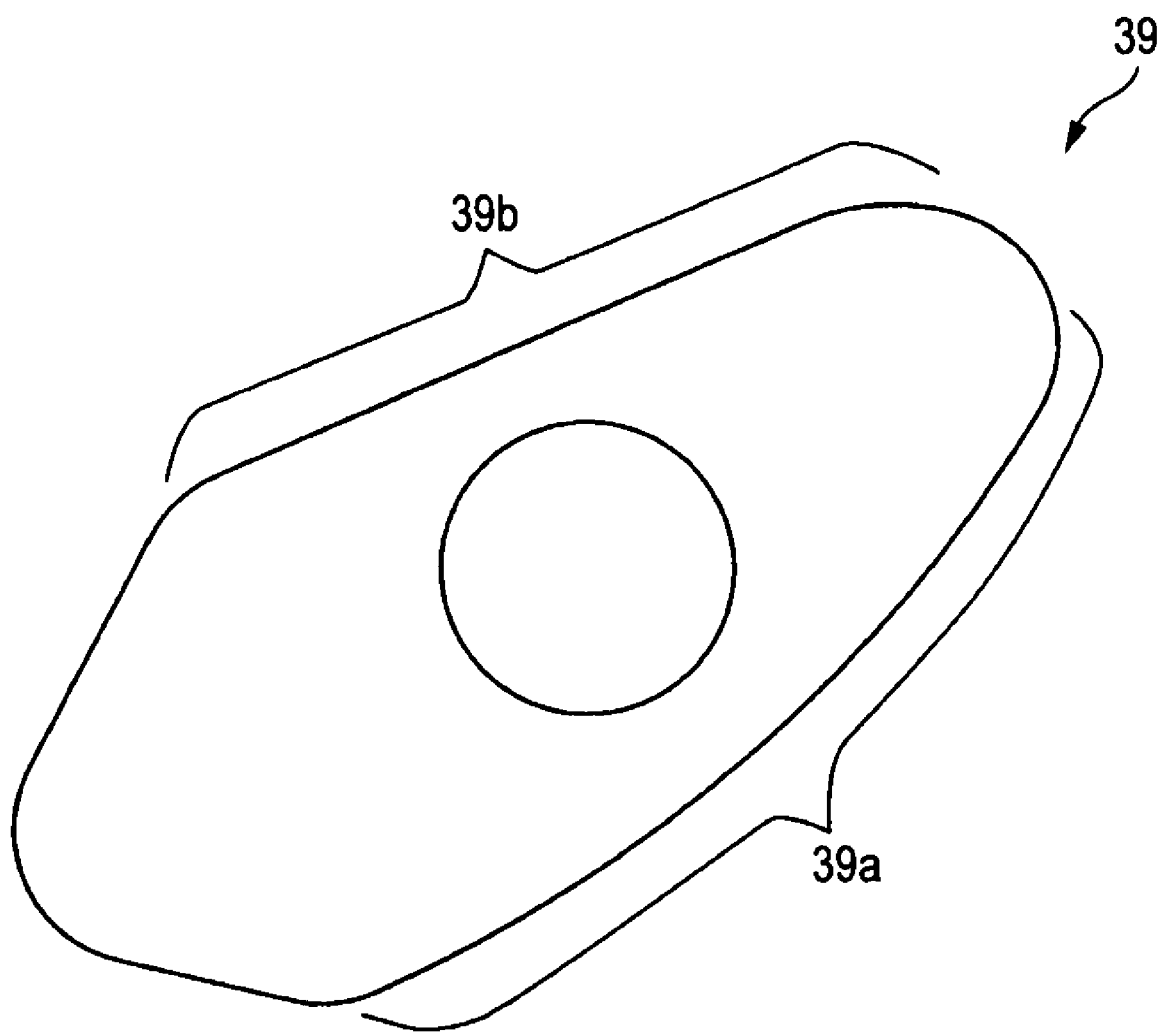
FIG. 12 shows an enlarged plan view depicting the subject pressure member.

In the state in which the eject lever 36 is supported by the chassis 12, as shown in FIGS. 3 and 5, the mounting pin 36a is mounted with a subject pressure member 39, and the subject pressure member 39 is positioned on the under surface side of the chassis 12. As shown in FIG. 12, the subject pressure member 39 is formed flat, having a switch pushing part 39a that has a gentle projecting curved surface partially except the rim surface, and a subject pressure part 39b that has a gentle projecting or recessed curved surface continuous to the switch pushing part 39a.

In the state in which the eject lever 36 is supported by the chassis 12, the control pin 36b is inserted into the action hole 29 of the drive lever 25 (see FIG. 5).

The eject lever 36 is rotated between a waiting position at which the disk recording medium 100 inserted into the disk insertion port 9a is waited by the disk holding part 37 and a drawing position at which the disk recording medium 100 held by the disk holding part 37 is drawn.

On the top surface side of the left part 13 of the chassis 12, a support lever 40 is rotatably supported (see FIGS. 3 to 5).

As shown in FIG. 11, the support lever 40 has a subject support plate part 41 and an arm part 42 that is protruded sideward from the subject support plate part 41, and a disk holding part 43 is provided at the tip end part of the arm part 42. The disk holding part 43 has a disk holding pin 43a that is protruded upward.

The subject support plate part 41 of the support lever 40 has subject guide pins 41a and 41a that are protruded downward.

The support lever 40 has a pivoting point at the end part opposite to the arm part 42 of the subject support plate part 41, in which the subject guide pins 41a and 41a are inserted into the first lever support hales 12b and 12b, respectively, and rotatably supported by the chassis 12.

In the state in which the support lever 40 is supported by the chassis 12, as discussed above, the extension coil spring 35 is supported between the subject support plate part 41 of the support lever 40 and the centering slider 31, and the support lever 40 is urged in the clockwise direction seen in a plane (see FIGS. 3 and 5).

The support lever 40 is rotated between a waiting position at which the disk recording medium 100 inserted into the disk insertion port 9a is waited by the disk holding part 43 and a drawing position at which the disk recording medium 100 held by the disk holding part 43 is drawn.

On the left end part of the chassis 12, a centering lever 44 that is extended from front to back is rotatably supported as the rear end part is the pivoting point (see FIGS. 3 to 5). The centering lever 44 is positioned along the left edge of the chassis 12.

Figure 10:
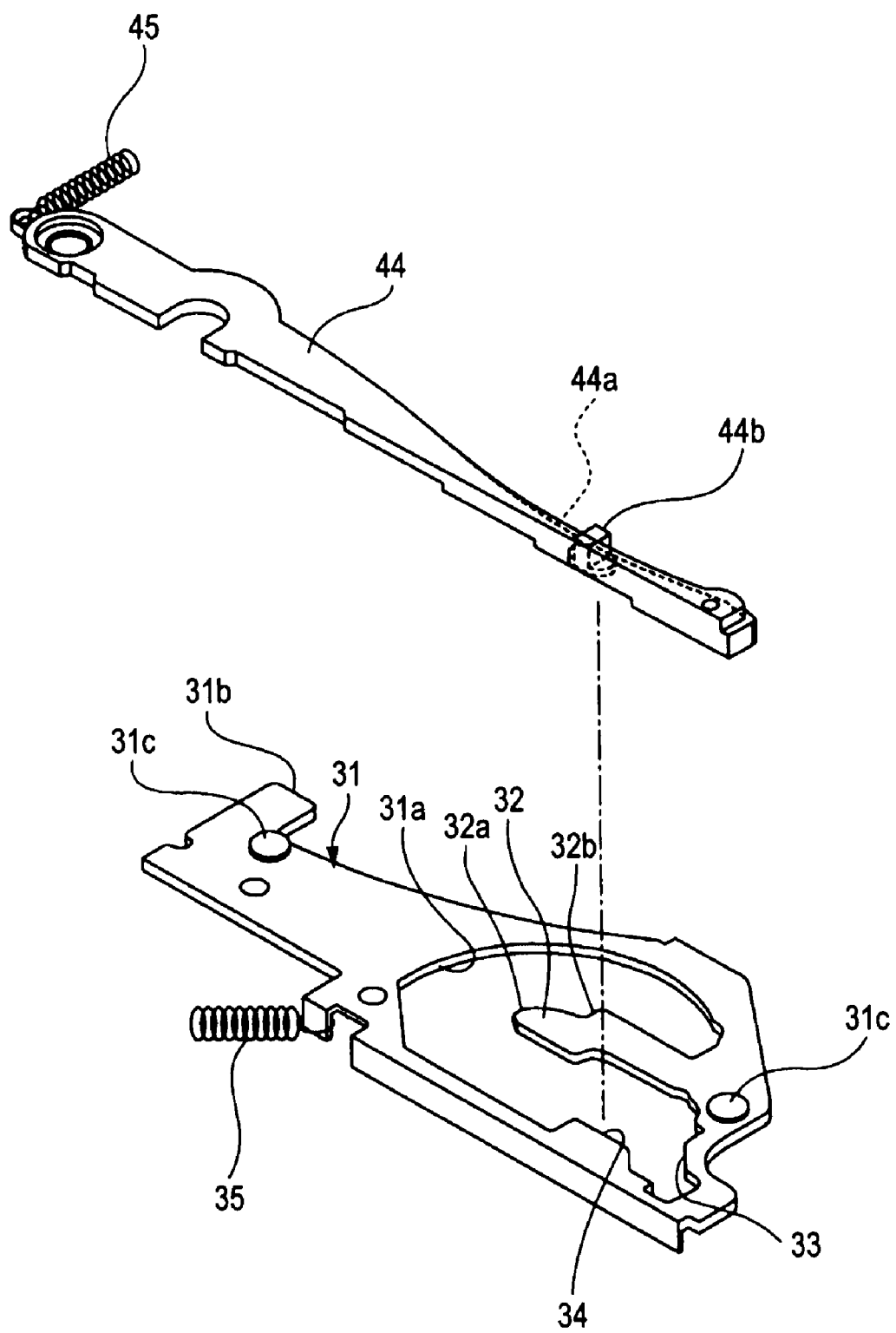
FIG. 10 shows an enlarged exploded perspective view depicting a centering slider and a centering lever.

As shown in FIG. 10, in the front half of the centering lever 44, a disk holding recessed part 44a is formed that is opened rightward. At the position close to the front end the centering lever 44, a subject action projecting part 44b is provided that is protruded rightward from the lower end part. The subject action projecting part 44b is positioned on the under surface side of the chassis 12 through a notch formed on the chassis 12.

A coil spring 45 is supported between the centering lever 44 and the chassis 12, and as shown in FIGS. 3 to 5, the centering lever 44 is urged in the direction in which the front end part is moved nearly leftward.

At the front end part of the left side surface of the lower shell 7, a guide member 46 is mounted that is extended from front to back (see FIGS. 3 to 5). The guide member 46 is formed with a disk guiding recessed part 46a that is opened rightward.

At the front end part of the right end part of the arrangement recessed part 11 of the lower shell 7, a cover 47 is mounted (see FIGS. 3 to 5), and the cover 47 covers the worm (gear), not shown, which is fixed to the motor shaft of the drive motor 19 and the reduction gear, not shown, which is geared with the worm (gear).

Figure 13:
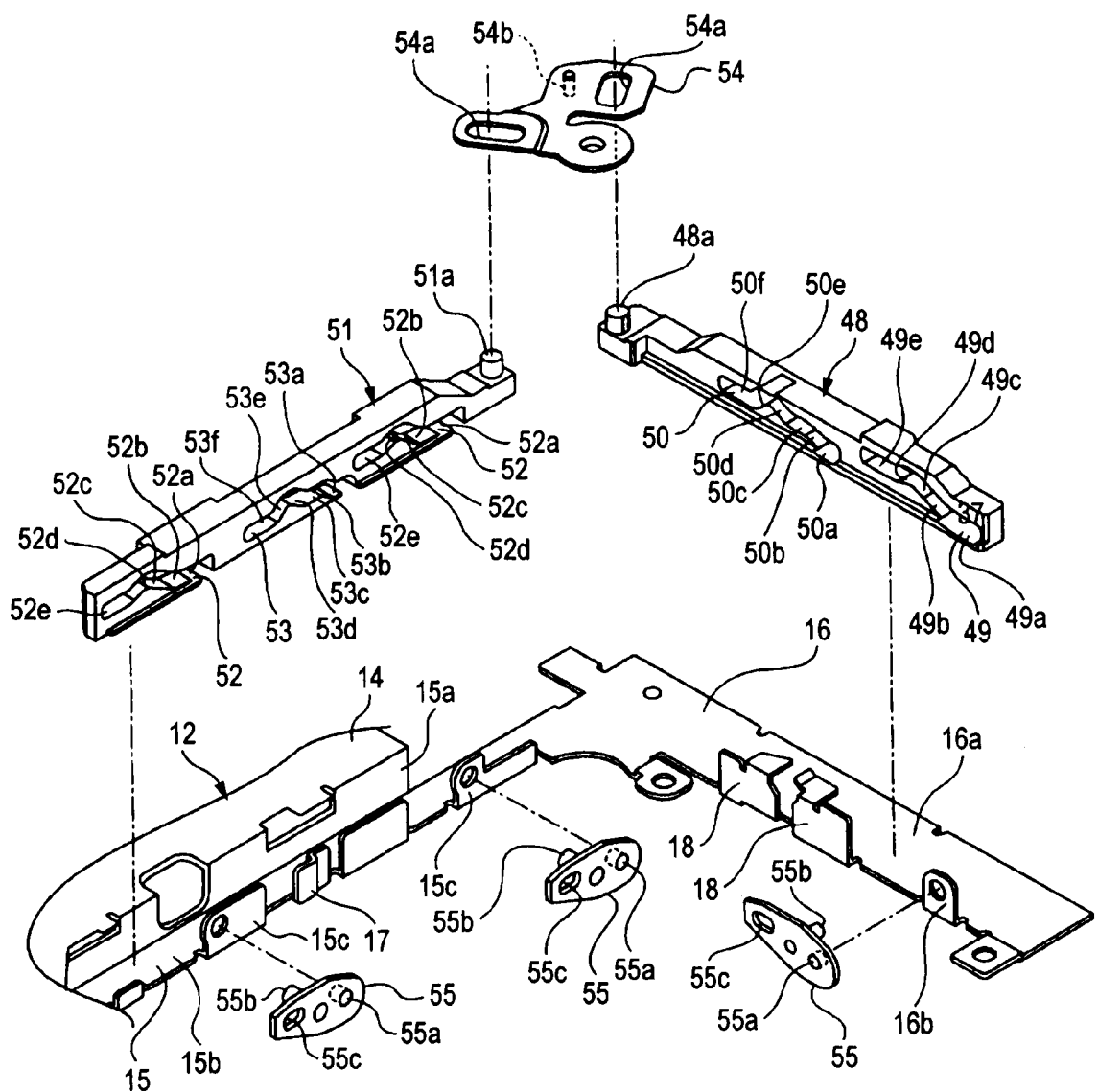
FIG. 13 shows an enlarged perspective view depicting a first cam slider, a second cam slider and a coupling lever along with a part of the chassis.

As shown in FIGS. 3 to 5, the second slider support part 16 of the chassis 12 has a first cam slider 48 that is extended from front to back and is movably supported in the longitudinal direction in the state in which the first cam slider 48 is retained by the slider retaining pieces 18 and 18. As shown in FIG. 13, at the rear end part of the first cam slider 48, a coupling shaft 48a is provided that is protruded upward.

The first cam slider 48 is formed with a cam part 49 that is opened leftward and a cam coupling part 50 separately from each other from front to back.

The cam part 49 has a first straight groove part 49a that is extended from front to back, a first slope groove part 49b that is extended obliquely toward the upper-rear side from the rear end of the first straight groove part 49a, a second slope groove part 49c that is extended obliquely toward the upper-rear side from the rear end of the first slope groove part 49b, a third slope groove part 49d that is extended obliquely toward the lower-rear side from the rear end of the second slope groove part 49c, and a third straight groove part 49e that is extended toward the rear side from the rear end of the third slope groove part 49d, in which the third straight groove part 49e is positioned on the upper side than the first straight groove part 49a is. The tilt angle of the second slope groove part 49c is formed greater than the tilt angle of the first slope groove part 49b.

The cam coupling part 50 has a first straight part 50a that is extended from front to back, a first slope part 50b that is extended obliquely toward the upper-rear side from the rear end of the first straight part 50a, a second straight part 50c that is extended toward the rear side from the rear end of the first slope part 50b, a second slope part 50d that is extended obliquely toward the upper-rear side from the rear end of the second straight part 50c, a third slope part 50e that is extended obliquely toward the lower-rear side from the rear end of the second slope part 50d, and a third straight part 50f that is extended toward the rear side from the rear end of the third slope part 50e, in which the second straight part 50c and the third straight part 50f are positioned on the upper side than the first straight part 50a is positioned, at the same height.

On the first slider support part 15 of the chassis 12, a second cam slider 51 that is extended from side to side is movably supported in the lateral direction (see FIGS. 3 to 5). At the right end part of the second cam slider 51, a coupling shaft 51a is provided that is protruded upward (see FIG. 13).

The second cam slider 51 has cam parts 52 and 52 that are formed separately from each other from side to side and opened forward, and a cam coupling part 53 that is positioned between the cam parts 52 and 52 and opened forward.

The cam part 52 has a first straight groove part 52a that is extended from front to back, a first slope groove part 52b that is extended obliquely toward the upper-rear side from the rear end of the first straight groove part 52a, a second slope groove part 52c that is extended obliquely toward the upper-rear side from the rear end of the first slope groove part 52b, a third slope groove part 52d that is extended obliquely toward the lower-rear side from the rear end of the second slope groove part 52c, and a third straight groove part 52e that is extended toward the rear side from the rear end of the third slope groove part 52d, in which the third straight groove part 52e is positioned on the upper side than the first straight groove part 52a is. The tilt angle of the second slope groove part 52c is formed greater than the tilt angle of the first slope groove part 52b.

The cam coupling part 53 has a first straight part 53a that is extended from front to back, a first slope part 53b that is extended obliquely toward the upper-rear side from the rear end of the first straight part 53a, a second straight part 53c that is extended toward the rear side from the rear end of the first slope part 53b, a second slope part 53d that is extended obliquely toward the upper-rear side from the rear end of the second straight part 53c, a third slope part 53e that is extended obliquely toward the lower-rear side from the rear end of the second slope part 53d, and a third straight part 53f that is extended toward the rear side from the rear end of the third slope part 53e, in which the second straight part 53c and the third straight part 53f is positioned on the upper side than the first straight part 53a at the same height.

At the portion positioned between the first cam slider 48 and the second cam slider 51 in the lower shell 7, a coupling lever 54 is rotatably supported (see FIGS. 3 to 5). As shown in FIG. 13, the coupling lever 54 has two long coupling holes 54a and 54a, in which the coupling shaft 48a of the first cam slider 48 and the coupling shaft 51a of the second cam slider 51 are slidably engaged with the coupling holes 54a and 54a. Thus, the first cam slider 48 is moved in the longitudinal direction, the coupling lever 54 is then rotated, and the second cam slider 51 is moved rightward or leftward in association with the rotation of the coupling lever 54 in synchronization with the first cam slider 48.

The coupling lever 54 is provided with a subject action shaft 54b that is protruded downward.

On the lever support piece parts 15c and 15c of the first slider support part 15 and the lever support piece part 16b of the second slider support part 16 of the chassis 12, up-and-down levers 55, 55 and 55 are rotatably supported, respectively.

The up-and-down lever 55 is formed in a plate facing in the horizontal direction, having a pivot part 55a, a cam coupling part 55b and a unit coupling part 55c, in which the cam coupling part 55b is positioned between the pivot part 55a and the unit coupling part 55c. The cam coupling part 55b is formed in a shaft, and the unit coupling part 55c is formed in a long hole.

In the up-and-down lever 55, the distance from the pivot part 55a to the unit coupling part 55c is formed longer than the distance from the pivot part 55a to the cam coupling part 55b. For example, the distance from the pivot part 55a to the unit coupling part 55c is about two times the distance from the pivot part 55a to the cam coupling part 55b.

In the up-and-down levers 55, 55 and 55, the pivot parts 55a, 55a and 55a are rotatably supported by the lever support piece parts 15c and 15c of the first slider support part 15 or the lever support piece part 16b of the second slider support part 16, and the cam coupling parts 55b, 55b and 55b are slidably coupled to the cam part 49 of the first cam slider 48 or the cam parts 52 and 52 of the second cam slider 51. Therefore, when the first cam slider 48 and the second cam slider 51 are moved, the positions of the cam coupling parts 55b, 55b and 55b with respect to the cam parts 49, 52 and 52 are changed, and the up-and-down levers 55, 55 and 55 are turned on the lever support piece parts 15c, 15c and 16b.

As shown in FIGS. 3 to 5, on the arrangement recessed part 11 of the lower shell 7, a pickup unit 56 is supported on the front side of the chassis 12 rotatably (freely up and down) in the direction in which the rear end part is moved vertically. The pickup unit 56 has a pickup base 57, and an optical pickup 58 that is movably supported by the pickup base 57 in the radial direction of the disk recording medium 100.

As shown in FIGS. 3 to 5, on the rim surface of the pickup base 57, coupling pins 57a and 57a are provided that are protruded to the right and rear sides. The coupling pins 57a and 57a are slidably coupled to the cam coupling parts 50 and 53 of the first cam slider 48 and the second cam slider 51, respectively. Thus, when the first cam slider 48 and the second cam slider 51 are moved, the positions of the coupling pins 57a and 57a to the cam coupling parts 50 and 53 are changed, and the coupling pins 57a and 57a are vertically rotated (up and down) in the direction in which the rear end part is moved.

The pickup base 57 has an arrangement hole 57b that is vertically opened to arrange the optical pickup 58 and a spindle motor, described later (see FIGS. 3 to 5).

Figure 14:
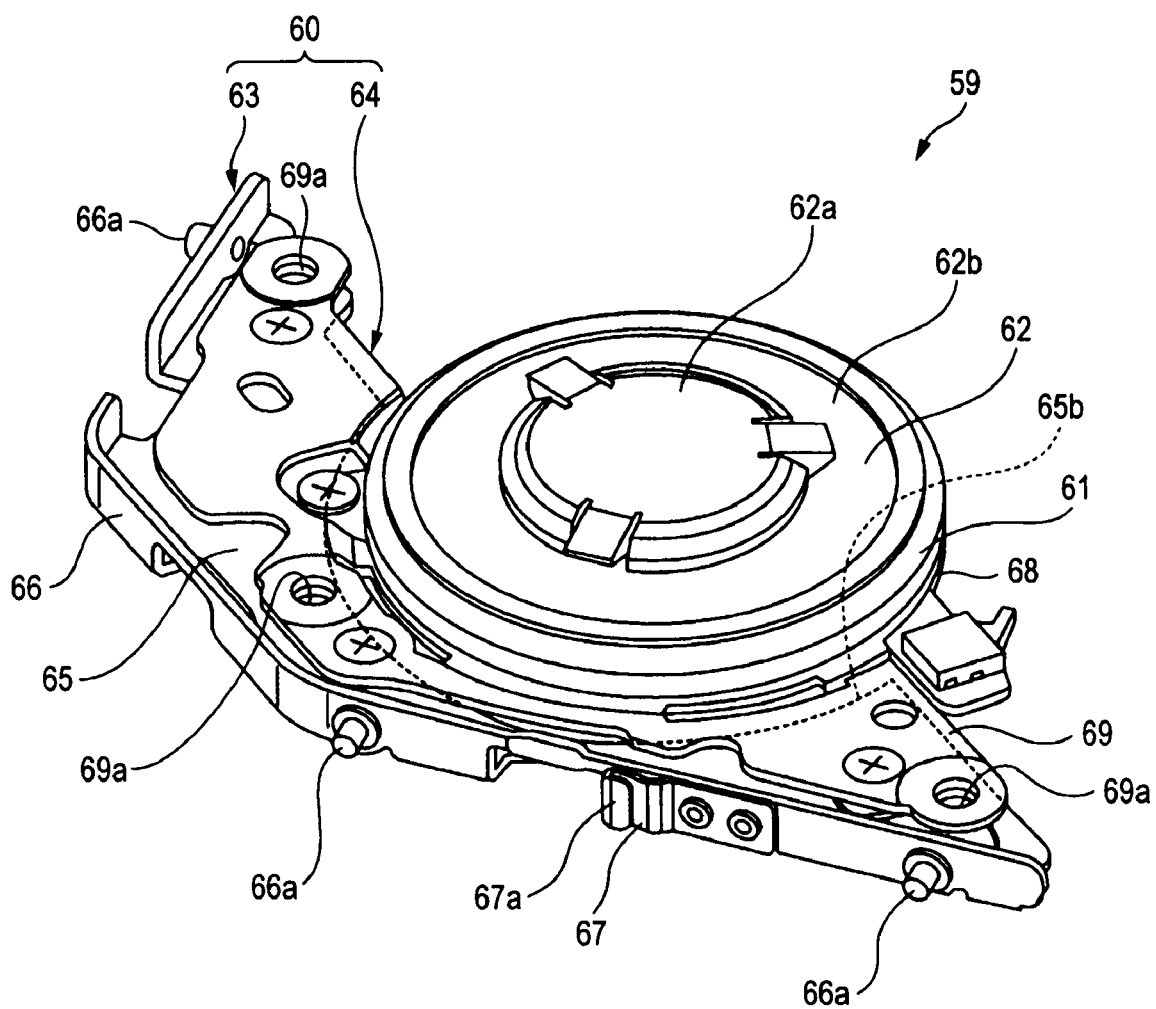
FIG. 14 shows an enlarged perspective view depicting a motor unit.

The up-and-down levers 55, 55 and 55 support a motor unit 59 (see FIGS. 3 to 5). As shown in FIG. 14, the motor unit 59 has a motor mounting base 60, a spindle motor 61 that is arranged on the motor mounting base 60, and a disk table 62 that is rotated by the spindle motor 61.

The disk table 62 has a centering projecting part 62a in the center part, and on the outer edge side of the centering projecting part 62a, a table part 62b is provided on which the disk recording medium 100 is placed.

The motor mounting base 60 has a base plate 63 and a mounting plate 64 that is supported on the base plate 63.

The base plate 63 has a supporting plate part 65 that faces in the vertical direction, and a side plate part 66 that is protruded upward from the front and right side edges of the supporting plate part 65. The supporting plate part 65 is formed with jig insertion holes 65a, 65a and 65a (see FIG. 15). The supporting plate part 65 is formed with a notch 65b in an arc shape nearly in the center part (see FIG. 14). The side plate part 66 is formed with shaft lever coupling parts 66a, 66a and 66a that are protruded outward.

On the outer face of the side plate part 66, an attitude hold plate spring 67 is mounted. A part of the attitude hold plate spring 67 is positioned as separated from the side plate part 66 toward the rear side, and the separated portion is formed as a subject holding part 67a.

Figure 15:
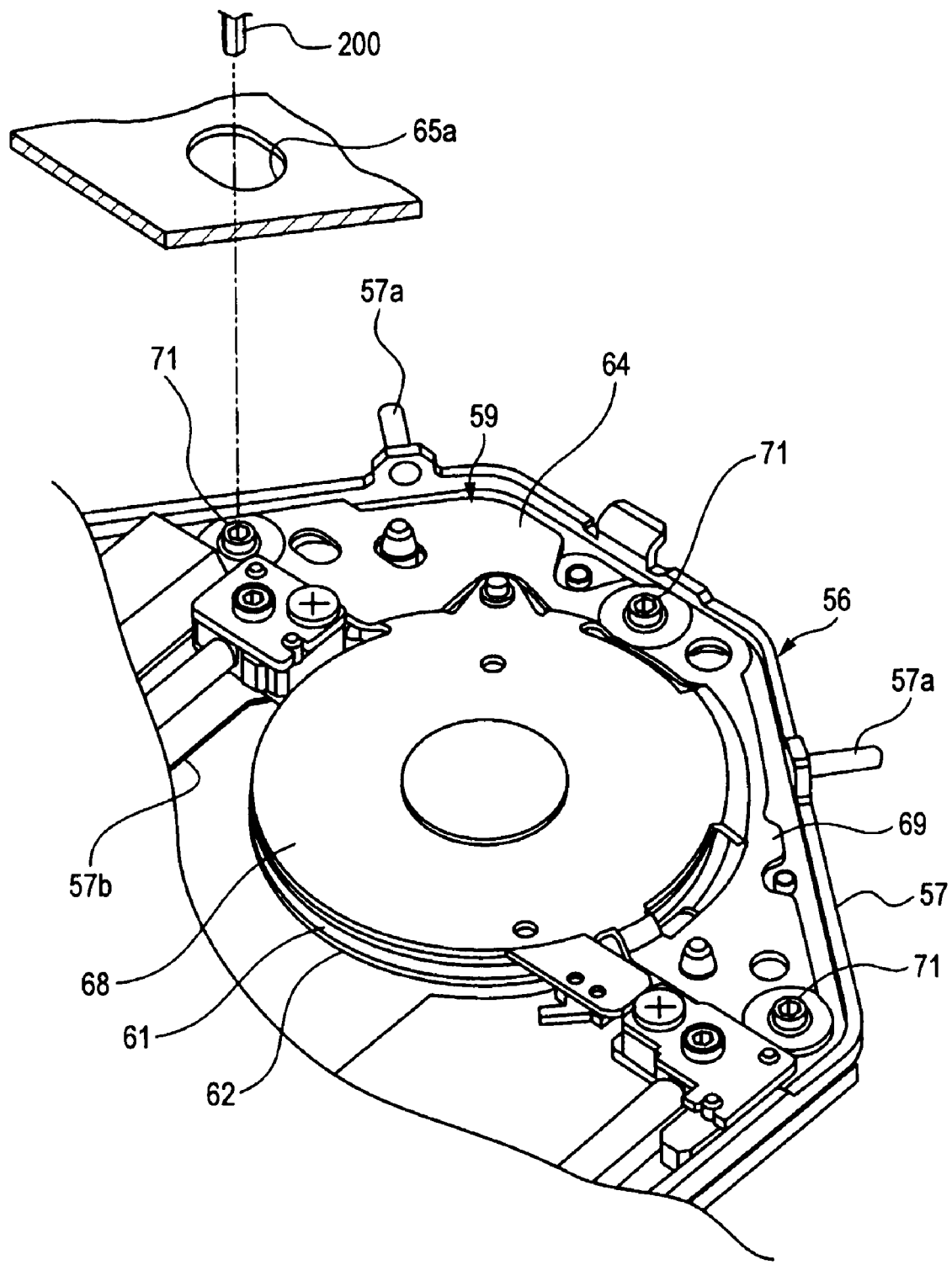
FIG. 15 shows an enlarged perspective view partially depicting the rear side of the pickup unit and the motor unit.
Figure 16:
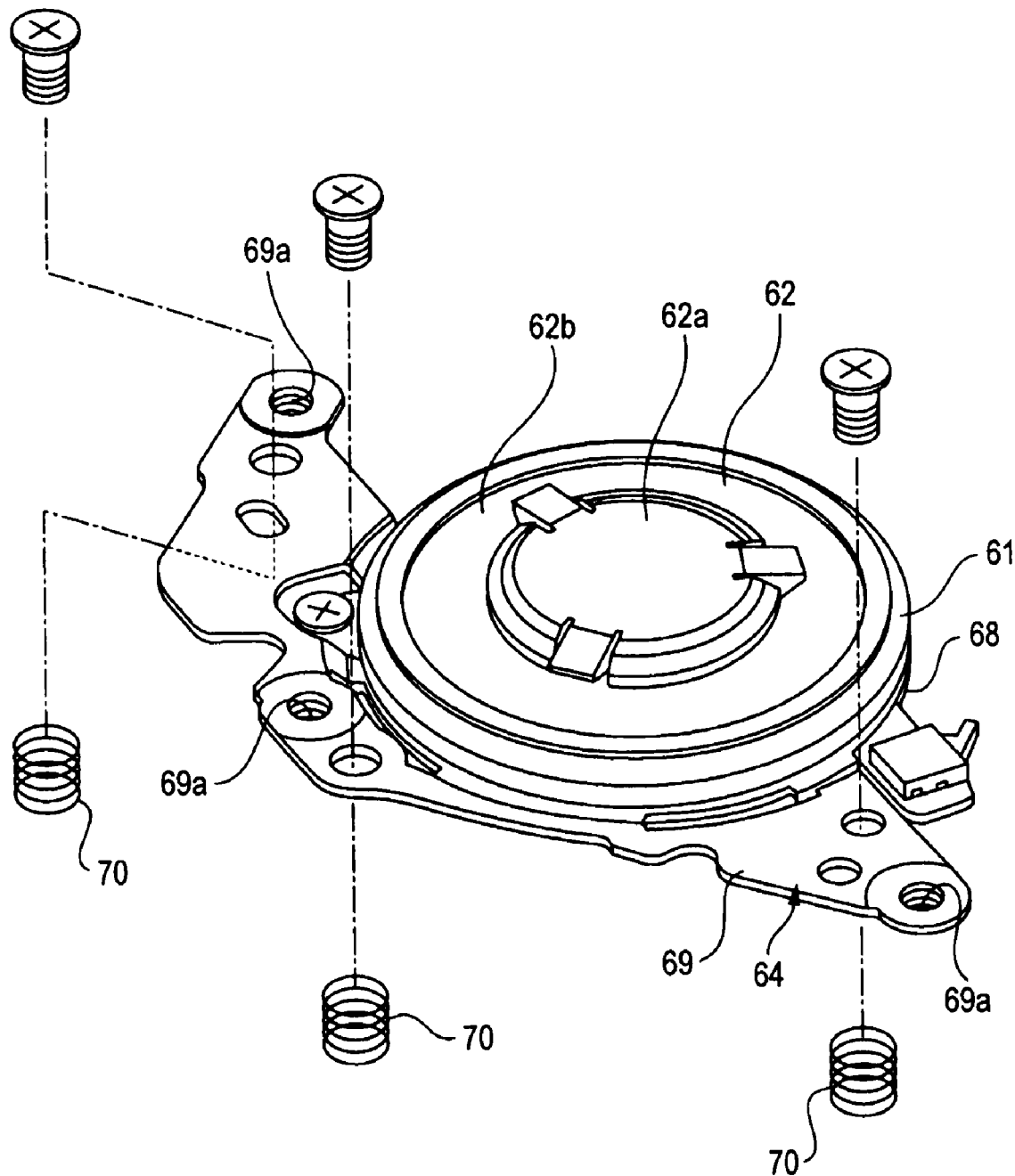
FIG. 16 shows an enlarged perspective view depicting the motor unit with a base plate removed.

As shown in FIGS. 14 to 16, the mounting plate 64 has a motor mounting part 68 that is formed in a nearly disk shape and a subject support part 69 that is positioned on the outside of the motor mounting part 68, which are formed in one piece with each other. The mounting plate 64 is supported by the base plate 63 in which the motor mounting part 68 is positioned as corresponding to the notch 65b of the base plate 63, the subject support part 69 is positioned on the supporting plate part 65, and spring members 70, 70 and 70 that are compressed coil springs are placed between the supporting plate part 65 (see FIGS. 14 and 16). Since the mounting plate 64 is supported by the base plate 63 through the spring members 70, 70 and 70, the mounting plate 64 can be displaced with respect to the base plate 63 in the vertical direction, and is supported by the base plate 63 as urged upward.

On the subject support part 69 of the mounting plate 64, adjusting parts 69a, 69a and 69a are formed, and the adjusting parts 69a, 69a and 69a have a screw groove, which are screw holes opened in the vertical direction (see FIGS. 14 and 16).

Figure 17:
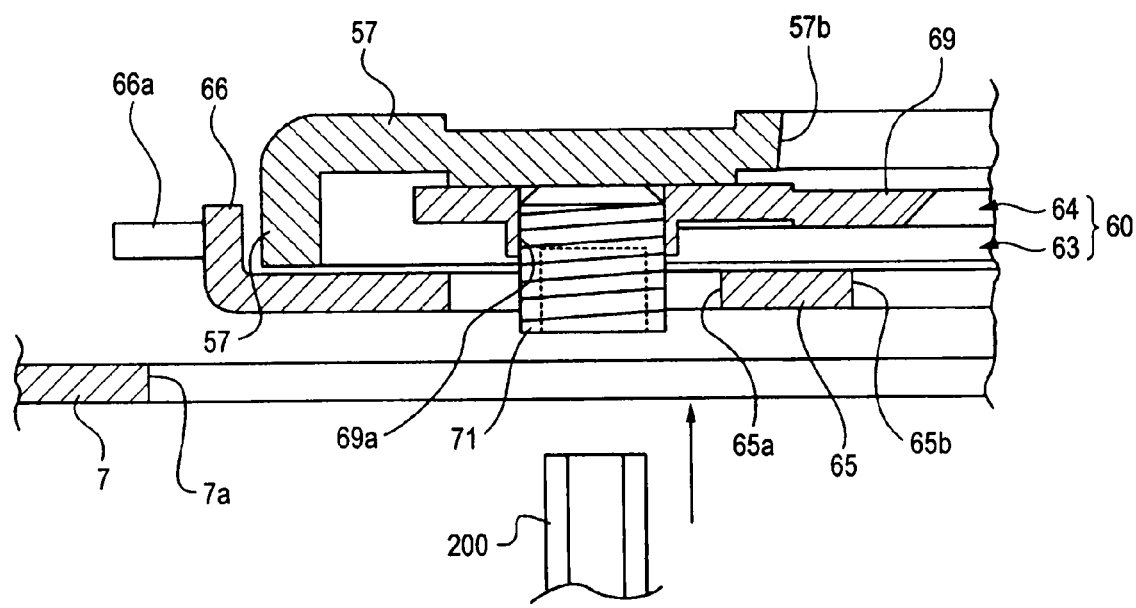
FIG. 17 shows an enlarged cross section depicting the pickup unit and the motor unit.

In the state in which the mounting plate 64 is supported on the base plate 63, the adjusting parts 69a, 69a and 69a are positioned directly above the jig insertion holes 65a, 65a and 65a of the base plate 63 (see FIG. 17).

On the motor mounting part 68 of the mounting plate 64, the spindle motor 61 is mounted (see FIGS. 14 and 16).

In the motor unit 59, the lever coupling parts 66a, 66a and 66a of the base plate 63 are slidably engaged with the unit coupling parts 55c, 55c and 55c of the up-and-down levers 55, 55 and 55, respectively. Thus, when the first cam slider 48 and the second cam slider 51 are moved and the positions of the cam coupling parts 55b, 55b and 55b with respect to the cam parts 49, 52 and 52 are changed to rotate the up-and-down levers 55, 55 and 55, the motor unit 59 is moved in the vertical direction.

In the state in which the motor unit 59 is supported by the up-and-down levers 55, 55 and 55, the spindle motor 61 and the disk table 62 are positioned as corresponding to the rear end part of the arrangement hole 57b in the pickup base 57 of the pickup unit 56. At this time, below the motor mounting base 60, the opening 7a of the lower shell 7 is positioned.

Figure 18:
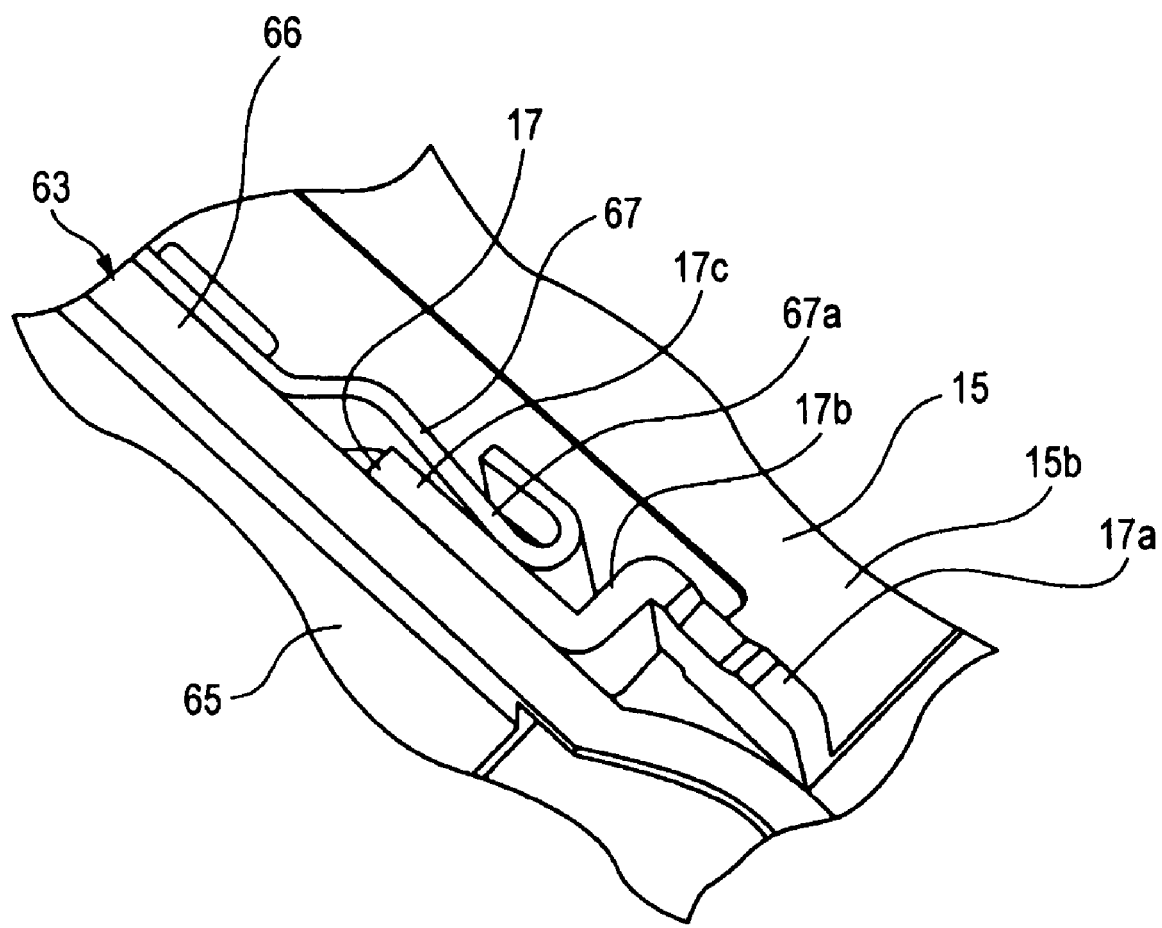
FIG. 18 shows an enlarged perspective view depicting the holding state of an attitude hold plate spring.

In addition, in the state in which the motor unit 59 is supported by the up-and-down levers 55, 55 and 55, as shown in FIG. 18, the holding part 16c of the spring holding part 16 provided on the first slider support part 15 of the chassis 12 is inserted between the subject holding part 67a of the attitude hold plate spring 67 mounted on the motor mounting base 60 and the side plate part 66 of the motor mounting base 60 as the holding part 16c is clamped therebetween, and when the motor unit 59 is moved in the vertical direction, the attitude hold plate spring 67 is slid with the holding part 16c and the side plate part 66.

Therefore, the spindle motor 61 and the disk table 62 can be prevented from leaning (inclining).

Both of the pickup unit 56 and the motor unit 59 are moved in the vertical direction, and are moved up and down together in the midway of moving. Thus, when they are together moved up and down, the top face of the mounting plate 64 of the motor mounting base 60 is contacted with the under face of the pickup base 57. In addition, also in the state in which the disk recording medium 100 is mounted on the disk table 62, the top face of the mounting plate 64 of the motor mounting base 60 is contacted with the under face of the pickup base 57.

At this time, since the motor mounting base 60 is configured in which the spring members 70, 70 and 70 allow the mounting plate 64 to be displacable with respect to the base plate 63, the top face of the mounting plate 64 is pushed against the under face of the pickup base 57 in the state of surface contact. Therefore, it can be intended to stabilize the state of the mounting plate 64 contacting with the pickup base 57.

As described above, since the pickup unit 56 and the motor unit 59 become in one piece, it is necessary to maintain the table part 62b of the disk table 62 horizontal with respect to the pickup base 57 in the disk drive apparatus 5. This horizontal state can be maintained by conducting adjustment as below.

The adjustment is conducted in such a state in which as the pickup unit 56 is supported by the lower shell 7 and the motor unit 59 is supported by the up-and-down levers 55, 55 and 55, the first cam slider 48 and the second cam slider 51 are operated to bring the mounting plate 64 of the motor unit 59 into contact with the pickup base 57 of the pickup unit 56 from the under side.

As shown in FIG. 17, the adjustment is conducted in such a way that adjusting screws 71, 71 and 71 are rotated with respect to the adjusting parts 69a, 69a and 69a of the mounting plate 64. When the adjusting screws 71, 71 and 71 are rotated, the position of the mounting plate 64 with respect to the base plate 63 is displaced because the top end surfaces of the adjusting screws 71, 71 and 71 are contacted with the under face of the pickup base 57. At this time, a measuring device such as a gage is used to rotate the adjusting screws 71, 71 and 71 each screwed with the adjusting parts 69a, 69a and 69a so that the table part 62b of the disk table 62 is made horizontal with respect to the pickup base 57.

In adjustment, although the adjusting screws 71, 71 and 71 are rotated with a jig 200 such as a driver, in the disk drive apparatus 5, in the state in which the pickup unit 56 is supported by the lower shell 7 and the motor unit 59 is supported by the up-and-down levers 55, 55 and 55, the jig 200 such as a driver is inserted into the opening 7a of the lower shell 7 and the jig insertion holes 65a, 65a and 65a of the base plate 63 from the under side to rotate the adjusting screws 71, 71 and 71.

As discussed above, in the disk drive apparatus 5, since the position of the disk table 62 can be adjusted with respect to the pickup base 57 in the state in which the pickup unit 56 is supported by the lower shell 7 and the motor unit 59 is supported by the up-and-down levers 55, 55 and 55, real time adjustment can be conducted, and simple adjustment work can be intended.

Below the chassis 12, a circuit board, not shown, is arranged, and as shown in FIG. 5, an activating switch 72 and detecting switches 73 and 74 are mounted on the circuit board. The activating switch 72 is positioned nearly at the center part of the arrangement recessed part 11 of the lower shell 7 in the lateral direction, and the detecting switches 73 and 74 are positioned separately from each other from front to back at the positions close to the right end of the arrangement recessed part 11. The activating switch 72 and the detecting switches 73 and 74 are all placed behind the pickup unit 56.

Hereinafter, the operation of the disk drive apparatus 5 in loading and ejecting the disk recording medium 100 will be described. (see FIGS. 19 to 40). In addition, in the discussion below, the rotating direction of the individual components will be described according to R1 and R2 directions shown in each drawing. The R1 direction is the clockwise direction seen in a plane, and the R2 direction is the counterclockwise direction seen in a plane.

Figure 19:
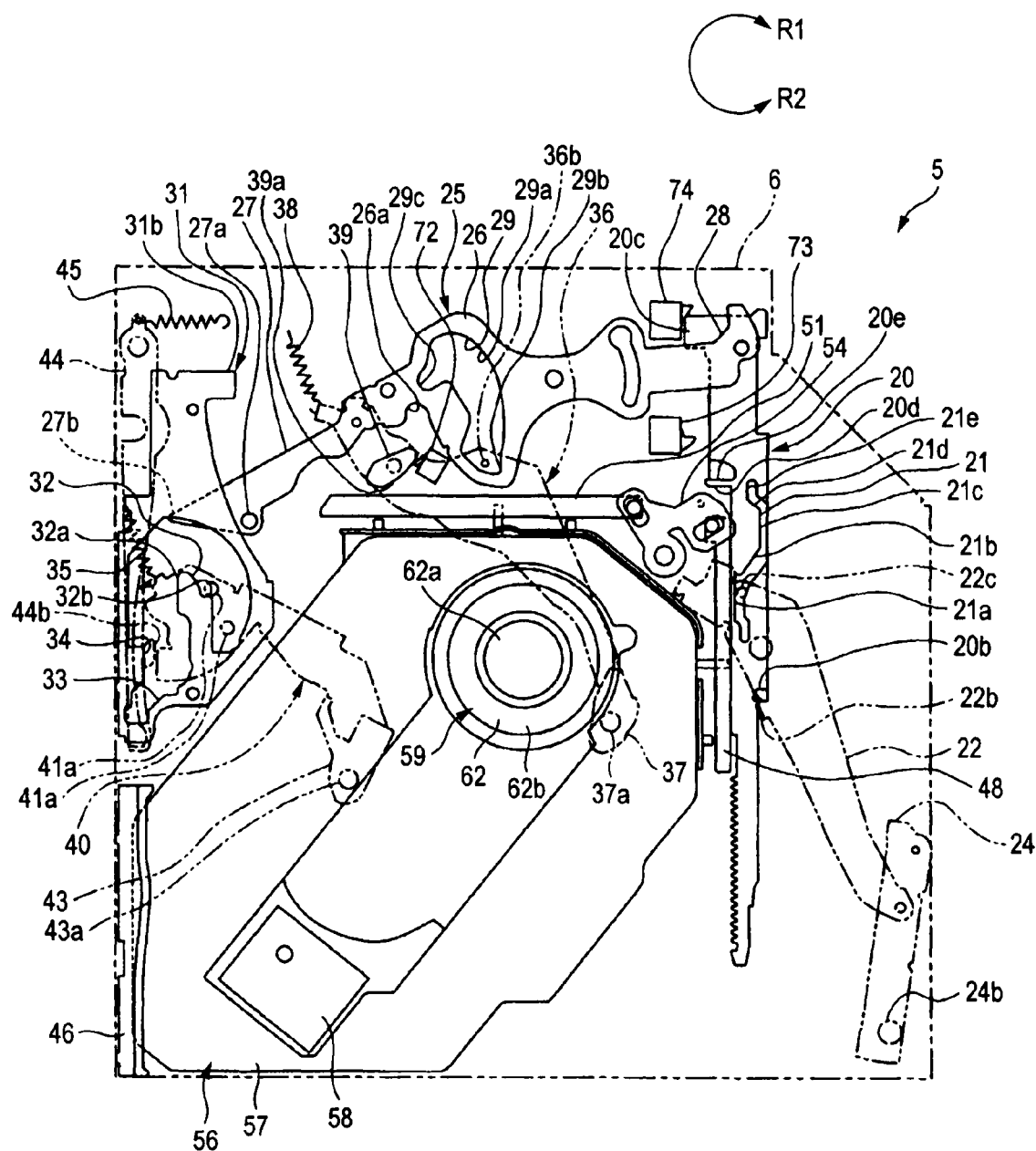
FIG. 19 shows the operation of the disk drive apparatus together with FIGS. 20 to 40, showing a plan view schematically depicting the initial state.
Figure 20:
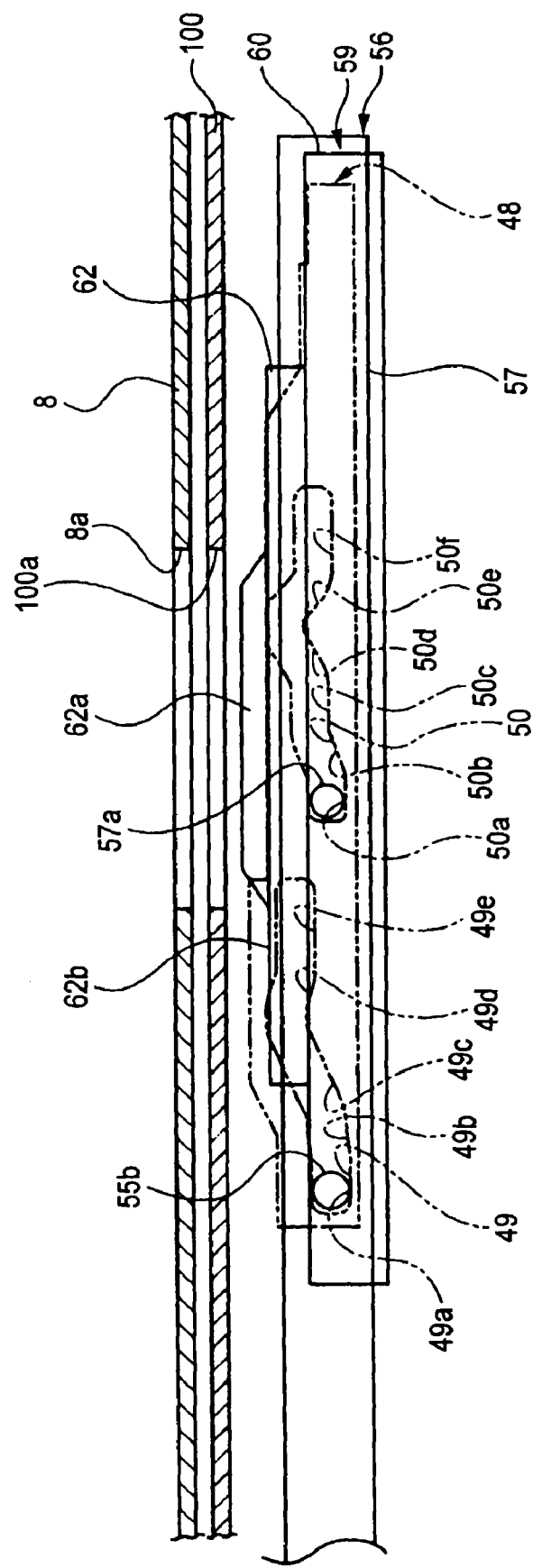
FIG. 20 shows a side view schematically depicting the initial state.

First, the initial state of the individual components will be described before the disk recording medium 100 is inserted into the disk insertion port 9a of the front panel 9 (see FIG. 19 to 21).

The slider 20 is positioned at the moving end on the rear side, and the subject pressure shaft 22c of the rotating lever 22 is engaged with the front straight part 21a of the shaft slide groove 21. At this time, the rotating lever 22 is positioned close to the rotating end in the R2 direction, and the loading lever 24 coupled to the rotating lever 22 is also positioned close to the rotating end in the R2 direction.

The switch pushing part 20c of the slider 20 operates the detecting switch 74 positioned therebehind.

Since the slider 20 is positioned at the moving end on the rear side, the drive lever 25 is positioned at the rotating end in the R2 direction.

The centering slider 31 is positioned at the front moving end by the urging force of the extension coil spring 35 supported between the centering slider 31 and the support lever 40.

The eject lever 36 is at the waiting position that is the rotating end in the R1 direction by the urging force of the urging spring 38 supported by the eject lever 36 and the chassis 12, and the control pin 36b is positioned at the front end part of the action hole 29 of the drive lever 25. At this time, the eject lever 36 is partially positioned above the table part 62b of the disk table 62 and the pickup base 57, and the disk holding part 37 is positioned in the right-front side of the centering projecting part 62a of the disk table 62.

The switch pushing part 39a of the subject pressure member 39 mounted on the eject lever 36 operates the activating switch 72. At this time, the drive motor 19 is not activated.

The support lever 40 is at the waiting position that is the rotating end in the R1 direction by the urging force of the extension coil spring 35 supported between the support lever 40 and the centering slider 31, and one of the subject guide pins 41a is engaged with the lock edge part 32b of the centering slider 31 and retained at the rotating end in the R1 direction. At this time, the armpart 42 of the support lever 40 is positioned above the pickup base 57, and the disk holding part 37 is positioned in the left-front side of the centering projecting part 62a of the disk table 62. The disk holding part 43 of the support lever 40 is positioned slightly in the front side more than the disk holding part 37 of the eject lever 36 is.

The straight action part 34 of the centering slider 31 is engaged with the subject action projecting part 44b of the centering lever 44 from the left side, and the centering lever 44 is positioned at the rotating end in the R2 direction against the urging force of the coil spring 45 supported between the centering lever 44 and the chassis 12.

The first cam slider 48 is positioned at the moving end on the rear side. Therefore, as shown in FIG. 20, the coupling pin 57a of the pickup unit 56 is engaged with the first straight part 50a of the cam coupling part 50, and the cam coupling part 55b of the up-and-down lever 55 is engaged with the first straight groove part 49a of the cam part 49.

The second cam slider 51 is positioned at the left moving end. Thus, the coupling pin 57a of the pickup unit 56 is engaged with the first straight part 53a of the cam coupling part 53, and the cam coupling parts 55b and 55b of the up-and-down lever 55 are engaged with the first straight groove parts 52a and 52a of the cam parts 52 and 52, respectively.

In addition, for the ascending and descending of the pickup unit 56 and the motor unit 59, since the cam coupling parts 55b, 55b and 55b of the up-and-down lever 55 and the coupling pins 57a, 57a and 57a of the pickup base 57 are coupled at the positions corresponding to the cam parts 49, 52 and 52 and the cam coupling parts 50 and 53 of the first cam slider 48 and the second cam slider 51, only the coupling state in the first cam slider 48 is shown in the individual drawings (see FIGS. 20, 21, and 28 to 34).

Figure 21:
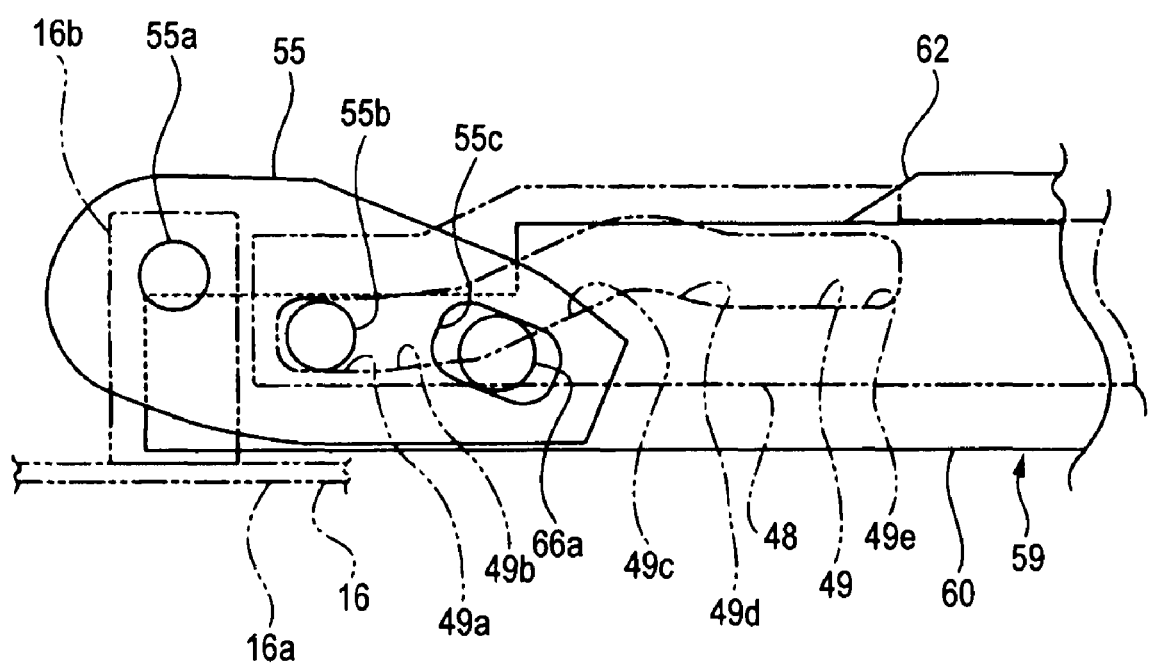
FIG. 21 shows an enlarged side view schematically depicting the initial state of an up-and-down lever.

As shown in FIG. 21, in the up-and-down lever 55, the cam coupling parts 55b, 55b and 55b are coupled to the first straight groove part 49a of the cam part 49 in the first cam slider 48 and the first straight groove parts 52a and 52a of the cam parts 52 and 52 in the second cam slider 51, respectively, and the unit coupling parts 55c, 55c and 55c are coupled to the lever coupling parts 66a, 66a and 66a provided on the base plate 63 of the motor unit 59, respectively.

The pickup unit 56 is tilted as lowered to the back, and the motor unit 59 is positioned at the lower moving end. At this time, the motor mounting base 60 of the motor unit 59 is positioned below the pickup base 57 of the pickup unit 56 apart from each other.

Figure 22:
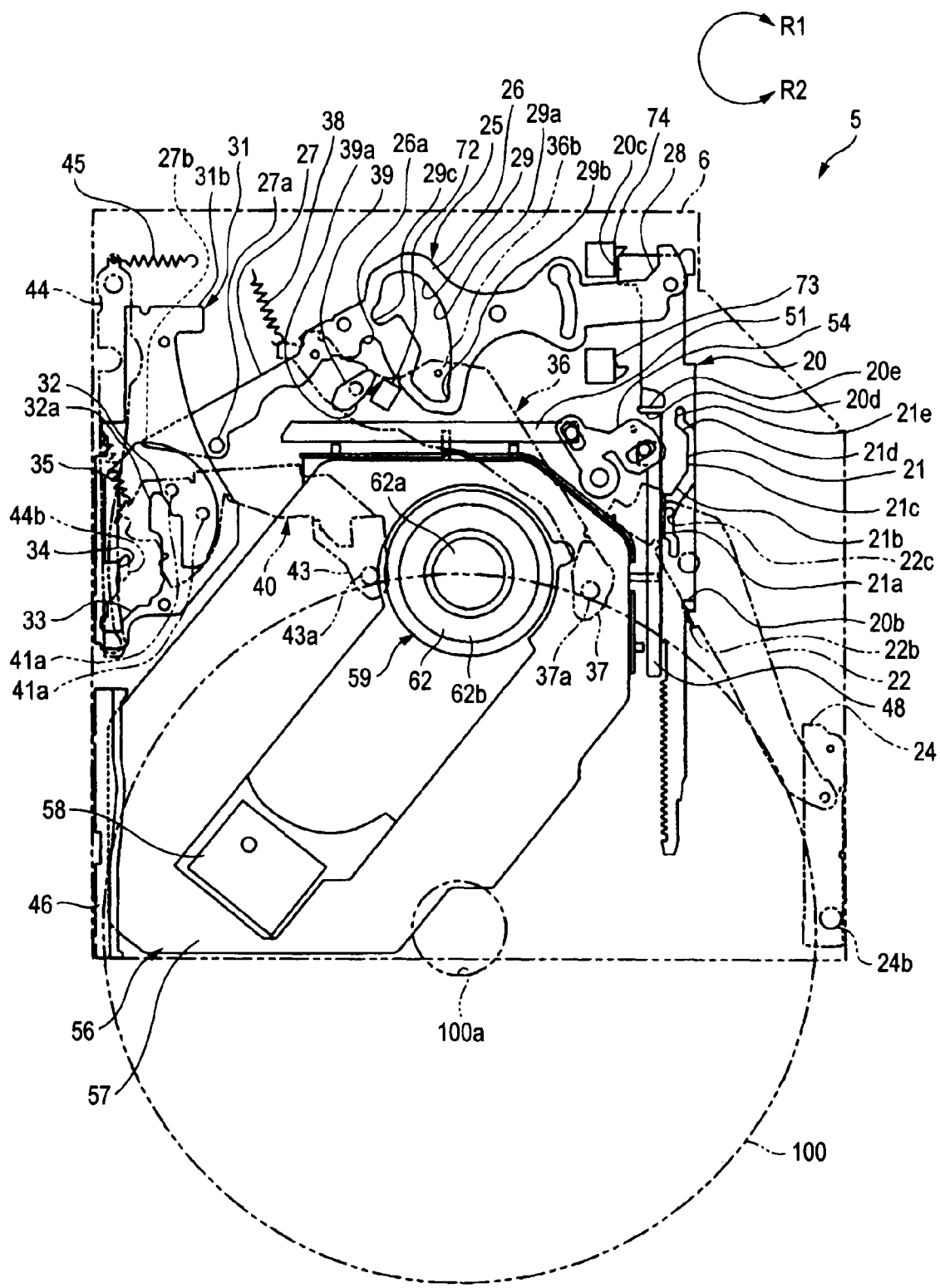
FIG. 22 shows a plan view schematically depicting the state in which the disk recording medium is being inserted into the disk insertion port.

In the initial state described above, when the disk recording medium 100 is manually inserted into the disk insertion port 9a of the front panel 9, as shown in FIG. 22, the rim surface of the disk recording medium 100 is contacted with the disk holding pin 43a of the disk holding part 43 in the support lever 40, and held by the disk holding part 43. The disk holding pin 43a of the support lever 40 is pushed by the disk recording medium 100, and rotated in the R2 direction.

In addition, in both of the insertion and ejection of the disk recording medium 100 from the disk insertion port 9a, the rim part of the disk recording medium 100 is slidably contacted and guided with the disk guiding recessed part 46a of the guide member 46, and moved in the longitudinal direction.

The disk recording medium 100 being inserted into the disk insertion port 9a is contacted with the roller 24b of the loading lever 24, and the loading lever 24 is rotated in the R2 direction in association with the insertion of the disk recording medium 100 against the urging force of the torsion coil spring 23. At this time, in association with the rotation of the loading lever 24, the rotating lever 22 is also turned around in the R2 direction.

Figure 23:
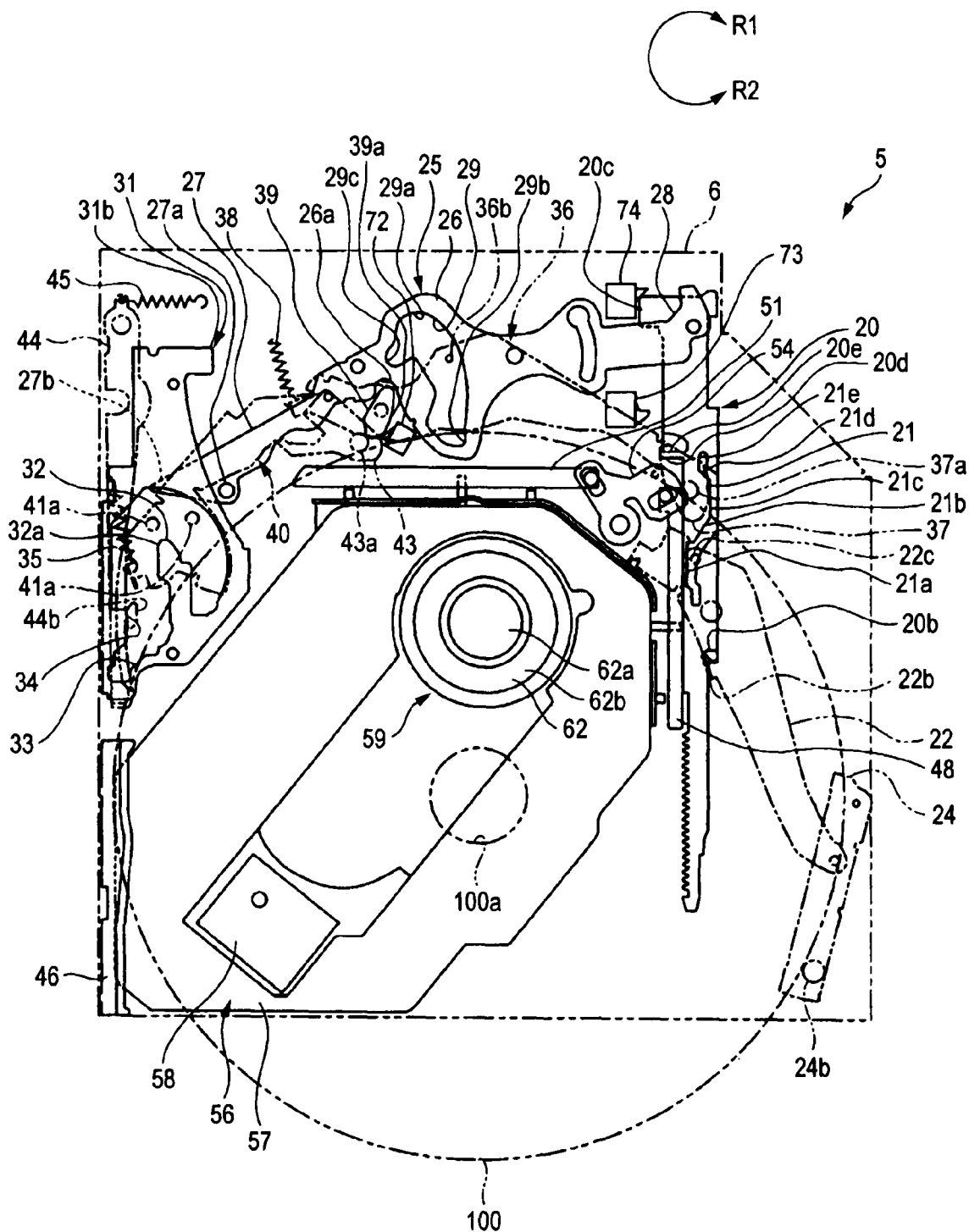
FIG. 23 shows a plan view schematically depicting the state in which the drive motor is started to rotate in the normal direction subsequent to FIG. 22.

As shown in FIG. 23, the rim surface of the disk recording medium 100 is contacted with the disk holding pin 37a of the disk holding part 37 of the eject lever 36, and held by the disk holding part 43 of the support lever 40 and the disk holding part 37 of the eject lever 36. In the eject lever 36, the disk holding pin 37a is pushed by the disk recording medium 100, and turned around in the R2 direction.

When the disk recording medium 100 is inserted into the disk insertion port 9a, as discussed above, the disk recording medium 100 is held by the disk holding parts 37 and 43 positioned on the front side of the centering projecting part 62a of the disk table 62.

Thus, since the disk recording medium 100 is held by the disk holding parts 37 and 43 positioned from side to side on the front side of the centering projecting part 62a, even though the disk recording medium 100 is obliquely inserted into the disk insertion port 9a while the disk recording medium 100 is supposed to be horizontally inserted, the disk recording medium 100 is not contacted with the disk table 62 or the pickup base 57, and the disk recording medium 100 can be prevented from being damaged.

In addition, even though a disk recording medium having a small diameter, for example, a disk recording medium having a diameter of about eight centimeters is accidentally inserted into the disk insertion port 9a, since the two disk holding parts 37 and 43 are positioned separately from each other from side to side on the front side of the centering projecting part 62a, the possibility of contacting the disk recording medium 100 with the disk table 62 or the pickup base 57 can be reduced.

In addition, since it is unnecessary to position the eject lever 36 above the disk table 62 or the pickup base 57 as greatly separated therefrom in order to prevent the disk recording medium 100 from being damaged, the disk drive apparatus 5 can be intended to reduce the thickness.

In addition, in the disk drive apparatus 5, the disk recording medium 100 inserted into the disk insertion port 9a is first held by the disk holding part 43 of the support lever 40, and then held by the disk holding part 37 of the eject lever 36. However, in the reverse manner, the positions of the eject lever 36 and the support lever 40 may be changed in such a way that the disk recording medium 100 is first held by the disk holding part 37 of the eject lever 36, and then held by the disk holding part 43 of the support lever 40. In addition, the positions of the eject lever 36 and the support lever 40 may be set in such a way that the disk recording medium 100 is held by the disk holding part 43 of the support lever 40 and the disk holding part 37 of the eject lever 36 at the same time.

Furthermore, when the disk recording medium 100 is being inserted into the apparatus and is being moved to the rear side, as shown in FIG. 22, the center of the disk recording medium 100 is moved to the rear side by the roller 24b of the loading lever 24, the loading lever 24 is rotated in the R1 direction by the urging force of the torsion coil spring 23, and the disk recording medium 100 is pushed toward the rear side by the roller 24b. At this time, the disk holding pins 37a and 43a are pushed by the disk recording medium 100 to rotate the eject lever 36 and the support lever 40 in the R2 direction.

When the support lever 40 is rotated, it is slid over the chassis 12. At this time, the support lever 40 is slid over the slide rails 13a, 13a and 13a chased upward. Thus, the subject guide pins 31c and 31c of the centering slider 31 supported by the slider support holes 12a and 12a of the chassis 12 or the subject support pins 27a and 27a of the drive lever 25 supported by the second lever support hales 12c and 12c are not contacted with the support lever 40, and it can be intended to smooth the motion of the support lever 40 and to improve the reliability of the operation thereof.

When the eject lever 36 is rotated in the R2 direction, the control pin 36b is moved in the action hole 29 of the drive lever 25.

When the eject lever 36 is rotated in the R2 direction and the disk recording medium 100 is turned to a predetermined position, as shown in FIG. 23, the operation of the switch pushing part 39a of the subject pressure member 39 to the activating switch 72 is released to rotate the drive motor 19 in one direction (in the normal direction of rotation).

After the drive motor 19 is activated, since the disk recording medium 100 is loaded by the drive force of the drive motor 19, it is unnecessary for a user to manually insert the disk recording medium 100.

The drive motor 19 is rotated to transmit its drive force to the slider 20, and then the slider 20 is moved forward. The slider 20 is moved forward by the rotation of the drive motor 19, and then the operation of the switch pushing part 20c of the slider 20 to the detecting switch 74 is released.

Figure 24:
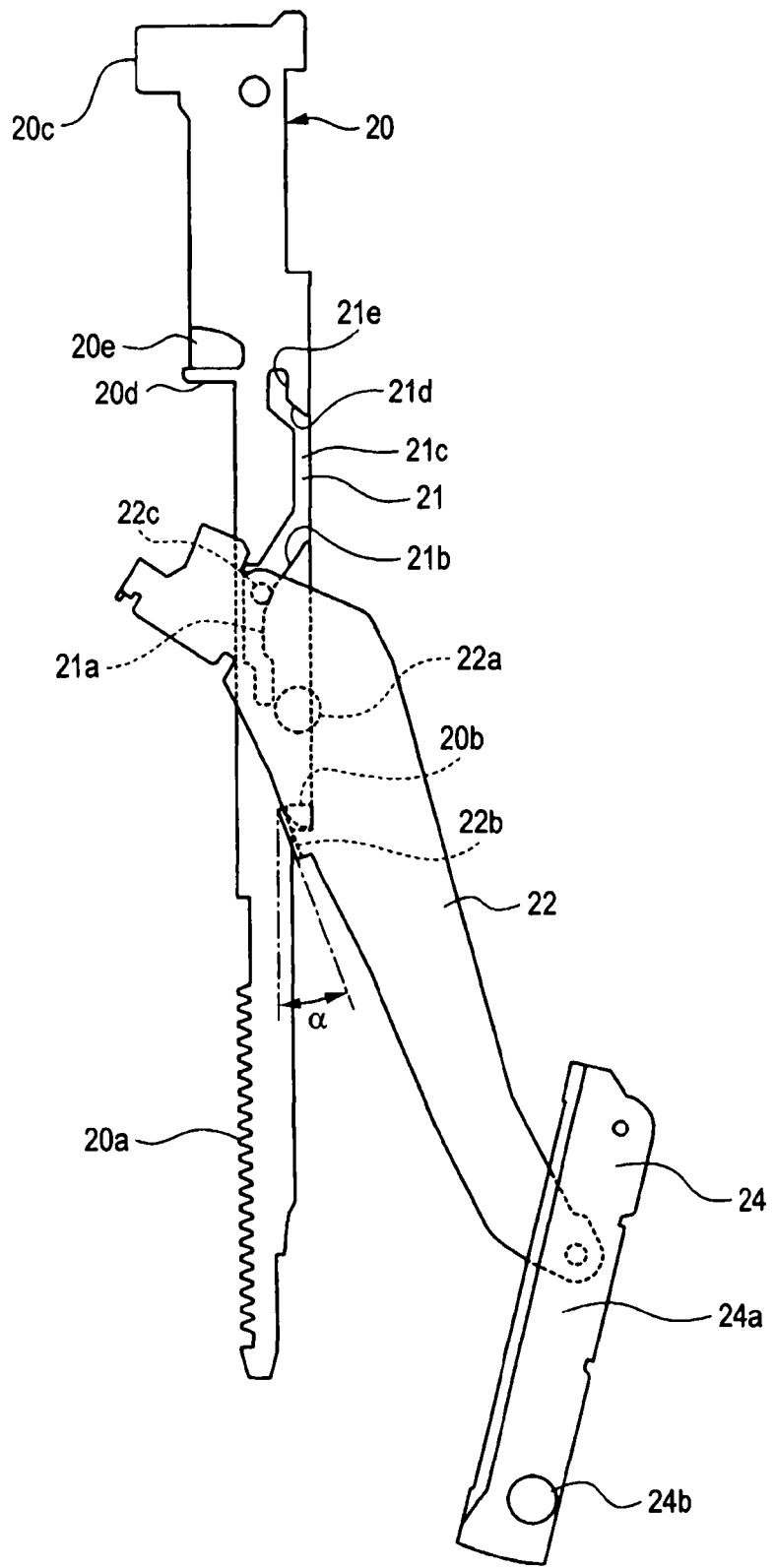
FIG. 24 shows a plan view schematically depicting the state in which a subject pressure piece part of the rotating lever is pushed by a pushing part of the slider.

The slider 20 is moved forward, and then the pressure projecting part 20b pushes the subject pressure piece part 22b of the rotating lever 22 to rotate the rotating lever 22 and the loading lever 24 in the R1 direction (see FIG. 24). Thus, the roller 24b of the loading lever 24 pushes the disk recording medium 100 to the rear side, and the drive force of the drive motor 19 moves the disk recording medium 100 to the rear side.

At the time when the pressure projecting part 20b of the slider 20 starts to push the subject pressure piece part 22b of the rotating lever 22, as shown in FIG. 24, the rotating lever 22 is tilted to the moving direction of the slider 20 at a small angle α. Therefore, a small pushing force of the pressure projecting part 20b is enough to the subject pressure piece part 22b in activating the drive motor 19, and the activation torque of the drive motor 19 can be reduced.

The slider 20 is moved forward to rotate the drive lever 25 in the R1 direction.

Figure 25:
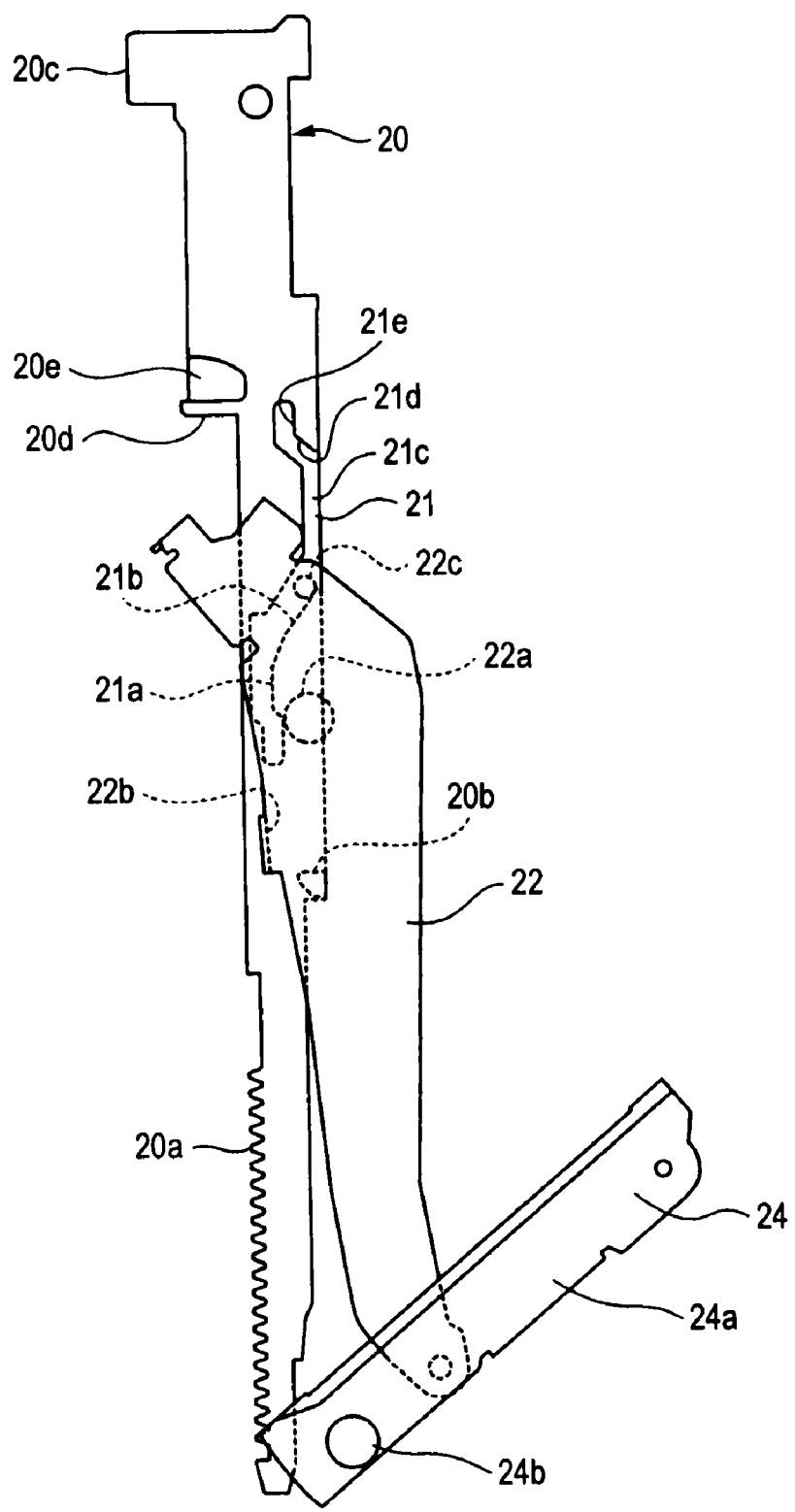
FIG. 25 shows a plan view schematically depicting the state in which a subject pressure shaft of the rotating lever is pushed by the pushing part of the slider subsequent to FIG. 24.
Figure 26:
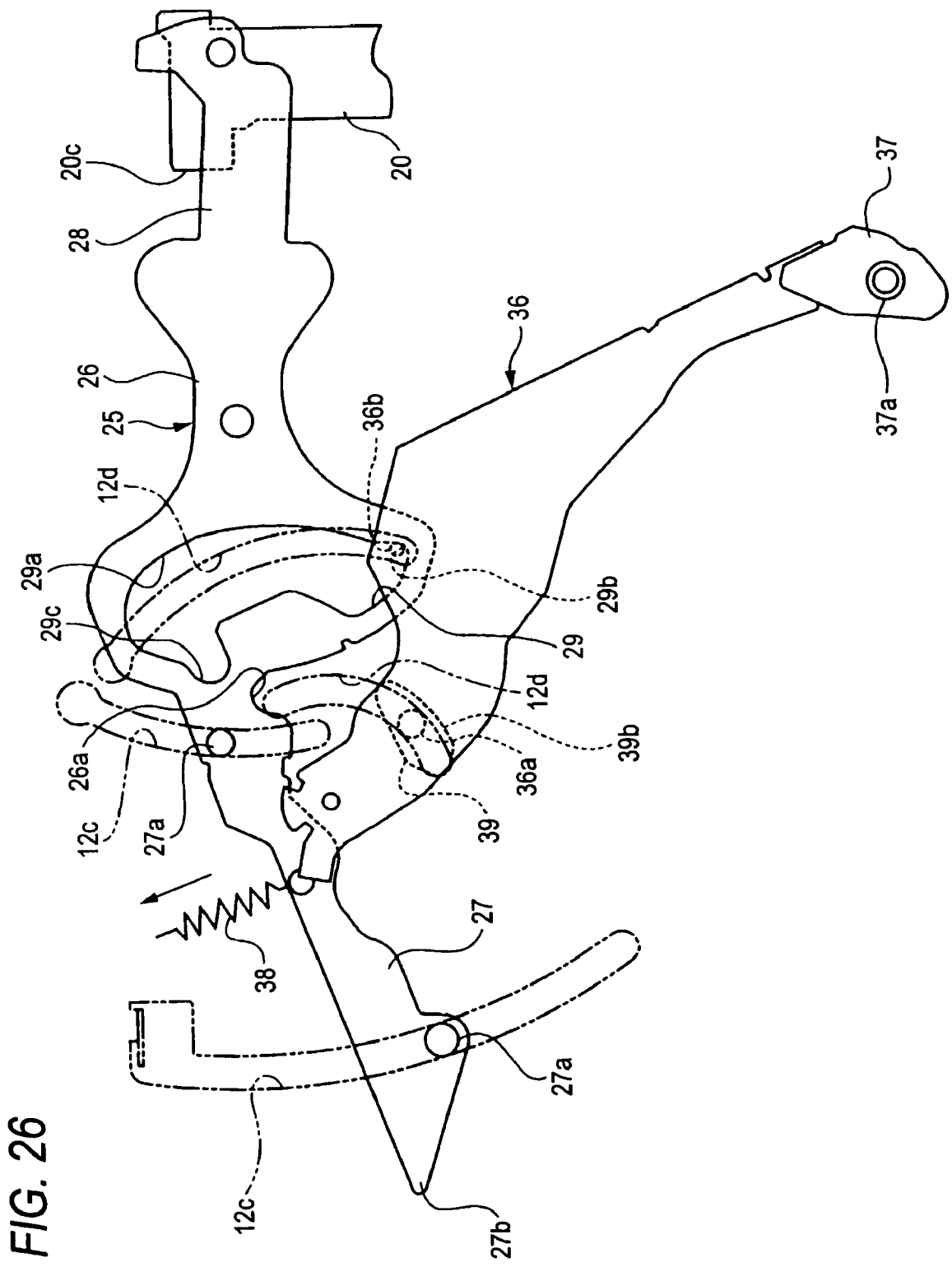
FIG. 26 shows a plan view schematically depicting the state in which a control pin of the eject lever controls the rotating operation of the drive lever.

When the slider 20 is continuously moved forward, as shown in FIG. 25, the pressure projecting part 20b is separated from the subject pressure piece part 22b to the front side, and the subject pressure shaft 22c of the rotating lever 22 is relatively moved on the shaft slide groove 21 of the slider 20 as the subject pressure shaft 22c is slid from the front straight part 21a to the front slope part 21b. Therefore, the front slope part 21b of the shaft slide groove 21 functions as a pushing part that pushes the subject pressure shaft 22c which functions as a the subject pressure part.

When the subject pressure shaft 22c is relatively moved to the front slope part 21b, the rotating lever 20 is continuously rotated in the R1 direction, and the loading lever 24 is also turned in the R1 direction to move the disk recording medium 100 further to the rear side. At this time, since the drive motor 19 is being rotated by stable torque after activated, a pushing force greater than that when activated is applied to the subject pressure shaft 22c.

As described above, in the disk drive apparatus 5, since the pushing parts of the slider 20 (the pressure projecting part 20b and the front slope part 21b) are in turn succeeded to push the subject pressure parts of the rotating lever 22 (the subject pressure piece part 22b and the subject pressure shaft 22c), all the pressure positions can be set at the positions close to the pivot part 22a of the rotating lever 22, and the inclination (pitch) of the rotating lever 22 can be prevented, which can intend an improved operational reliability in loading the disk recording medium.

In addition, the pushing force of the pushing parts in turn succeeded against the subject pressure part is small in activating the drive motor 19, and then grown at the point in time when the drive of the drive motor 19 is stabilized. Thus, the motions of the slider 20, the rotating lever 22 and the loading lever 24 can be stabilized in activating the drive motor 19 as well as an improved operational efficiency can be intended.

Furthermore, the subject pressure piece part 22b and the subject pressure shaft 22c which function as the subject pressure parts of the rotating lever 22 are positioned in the opposite areas in the moving direction of the slider 20 as the pivot part 22a is therebetween. Thus, the distances of the subject pressure piece part 22b and the subject pressure shaft 22c from the pivot part 22a can be shortened, and the inclination of the rotating lever 22 can be decreased.

Moreover, the subject pressure piece part 22b and the subject pressure shaft 22c of the rotating lever 22 are positioned opposite to each other at an angle of about 180 degrees as the pivot part 22a is therebetween. Therefore, the distances of the subject pressure piece part 22b and the subject pressure shaft 22c from the pivot part 22a can be shortened, and the inclination of the rotating lever 22 can be more decreased.

In addition, in the rotating lever 22, the distance to the subject pressure shaft 22c that is first pushed by the pivot part 22a is made longer than the distance to the subject pressure piece part 22b that is subsequently pushed by the pivot part 22a, whereby the pushing force to push the rotating lever 22 in activating the drive motor 19 can be made smaller, and the motions of the slider 20, the rotating lever 22 and the loading lever 24 can be stabilized as well as an improved operational efficiency can be intended.

In moving the slider 20 forward, for example, as shown in FIG. 23, the disk recording medium 100 is sometimes partially protruded forward from the disk insertion port 9a. Therefore, in the case in which the activation of the drive motor 19 is started when the disk recording medium 100 is inserted, it is likely to pull the disk recording medium 100 out of the disk insertion port 9a.

In the loading operation, as described later, the first cam slider 48 and the second cam slider 51 are moved in association with the rotation of the drive lever 25 in the R1 direction to ascend the pickup unit 56 and the motor unit 59. However, in the case in which the eject lever 36 is rotated in the R1 direction by the urging force of the urging spring 38 and moved to the waiting position when the disk recording medium 100 is pulled out of the disk insertion port 9a in driving the drive motor 19, the eject lever 36 is lifted by the pickup base 57 or the disk table 62, which might deform the eject lever 36.

Then, in the disk drive apparatus 5, in order not to cause a problem such as the deformation of the eject lever 36, it is configured in which the motion of the drive lever 25 is controlled so as not to rotate in the R1 direction.

In activating the drive motor 19, the eject lever 36 is rotated to the position close to the rotating end in the R2 direction, and the entire eject lever 36 is moved to the rear side by the pickup unit 56 (see FIG. 23). At this time, the slider 20 is moved forward to rotate the drive lever 25 in the R1 direction from the initial state.

When the disk recording medium 100 is pulled out of the disk insertion port 9a in this state, the eject lever 36 is rotated in the R1 direction by the urging force of the urging spring 38, and the control pin 36b is engaged with the opening edge of the front projecting part 29b of the action hole 29 in the drive lever 25. At this time, although the drive motor 19 is being driven, the rotation of the drive lever 25 in the R1 direction is controlled by the control pin 36b (see FIG. 26).

Therefore, even though the disk recording medium 100 is pulled out of the disk insertion port 9a in driving the drive motor 19, the drive lever 25 is not rotated in the R1 direction exceeding this point, and the pickup unit 56 and the motor unit 59 are not ascended. Thus, the eject lever 36 can be prevented from being deformed.

In addition, in the disk drive apparatus 5, in the case in which the rotation of the drive lever 25 in the R1 direction is suspended for a certain time period when the disk recording medium 100 is pulled forward out of the disk insertion port 9a in driving the drive motor 19, a program is set in such a way that the drive motor 19 is rotated in the reverse direction to move the slider 20 to the rear side, and the individual components are returned to the initial state.

Moreover, when the disk recording medium 100 is pulled in driving the drive motor 19, the support lever 40 is rotated in the R1 direction by the urging force of the extension coil spring 35, and is moved to the waiting position that is the position above the pickup base 57. However, since the position of the support lever 40 is the position close to the pivoting point of the pickup unit 56 than the disk table 62 is, even though the support lever 40 is moved to the waiting position, the amount of ascending the portion positioned directly below the support lever 40 in the pickup base 57 is small. Thus, the pickup base 57 is not contacted with the support lever 40.

As described above, although the control pin 36b of the eject lever 36 is engaged with the opening edge of the front projecting part 29b of the action hole 29 in the drive lever 25, the reinforcing rib 29d is provided on the opening edge of the action hole 29. Therefore, the strength of the drive lever 25 is great, and the drive lever 25 can be prevented from being deformed caused by the engagement of the control pin 36b with the opening edge of the front projecting part 29b.

Figure 27:
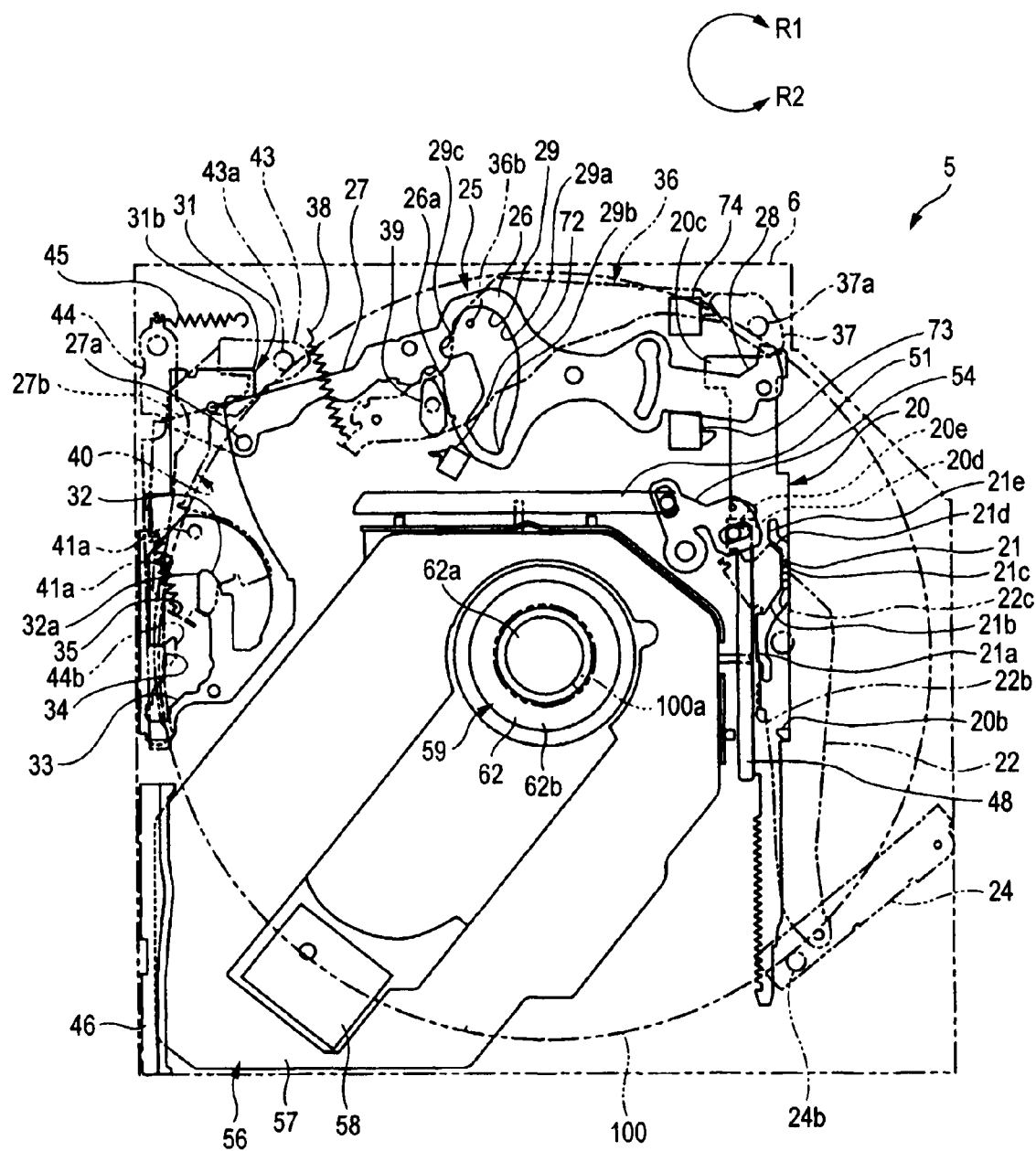
FIG. 27 shows a plan view schematically depicting the state in which the centering of the disk recording medium is finished subsequent to FIG. 23.

When the slider 20 is moved forward by the drive motor 19 further from the state shown in FIG. 23, the roller 24b of the loading lever 24 pushes and moves the disk recording medium 100 further to the rear side (see FIG. 27). The disk recording medium 100 is moved to the rear side of the guide member 46, and is moved to the rear side as slid and guided by the disk holding recessed part 44a of the centering lever 44.

In the rotating lever 22, the subject pressure shaft 22c is relatively moved from the front slope part 21b to the middle straight part 21c on the shaft slide groove 21 of the slider 20. Thus, as shown in FIG. 27, the rotations of the rotating lever 22 and the loading lever 24 are stopped, and the center hole 100a of the disk recording medium 100 is stopped at the centering position located directly above the centering projecting part 62a of the disk table 62. At this time, the disk recording medium 100 is held from the outer edge side by the roller 24b of the loading lever 24, the disk holding pin 37a of the eject lever 36, the disk holding pin 43a of the support lever 40, and the disk holding recessed part 44a of the centering lever 44.

Since the rotation of the loading lever 24 is stopped at the centering position, the rotations of the eject lever 36 and the support lever 40 are also stopped.

The drive motor 19 is continuously rotated in the normal direction of rotation, and the slider 20 is moved forward. The slider 20 is moved forward to relatively move the subject pressure shaft 22c of the rotating lever 22 on the middle straight part 21c of the shaft slide groove 21 to the rear side.

Figure 28:
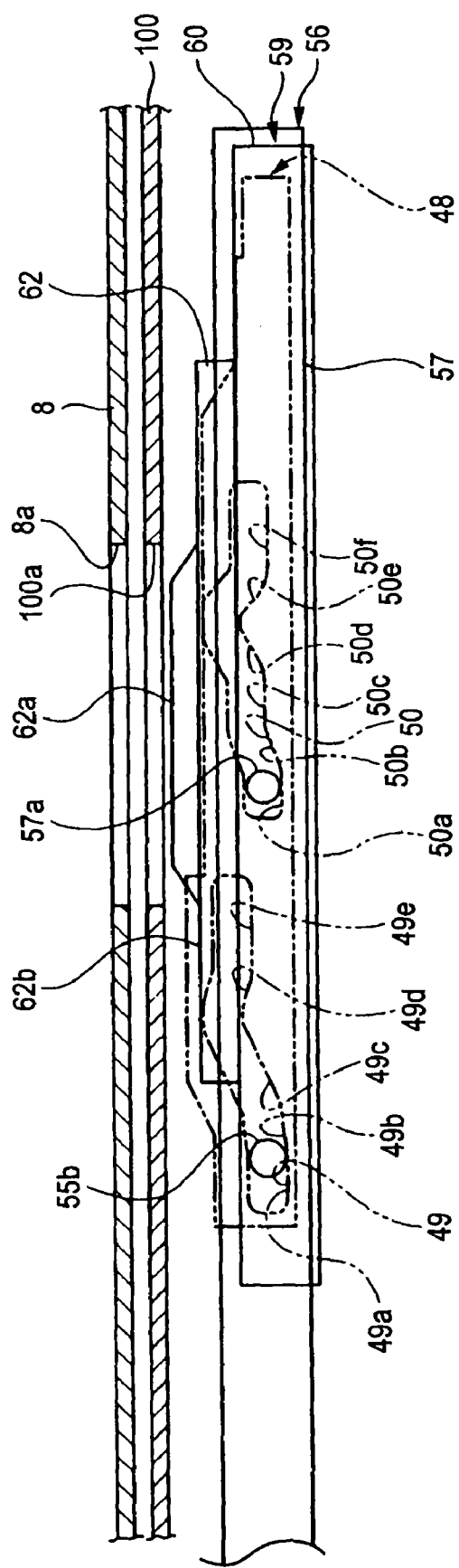
FIG. 28 shows the state of the pickup unit and the motor unit when the disk recording medium is chucked together with FIGS. 29 to 34, showing a side view schematically depicting the state right after starting the chucking operation.

The slider 20 is moved forward, and then the pressure face part 20d of the slider 20 pushes the first cam slider 48 forward. As shown in FIG. 28, the cam coupling part 55b of the up-and-down lever 55 is relatively moved from the first straight groove part 49a to the first slope groove part 49b in the cam part 49 of the first cam slider 48. At the same time, in synchronization with the forward movement of the first cam slider 48, the second cam slider 51 is moved rightward, and the cam coupling parts 55b and 55b of the up-and-down levers 55 and 55 are relatively moved from the first straight groove parts 52a and 52a to the first slope groove parts 52b and 52b in the cam parts 52 and 52 of the second cam slider 51. Thus, the up-and-down levers 55, 55 and 55 are rotated to ascend the motor unit 59.

At this time, the coupling pins 57a and 57a provided on the pickup base 57 of the pickup unit 56 are relatively moved on the cam coupling part 50 of the first cam slider 48 and the first straight parts 50a and 53a of the cam coupling part 53 of the second cam slider 51. Therefore, the pickup unit 56 is not ascended (rotated).

As discussed above, in the up-and-down lever 55, for example, since the distance from the pivot part 55a to the unit coupling part 55c is about two times the distance from the pivot part 55a to the cam coupling part 55b, the distance of ascending and descending the motor unit 59 is about two times the distance in the vertical direction between the pivot part 55a and the cam coupling part 55b.

In moving the slider 20 forward, the coupling lever 54 coupling the first cam slider 48 to the second cam slider 51 is rotated to insert the subject action shaft 54b into the action groove 20e of the slider 20.

Figure 29:
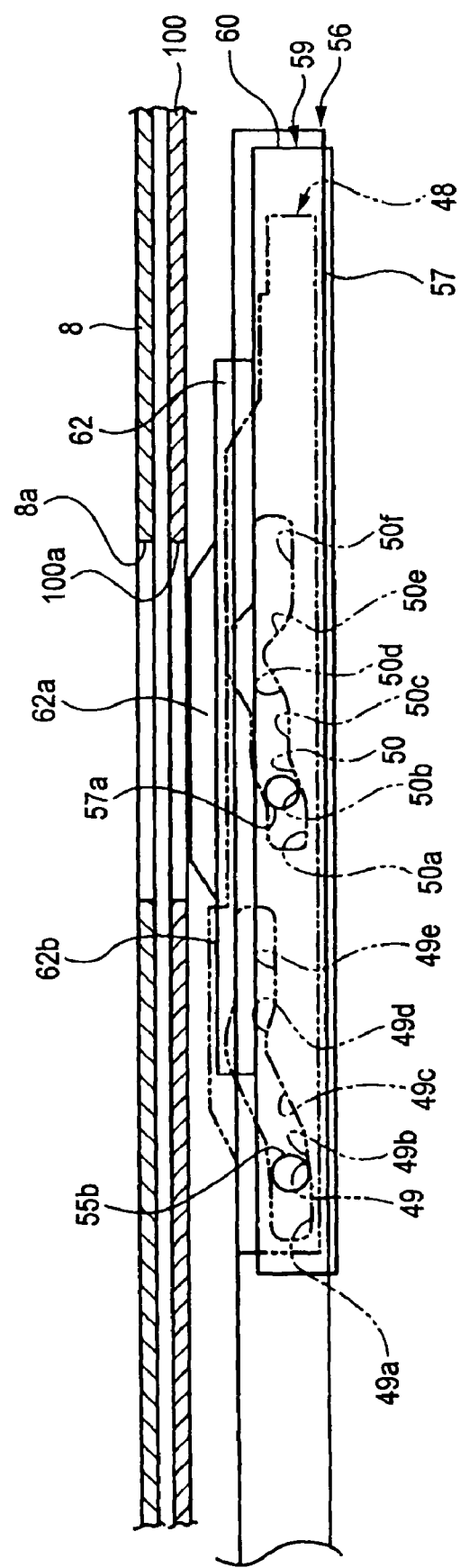
FIG. 29 shows a side view schematically depicting the state in which the chucking operation is conducted subsequent to FIG. 28.

When the slider 20 is further moved forward, the cam coupling parts 55b, 55b and 55b of the up-and-down levers 55, 55 and 55 are continuously, relatively moved on the first slope groove parts 49b, 52b and 52b (see FIG. 29). At this time, the coupling pins 57a and 57a provided on the pickup base 57 of the pickup unit 56 are relatively moved from the cam coupling part 50 of the first cam slider 48 and the first straight parts 50a and 53a of the cam coupling part 53 of the second cam slider 51 to the first slope parts 50b and 53b. Thus, the motor unit 59 is continuously ascended as well as the pickup unit 56 is ascended (rotated).

Figure 30:
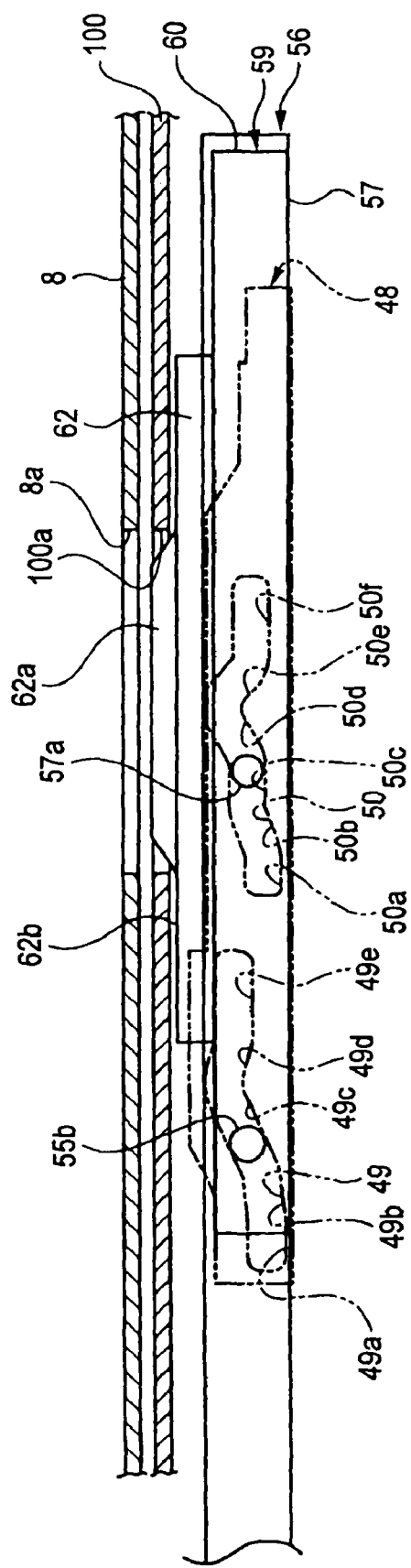
FIG. 30 shows a side view schematically depicting the state in which the chucking operation is conducted subsequent to FIG. 29.

When the slider 20 is further moved forward, the cam coupling parts 55b, 55b and 55b of the up-and-down levers 55, 55 and 55 are relatively moved from the first slope groove parts 49b, 52b and 52b to the second slope groove parts 49c, 52c and 52c, and the coupling pins 57a and 57a of the pickup unit 56 are relatively moved from the first slope parts 50b and 53b to the second straight parts 50c and 53c (see FIG. 30). Therefore, the motor unit 59 is continuously ascended as well as the ascending of the pickup unit 56 is temporarily suspended.

Figure 31:
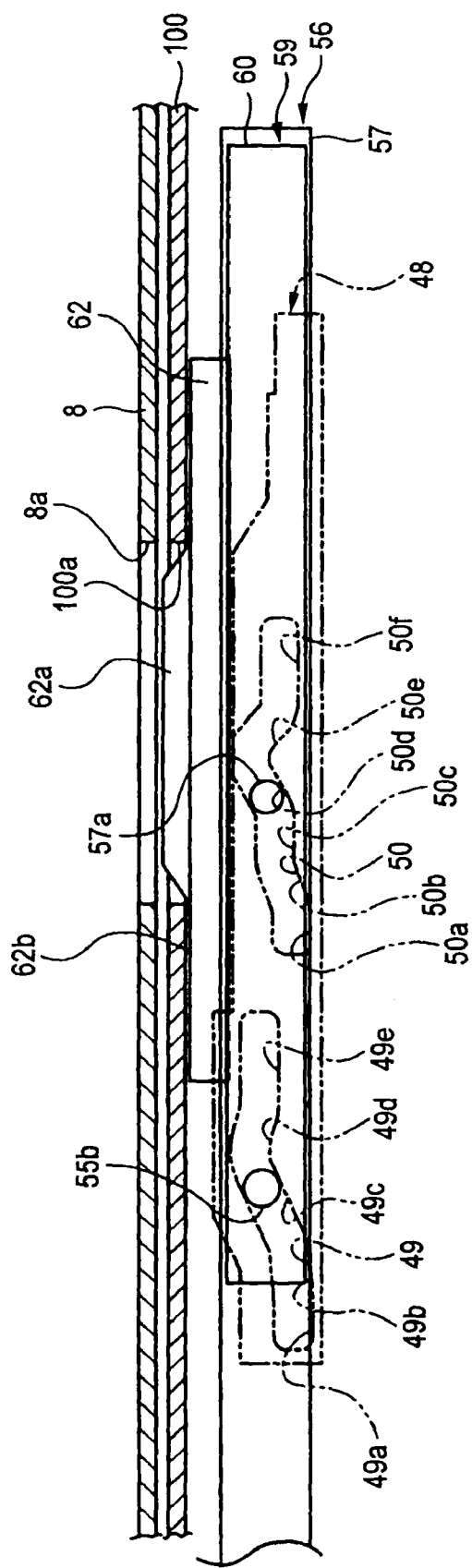
FIG. 31 shows a side view schematically depicting the state in which the chucking operation is conducted subsequent to FIG. 30.

When the slider 20 is continuously moved forward, the cam coupling parts 55b, 55b and 55b of the up-and-down levers 55, 55 and 55 are continuously, relatively moved on the second slope groove parts 49c, 52c and 52c (see FIG. 31). At this time, the coupling pins 57a and 57a of the pickup unit 56 are relatively moved from the second straight parts 50c and 53c to the second slope parts 50d and 53d. Thus, the motor unit 59 is continuously ascended as well as the pickup unit 56 is ascended.

In relatively moving the coupling pins 57a and 57a of the pickup unit 56 to the second slope parts 50d and 53d, the motor mounting base 60 of the motor unit 59 is contacted with the pickup base 57 of the pickup unit 56 from the under side to unite the pickup unit 56 with the motor unit 59 in one piece for ascending.

Figure 32:
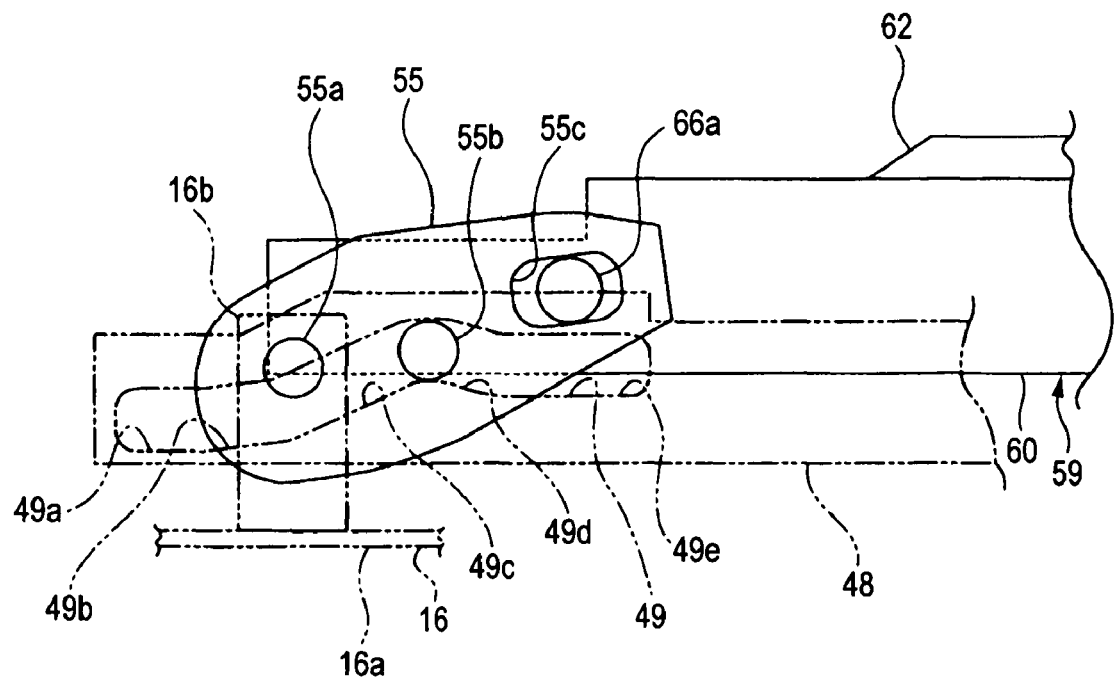
FIG. 32 shows an enlarged side view schematically depicting the up-and-down lever the state in which the motor unit is moved to the uppermost end.

The cam coupling parts 55b, 55b and 55b of the up-and-down levers 55, 55 and 55 are relatively moved to the top end of each of the second slope groove parts 49c, 52c and 52c (see FIG. 32).

Figure 33:
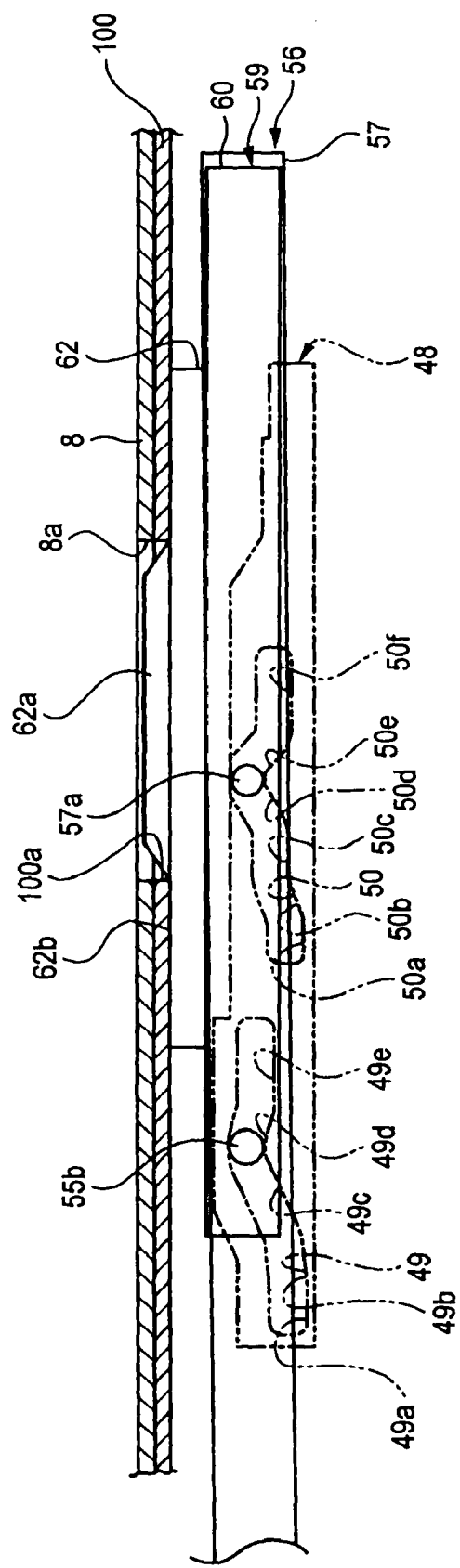
FIG. 33 shows a side view schematically depicting the state in which the disk recording medium is mounted subsequent to FIG. 32.

When the cam coupling parts 55b, 55b and 55b of the up-and-down levers 55, 55 and 55 are relatively moved to the top end of each of the second slope groove parts 49c, 52c and 52c as well as the coupling pins 57a and 57a of the pickup unit 56 are moved to the top end of each of the second slope parts 50d and 53d, as shown in FIG. 33, the centering projecting part 62a of the disk table 62 is inserted into the center hole 100a of the disk recording medium 100, the centering projecting part 62a is inserted into the insertion hole 8a of the upper shell 8, the disk recording medium 100 is pushed against the under face of the upper shell 8 to fit the centering projecting part 62a into the center hole 100a, and then the disk recording medium 100 is mounted on the disk table 62.

In mounting the disk recording medium 100 on the disk table 62, the disk recording medium 100 is moved upward. At this time, the disk recording medium 100 is held from the outer edge side by the roller 24b of the loading lever 24, the disk holding pin 37a of the eject lever 36, the disk holding pin 43a of the support lever 40 and the disk holding recessed part 44a of the centering lever 44, and in this state, the disk recording medium 100 is moved while the rim surface is being slid over these components.

Figure 34:
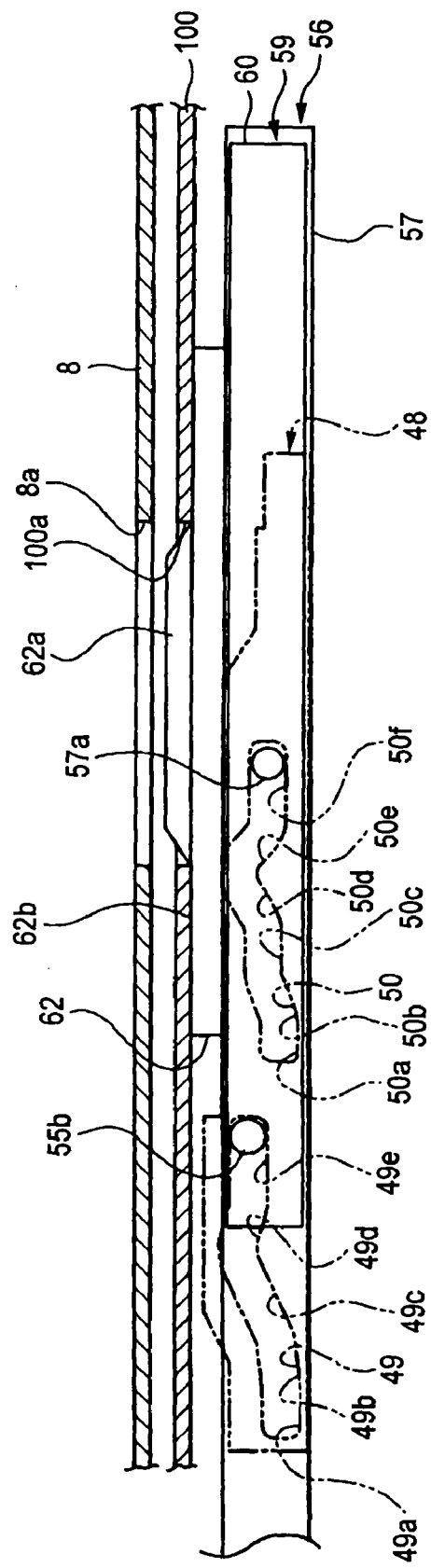
FIG. 34 shows a side view schematically depicting the state in which the chucking operation is completed subsequent to FIG. 33.

The slider 20 is continuously moved forward. As shown in FIG. 34, the cam coupling parts 55b, 55b and 55b of the up-and-down levers 55, 55 and 55 pass through the third slope groove parts 49d, 52d and 52d, and are relatively moved to the third straight groove parts 49e, 52e and 52e. The coupling pins 57a and 57a of the pickup unit 56 pass through the third slope parts 50e and 53e, and are relatively moved to the third straight parts 50f and 53f. Thus, the pickup unit 56 and the motor unit 59 are descended in one piece, and the disk recording medium 100 becomes horizontal.

As discussed above, in the disk drive apparatus 5, the pickup unit 56 and the motor unit 59 are moved on the upper side and the lower side with respect to the position at which the disk recording medium 100 is in the horizontal state, and the pickup unit 56 and the motor unit 59 are positioned on the under side at the time when the disk recording medium 100 is inserted into the disk insertion port 9a. Thus, it is unlikely that the disk recording medium 100 inserted into the disk insertion port 9a is contacted with the pickup unit 56 and the motor unit 59, which can intend to prevent the disk recording medium 100 from being damaged or broken.

In addition, since the pickup unit 56 and the motor unit 59 are separately moved (ascended and descended), such a design is possible that the pickup unit 56 and the motor unit 59 are moved within desired areas, which can intend to reduce the thickness of the disk drive apparatus 5 and to improve the flexibility of design.

Furthermore, the first cam slider 48 and the second cam slider 51 are provided with both of the cam parts 49, 52 and 52 for moving the motor unit 59 and the cam coupling parts 50 and 53 for moving the pickup unit 56. Thus, a single drive motor 19 is sufficient for the drive source of the pickup unit 56 and the motor unit 59, which are separately operated, which can intend to curtail fabrication costs of the disk drive apparatus 5 because of a reduced number of components and to downsize the disk drive apparatus 5 due to a decreased arrangement space.

As discussed above, the motor unit 59 is ascended and descended through the rotations of the up-and-down levers 55, 55 and 55 in association with the movements of the first cam slider 48 and the second cam slider 51. The distance of ascending and descending the motor unit 59 is longer than the distance in the vertical direction between the pivot part 55a and the cam coupling part 55b (see FIGS. 21 and 32), and for example, the distance is about two times the latter distance.

Therefore, the reduction in the thickness of the disk drive apparatus 5 is secured, and then a greater amount of ascending and descending the motor unit 59 can be surely provided.

In addition, only one kind of components, the up-and-down levers 55, 55 and 55, is provided between the first cam slider 48, the second cam slider 51 and the pickup unit 56, which can intend a reduction in fabrication costs, a simpler accuracy management of the individual components and a simplified assembly of the individual components.

Furthermore, in the disk drive apparatus 5, the up-and-down levers 55, 55 and 55 are formed in a plate, and the up-and-down levers 55, 55 and 55 are arranged between the first cam slider 48 or the second cam slider 51 and the motor mounting base 60 in such away that the surface direction orients the both components (in the lateral direction or in the vertical direction). Thus, the arrangement space of the up-and-down levers 55, 55 and 55 is small, which can intend to downsize the disk drive apparatus 5.

The slider 20 is continuously moved forward, the cam coupling parts 55b, 55b and 55b of the up-and-down levers 55, 55 and 55 are relatively moved on the third straight groove parts 49e, 52e and 52e to the rear side, and the coupling pins 57a and 57a of the pickup unit 56 are relatively moved on the third straight parts 50f and 53f to the rear side. Therefore, the pickup unit 56 and the motor unit 59 are not ascended or descended.

Figure 35:
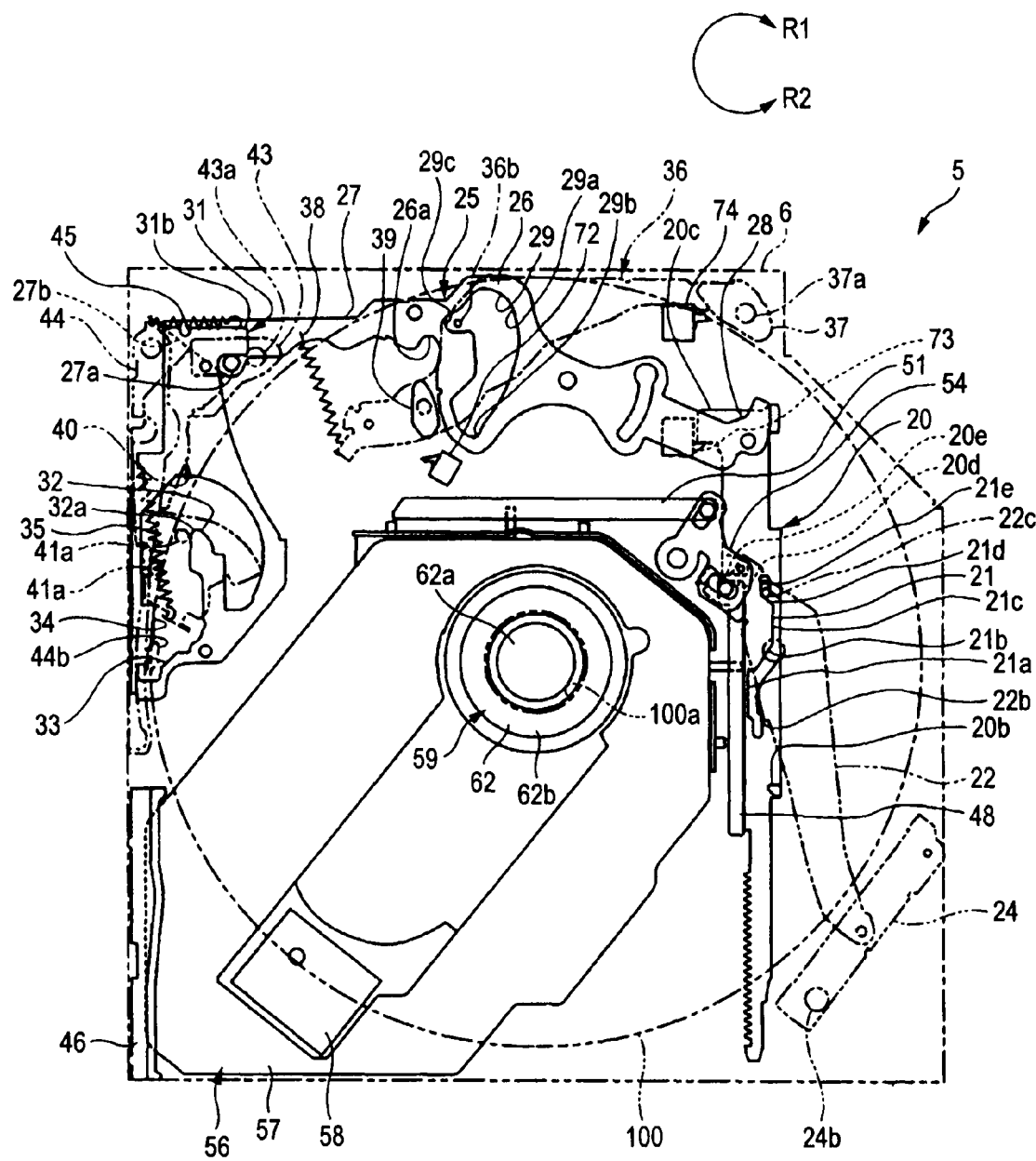
FIG. 35 shows a plan view schematically depicting the state in which the disk recording medium has been chucked at the position at which recording and reproduction are possible.
Figure 36:
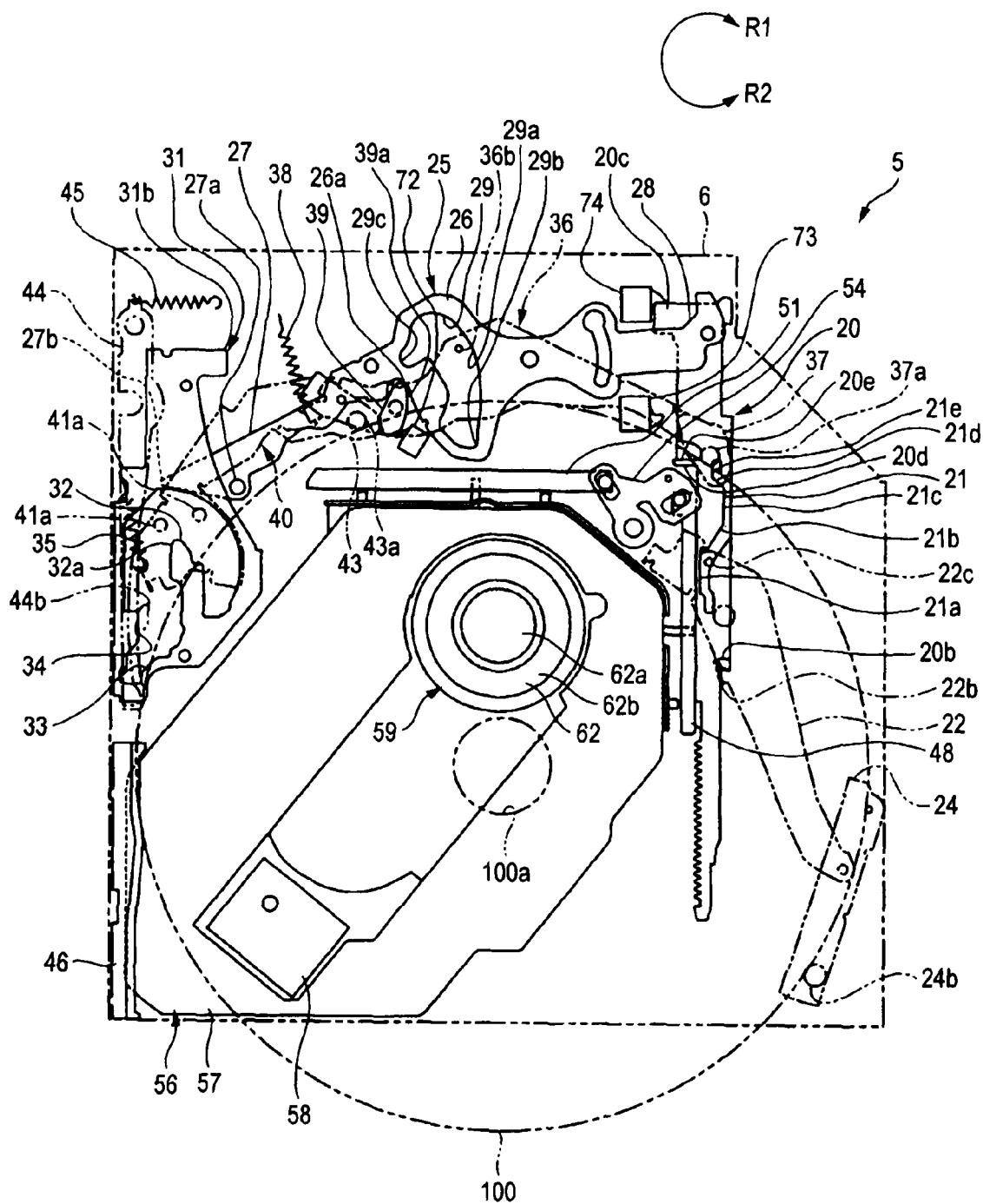
FIG. 36 shows a plan view schematically depicting the state in the midway of the eject operation.

As discussed above, after the disk recording medium 100 is mounted on the disk table 62, the pickup unit 56 and the motor unit 59 are not ascended or descended. At this time, the slider 20 is moved forward, and then as shown in FIG. 35, the subject pressure shaft 22c of the rotating lever 22 is relatively moved from the middle straight part 21c of the shaft slide groove 21 through the rear slope part 21d to the rear straight part 21e to the rear side. Thus, the rotating lever 22 and the loading lever 24 are rotated in the R2 direction, and the roller 24b of the loading lever 24 is separated from the rim surface of the disk recording medium 100 to the outer side.

At the same time, the slider 20 is moved forward to rotate the drive lever 25 in the R1 direction, the opening edge of the rear opening 29c of the action hole 29 pushes the control pin 36b of the eject lever 36 to nearly the rear side, the disk holding pin 37a of the eject lever 36 is separated from the rim surface of the disk recording medium 100 to the outer side, and the eject lever 36 is moved to the drawing position. The control pin 36b is engaged with the opening edge of the rear opening 29c, and then the eject lever 36 is locked at the drawing position.

At the same time, the slider 20 is moved forward to rotate the drive lever 15 in the R1 direction, whereby the subject pressure piece part 31b of the centering slider 31 is pushed to the rear side by one of the subject support pins 27a of the drive lever 25, and then the centering slider 31 is moved to the rear side. When the centering slider 31 is moved to the rear side, the lock part 32a of the action projecting part 32 is engaged with one of the subject guide pins 41a of the support lever 40 as well as the straight action part 34 is separated from the subject action projecting part 44b of the centering lever 44 to the rear side. Thus, the support lever 40 is rotated in the R2 direction as well as the centering lever 44 is rotated in the R1 direction by the urging force of the coil spring 45, and the disk holding pin 43a of the support lever 40 and the centering lever 44 are separated from the rim surface of the disk recording medium 100 to the outer side. The disk holding pin 43a is engaged with the lock part 32a to lock the support lever 40 at the drawing position. The slope action part 33 is engaged with the subject action projecting part 44b from the right side to lock the centering lever 44 at the position apart from the disk recording medium 100.

As discussed above, the disk recording medium 100 held by the roller 24b of the loading lever 24, the disk holding pin 37a of the eject lever 36, the disk holding pin 43a of the support lever 40 and the centering lever 44 is released as well as the disk recording medium 100 is chucked by the disk table 62, whereby the disk recording medium 100 is allowed to turn around.

At this time, the switch pushing part 20c of the slider 20 that is moved forward operates the detecting switch 73, and then the rotation of the drive motor 19 is stopped.

The disk recording medium 100 is rotated in association with the rotation of the disk table 62 by the spindle motor 61, and the optical pickup 58 is driven to record or reproduce information signals.

In addition, the pickup unit 56 and the motor unit 59 are united with each other in the midway of the ascending and descending operation. Since the motor unit 59 and the pickup unit 56 are united with each other at least during the time in which information signals are recorded or reproduced from the disk recording medium 100, proper positions can be secured between the pickup unit 56 and the motor unit 59 in recording or reproducing information signals on the disk recording medium 100.

When recording or reproducing information signals on the disk recording medium 100 is completed, a user manipulates an eject button, not shown, to start rotating the drive motor 19 in the reverse direction.

When the drive motor 19 is rotated in the reverse direction, the slider 20 is moved to the rear side, and the rim surface of the disk recording medium 100 is again held by the roller 24b of the loading lever 24, the disk holding pin 37a of the eject lever 36, the disk holding pin 43a of the support lever 40 and the centering lever 44 in the motion reverse to the motion described above.

At this time, the slider 20 is moved to the rear side to rotate the drive lever 25 in the R2 direction, the engagement of the subject support pin 27a of the drive lever 25 with the subject pressure piece part 31b of the centering slider 31 is released, and the centering slider 31 is moved to the front moving end by the urging force of the extension coil spring 35. The centering slider 31 is moved forward to release the locking of the lock part 32a of the action projecting part 32 in the support lever 40, and the engagement of the slope action part 33 of the centering slider 31 with the subject action projecting part 44b is released as well as the straight action part 34 is engaged with the subject action projecting part 44b to rotate the centering lever 44 in the R2 direction by the urging force of the coil spring 45.

Subsequently, the slider 20 is moved to the rear side to carry the first cam slider 48 to the rear side and the second cam slider 51 to the left side, and then the disk recording medium 100 chucked on the disk table 62 is released.

The opening edge of the action groove 20e in the slider 20 pushes the subject action shaft 54b of the coupling lever 54 to the rear side to move the first cam slider 48 and the second cam slider 51, the subject action shaft 54b coupling first cam slider 48 to the second cam slider 51.

The chucking of the disk recording medium 100 is released in which the disk recording medium 100 is held by the loading lever 24, the disk holding part 37 of the eject lever 36, the disk holding part 43 of the support lever 40 and the centering lever 44, and in this state, the motor unit 59 is descended to bring the under face of the disk recording medium 100 into contact with the pickup base 57 to remove the disk recording medium 100 from the centering projecting part 62a of the disk table 62.

When the pickup unit 56 and the motor unit 59 are descended to release the chucking of the disk recording medium 100, the disk recording medium 100 is ejected from the disk insertion port 9a, and the slider 20 is continuously moved to the rear side.

The slider 20 is moved to the rear side to rotate the drive lever 25 in the R2 direction, and the pushing part 26a formed on the subject support face part 26 of the drive lever 25 pushes the subject pressure part 39a of the subject pressure member 39 mounted on the under surface side of the eject lever 36 to nearly the front side. The eject lever 36 is rotated in the R1 direction to push the disk recording medium 100 forward by the disk holding pin 37a. The disk recording medium 100 is moved forward, and then a part of the disk recording medium 100 is protruded forward from the disk insertion port 9a.

At this time, the drive lever 25 is rotated in the R2 direction as well as the eject lever 36 is rotated in the R1 direction. The pushed position and direction of the subject pressure member 39 that is pushed by the pushing part 26a of the drive lever 25 are changed in accordance with the positions of rotating the drive lever 25 and the eject lever 36 (see FIGS. 37 to 39).

Figure 37:
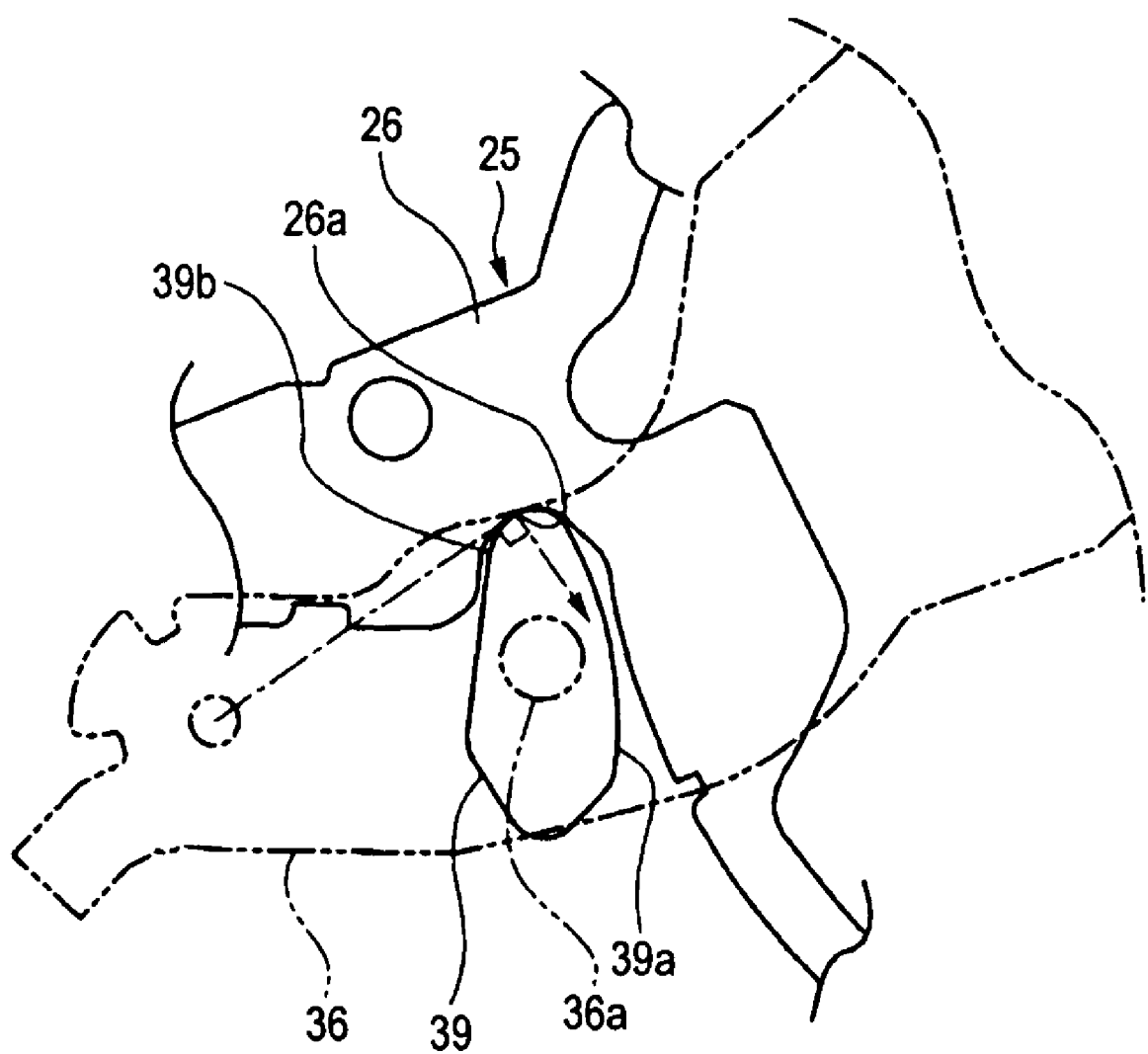
FIG. 37 shows an enlarged plan view schematically depicting the state in which the position of the subject pressure member pushed by a pushing part of a centering slider is changing together with FIGS. 38 and 39, showing the position right after a push is started.
Figure 38:
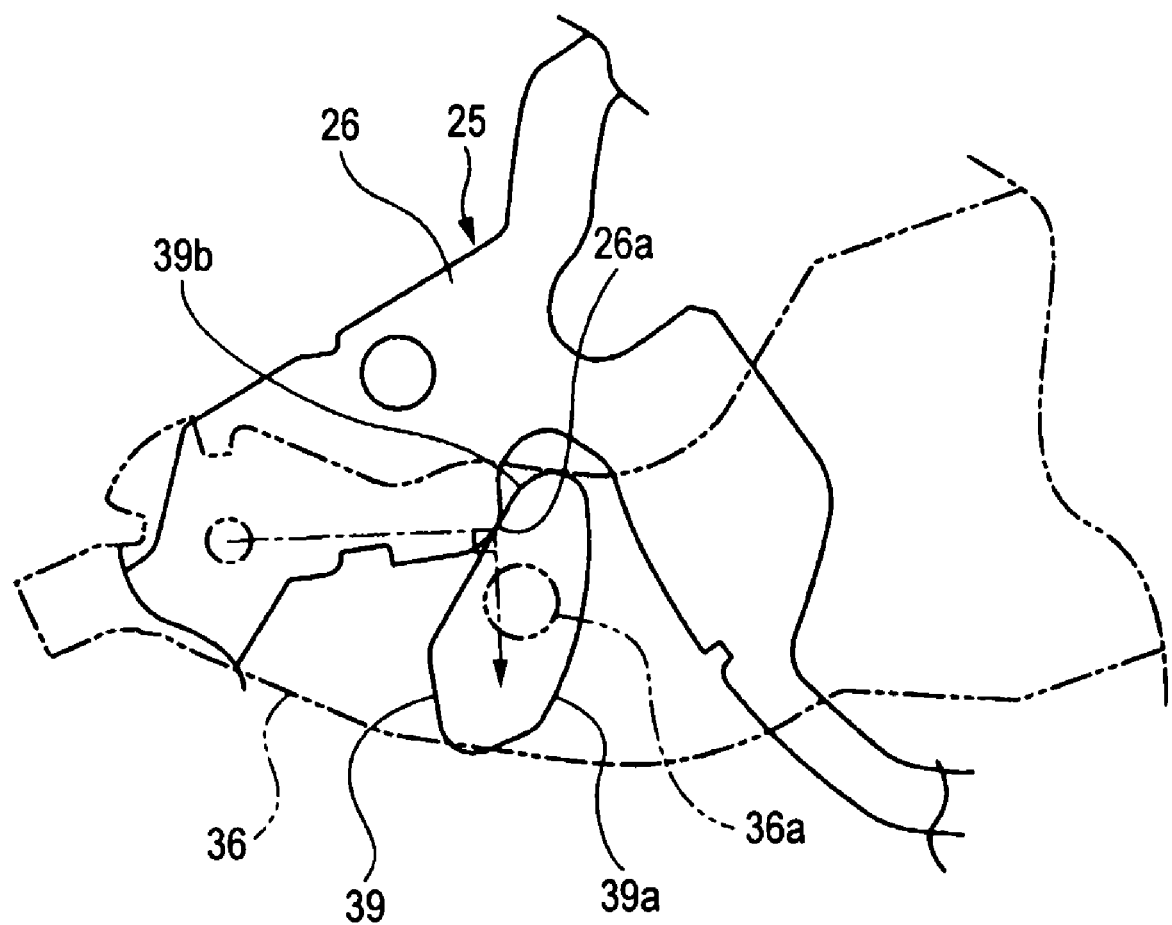
FIG. 38 shows an enlarged plan view schematically depicting the state subsequent to FIG. 37.
Figure 39:
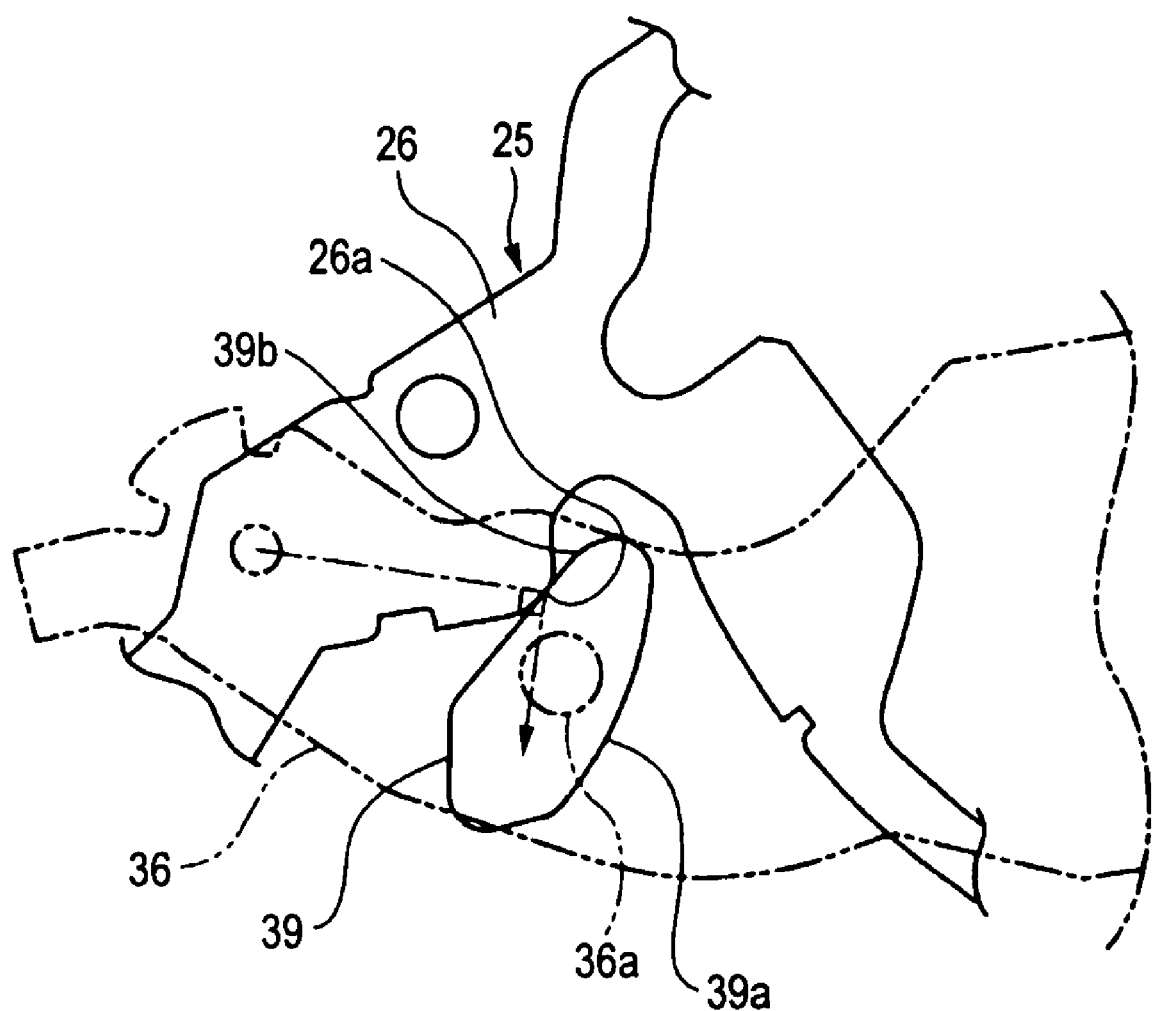
FIG. 39 shows an enlarged plan view schematically depicting the state subsequent to FIG. 38.

As shown in FIGS. 37 to 39, the pushed direction of the subject pressure member 39 that is pushed by the pushing part 26a of the drive lever 25 is the direction nearly orthogonal to the line connecting the pivoting point of the eject lever 36 to the pushed position (the direction of an arrow shown in FIGS. 37 to 39), which is designed so that the loss of the pushing force for rotating the eject lever 36 is made smaller.

Therefore, an improved operational efficiency of rotating the eject lever 36 can be intended, and an enhanced reliability of the eject operation can be intended with no increase in the torque of the drive motor 19.

The slider 20 is further moved to the rear side, the eject lever 36 pushes the disk recording medium 100 further forward, and pushing the disk recording medium 100 by the disk holding pin 37a is finished at the position at which the eject lever 36 reaches the waiting position. At this time, the support lever 40 is rotated in the R1 direction by the urging force of the extension coil spring 35, and the rotating lever 22 and the loading lever 24 are rotated in the state in which the roller 24b of the loading lever 24 is contacted with the rim surface of the disk recording medium 100 as followed by the forward motion of the disk recording medium 100.

At the time when the eject lever 36 is rotated to the waiting position, the activating switch 72 is again operated by the switch pushing part 39a of the subject pressure member 39.

As discussed above, in the disk drive apparatus 5, since the subject pressure member 39, which is pushed by the pushing part 26a of the drive lever 25 in ejecting the disk recording medium 100, has the switch pushing part 39a for operating the activating switch 72, a member exclusive for operating the activating switch 72 is unnecessary, which can intend a simplified mechanism because of a reduced number of components.

Figure 40:
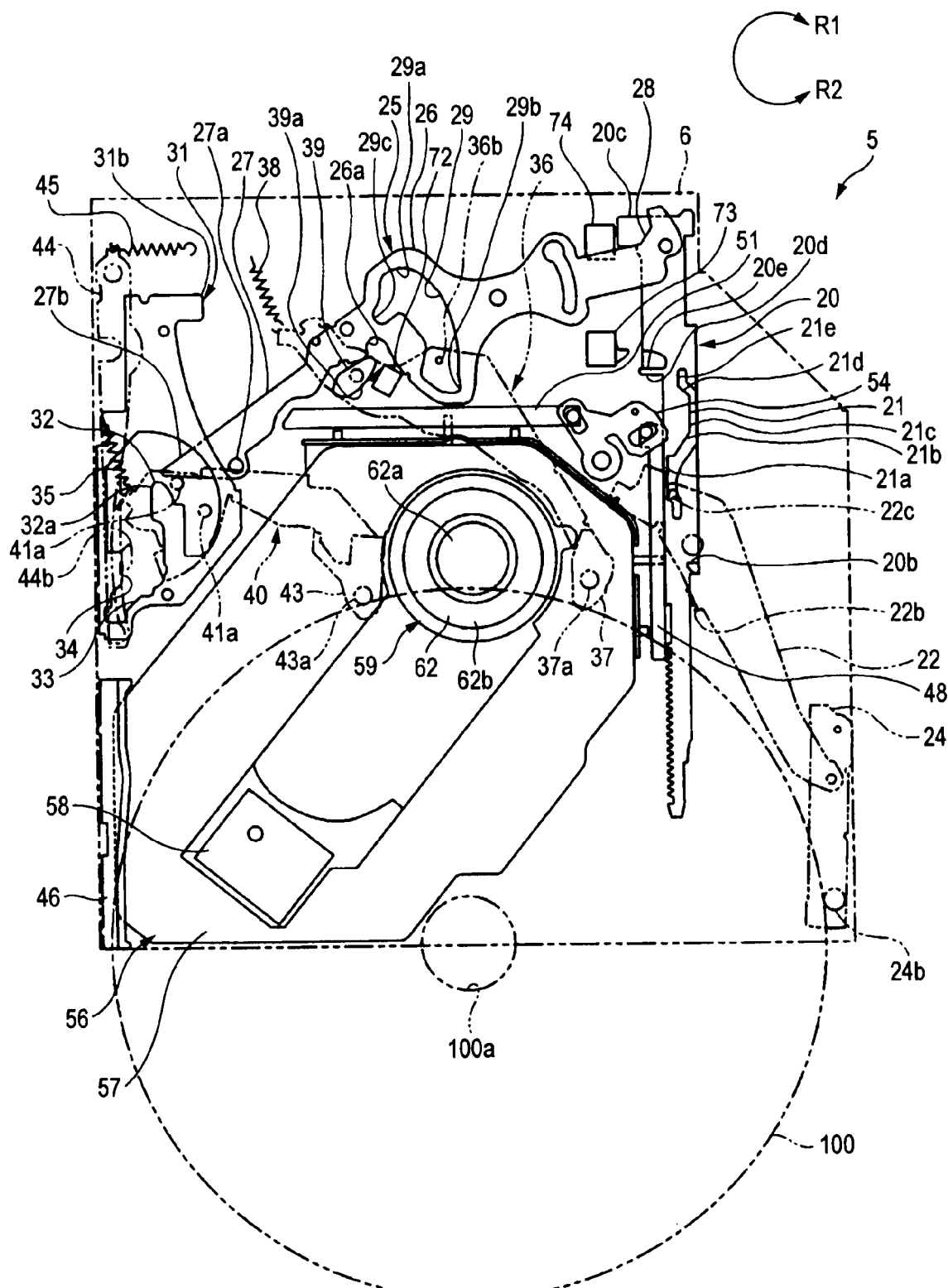
FIG. 40 shows a plan view schematically depicting the state in which the eject operation is completed.

The slider 20 is continuously moved to the rear side, and the drive lever 25 is rotated in the R2 direction to push the subject guide pin 41a of the support lever 40 forward by the action part 27b provided on the extension part 27 of the drive lever 25 (see FIG. 40). Therefore, the disk recording medium 100 is pushed and moved forward by the disk holding pin 43a of the support lever 40. At this time, the support lever 40 is applied with the rotating force in the R2 direction by the urging force of the extension coil spring 35.

As described above, it is configured in which the pressure to the disk recording medium 100 by the eject lever 36 is released just before finishing the ejection, and the disk recording medium 100 is ejected by the support lever 40 applied with the urging force of the extension coil spring 35. Since the urging force of the extension coil spring 35 is small just before finishing the ejection, the excessive popping up of the disk recording medium 100 from the disk insertion port 9a can be prevented.

In addition, it is configured in which the action part 27b is provided on the centering slider 25, and the action part 27b pushes the subject guide pin 41a of the support lever 40 to eject the disk recording medium 100. Thus, the support lever 40 can be reliably rotated, and the disk recording medium 100 can be surely ejected.

Furthermore, it is configured in which even after the rotation of the eject lever 36 is finished, the support lever 40 is continuously rotated to push the disk recording medium 100 for ejecting the medium 100 from the disk insertion port 9a. Thus, the disk recording medium 100 can be reliably protruded from the disk insertion port 9a by a predetermined amount.

When the slider 20 is moved to operate the detecting switch 74 positioned the rear side by the switch pushing part 20c, the rotation of the drive motor 19 is stopped, and the motion of the slider 20 to the rear side is stopped.

A user holds the portion of the disk recording medium 100 protruded from the disk insertion port 9a to take the medium 100 out of the disk drive apparatus 5.

In addition, the switch pushing part 20c of the slider 20 operates the detecting switch 74 to stop moving the slider 20 to the rear side. The stop position is on the rear side more than the position in the initial state (see FIG. 19). In the disk drive apparatus 5, the program is set in such a way that after the eject operation of the disk recording medium 100 is finished and the slider 20 is stopped at the moving end on the rear side, the drive motor 19 is again turned around in the normal direction of rotation, and the individual components are returned to the initial state (see FIGS. 19 to 21).

The specific forms and structures of the individual components shown in the embodiment of the invention show only examples in implementing the embodiment of the invention, and the technical range of the embodiment of the invention should not be interpreted in a limited manner.

It should be understood by those skilled in the art that various modifications, combinations, sub-combinations and alterations may occur depending on design requirements and other factors insofar as they are within the scope of the appended claims or the equivalents thereof.

What is claimed is:

1. A disk drive apparatus comprising:
   a disk table on which a disk recording medium inserted into a disk insertion port and loaded is mounted;
   a slider configured to ascend and descend a pickup base configured to movably support an optical pickup that applies a laser light onto the disk recording medium in the radial direction of the disk recording medium;

an eject lever rotatably supported by a chassis, and having a disk holding part that holds the disk recording medium inserted into the disk insertion port, wherein the eject lever is rotated between a waiting position at which the disk holding part waits for the disk recording medium inserted into the disk insertion port and a drawing position at which the disk recording medium held by the disk holding part is drawn, the eject lever including a control pin protruding from the eject lever, the control pin controlling the motion of the slider;

a drive lever coupled to the slider and operated in association with the motion of the slider, the drive lever having an action hole that is formed in a predetermined shape, wherein the control pin is inserted into the action hole of the drive lever; and a support lever rotatably supported by the chassis and having a disk holding part that holds the disk recording medium inserted into the disk insertion port, wherein the support lever is rotated between a waiting position at which the disk holding part waits for the disk recording medium inserted into the disk insertion port and a drawing position at which the disk recording medium held by the disk holding part is drawn, wherein in the state in which the eject lever and the support lever are at the waiting positions, the disk holding parts of the eject lever and the support lever are each positioned at a position forward of, in a direction toward the disk insertion port, a centering projecting part of the disk table.

2. The disk drive apparatus according to claim 1, further comprising:

a drive motor configured to move the slider in a predetermined direction to ascend and descend the pickup base; and an urging spring configured to urge the eject lever to the waiting position side in the rotating direction, wherein when the eject lever is rotated to the waiting position side by the urging force of the urging spring in the state in which the slider and the drive lever are moved by the drive motor in loading the disk recording medium, the control pin of the eject lever is engaged with a predetermined portion on an opening edge of the action hole of the drive lever to control the motion of the slider.

3. The disk drive apparatus according to claim 2, wherein a reinforcing rib is provided on the opening edge of the action hole of the drive lever.

4. The disk drive apparatus according to claim 1, further comprising:

an extension coil spring configured to urge the support lever to the waiting position side in the rotating direction, wherein the disk recording medium is ejected by pressures of the eject lever and the support lever against the disk recording medium, the eject lever and the support lever being rotated, the pressure of the eject lever against the disk recording medium is released just before finishing the ejection, and in ejecting the disk recording medium, the support lever is rotated from the drawing position to the waiting position by the urging force of the extension coil spring.

5. An electronic appliance having a disk drive apparatus that records or reproduces or records and reproduces information signals on a disk recording medium, the disk drive apparatus comprising:

a disk table on which a disk recording medium inserted into a disk insertion port and loaded is mounted;

a slider configured to ascend and descend a pickup base configured to movably support an optical pickup that applies a laser light onto the disk recording medium in the radial direction of the disk recording medium;

an eject lever rotatably supported by a chassis, and having a disk holding part that holds the disk recording medium inserted into the disk insertion port, wherein the eject lever is rotated between a waiting position at which the disk holding part waits for the disk recording medium inserted into the disk insertion port and a drawing position at which the disk recording medium held by the disk holding part is drawn; and, the eject lever including a control pin protruding from the eject lever, said control pin controlling the motion of the slider;

a drive lever coupled to the slider and operated in association with the motion of the slider, the drive lever having an action hole that is formed in a predetermined shape, wherein the control pin is inserted into the action hole of the drive lever; and a support lever rotatably supported by the chassis and having a disk holding part that holds the disk recording medium inserted into the disk insertion port, wherein the support lever is rotated between a waiting position at which the disk holding part waits for the disk recording medium inserted into the disk insertion port and a drawing position at which the disk recording medium held by the disk holding part is drawn, wherein in the state in which the eject lever and the support lever are at the waiting positions, the disk holding parts of the eject lever and the support lever are each positioned at a position forward of, in a direction toward the disk insertion port, the disk table.

6. A disk drive apparatus comprising:

a disk table on which a disk recording medium inserted into a disk insertion port and loaded is mounted;

a slider means for ascending and descending a pickup base configured to movably support an optical pickup that applies a laser light onto the disk recording medium in the radial direction of the disk recording medium;

an ejecting means rotatably supported by a chassis, and having a disk holding part that holds the disk recording medium inserted into the disk insertion port, wherein the ejecting means is rotated between a waiting position at which the disk holding part waits for the disk recording medium inserted into the disk insertion port and a drawing position at which the disk recording medium held by the disk holding part is drawn, the ejecting means including a slider control means protruding from the eject lever, the slider control means controlling the motion of the slider;

a driving means coupled to the slider means and operated in association with the motion of the slider means, the driving means having an action hole that is formed in a predetermined shape, wherein the slider control means is inserted into the action hole of the driving means; and a supporting means rotatably supported by the chassis and having a disk holding part that holds the disk recording medium inserted into the disk insertion port, wherein the supporting means is rotated between a waiting position at which the disk holding part waits for the disk recording medium inserted into the disk insertion port and a drawing position at which the disk recording medium held by the disk holding part is drawn, wherein in the state in which the ejecting means and the supporting means are at the waiting positions, the disk holding parts of the ejecting means and the supporting means are each positioned at a position forward of, in a direction toward the disk insertion port, a centering projecting part of the disk table.

* * * * *